US008457798B2

(12) United States Patent
Hackett

(10) Patent No.: US 8,457,798 B2
(45) Date of Patent: Jun. 4, 2013

(54) LONG-RANGE RADIO FREQUENCY RECEIVER-CONTROLLER MODULE AND WIRELESS CONTROL SYSTEM COMPRISING SAME

(75) Inventor: Jamie Hackett, Ottawa (CA)

(73) Assignee: Jamie Hackett, Ottawa (CA)

( * ) Notice: Subject to any disclaimer, the term of this patent is extended or adjusted under 35 U.S.C. 154(b) by 799 days.

(21) Appl. No.: 12/282,866

(22) PCT Filed: Mar. 14, 2007

(86) PCT No.: PCT/CA2007/000405
§ 371 (c)(1),
(2), (4) Date: Jan. 23, 2009

(87) PCT Pub. No.: WO2007/104152
PCT Pub. Date: Sep. 20, 2007

(65) Prior Publication Data
US 2009/0204265 A1    Aug. 13, 2009

Related U.S. Application Data

(60) Provisional application No. 60/781,740, filed on Mar. 14, 2006.

(51) Int. Cl.
*G05D 11/00* (2006.01)
*H04B 7/00* (2006.01)
*H04B 1/38* (2006.01)

(52) U.S. Cl.
USPC .......... 700/284; 700/282; 700/283; 455/41.2; 455/73

(58) Field of Classification Search
None
See application file for complete search history.

(56) References Cited

U.S. PATENT DOCUMENTS

| 3,346,864 | A | * | 10/1967 | Harmon | 343/719 |
|---|---|---|---|---|---|
| 4,088,998 | A | * | 5/1978 | Rawls | 342/459 |
| 4,764,774 | A | * | 8/1988 | Hildebrand et al. | 343/719 |
| 5,701,294 | A | | 12/1997 | Ward et al. | |
| 5,760,706 | A | | 6/1998 | Kiss | |
| 5,813,606 | A | | 9/1998 | Ziff | |
| 6,019,295 | A | | 2/2000 | McKenzie | |
| 6,028,857 | A | * | 2/2000 | Poor | 370/351 |

(Continued)

FOREIGN PATENT DOCUMENTS

CA        2263419        11/2003

OTHER PUBLICATIONS

Semtech, DP1205, May 2006, Semtech, Rev. 4, 13 pages.*

(Continued)

*Primary Examiner* — Kavita Padmanabhan
*Assistant Examiner* — Sunray Chang
(74) *Attorney, Agent, or Firm* — Knobbe Martens Olson & Bear LLP

(57) ABSTRACT

A long-range radio frequency (RF) transceiver-controller module configured to transmit and receive RF signals in one or more of the 433, 868, 915 MHz, and 2.4 and 5.8 GHz Industrial, Scientific and Medical (ISM) frequency bands is provided that is capable of consistently transmitting such signals over a range of 100 meters or more without line of sight, including underground. A wireless control system that comprises a plurality of the long-range RF transceiver-controller modules arranged in a distributed, ad hoc networking topography is also provided. The wireless control system has utility in a wide range of medical, industrial, agricultural, military and commercial applications, including, for example, the management of irrigation systems, manufacturing processes, security systems, sewage treatment and handling systems, hospital management systems.

22 Claims, 30 Drawing Sheets

U.S. PATENT DOCUMENTS

| | | | |
|---|---|---|---|
| 6,029,907 | A | 2/2000 | McKenzie |
| 6,039,268 | A | 3/2000 | Grundy et al. |
| 6,079,433 | A | 6/2000 | Saarem |
| 6,145,760 | A | 11/2000 | Harris |
| 6,167,031 | A | 12/2000 | Olofsson et al. |
| 6,263,901 | B1 | 7/2001 | Lohde et al. |
| 6,278,864 | B1 | 8/2001 | Cummins et al. |
| 6,332,581 | B1 | 12/2001 | Chin et al. |
| 6,364,217 | B1 | 4/2002 | Lockwood |
| 6,394,413 | B2 | 5/2002 | Lohde et al. |
| 6,459,959 | B1 | 10/2002 | Williams et al. |
| 6,557,580 | B2 | 5/2003 | Lohde et al. |
| 6,574,266 | B1 * | 6/2003 | Haartsen .................. 375/133 |
| 6,584,080 | B1 * | 6/2003 | Ganz et al. .................. 370/315 |
| 6,600,971 | B1 | 7/2003 | Smith et al. |
| 6,618,234 | B1 | 9/2003 | Abdelghani et al. |
| 6,647,319 | B1 | 11/2003 | Goldberg |
| 6,694,223 | B1 | 2/2004 | Goldberg et al. |
| 6,736,337 | B2 | 5/2004 | Vildibill et al. |
| 6,772,050 | B2 | 8/2004 | Williams et al. |
| 6,782,310 | B2 | 8/2004 | Bailey et al. |
| 6,842,667 | B2 | 1/2005 | Beutler et al. |
| 6,869,026 | B2 | 3/2005 | McKenzie et al. |
| 6,877,714 | B2 | 4/2005 | Hall |
| 6,883,726 | B2 | 4/2005 | Polk et al. |
| 6,917,858 | B2 | 7/2005 | Boger |
| 6,921,030 | B2 | 7/2005 | Renquist |
| 6,931,305 | B2 | 8/2005 | Sherwood |
| 6,945,471 | B2 | 9/2005 | McKenzie et al. |
| 6,993,415 | B2 | 1/2006 | Bauer et al. |
| 6,997,642 | B2 | 2/2006 | Bishop, Jr. |
| 7,002,949 | B2 * | 2/2006 | Garcia-Luna-Aceves et al. .................. 370/351 |
| 7,010,394 | B1 | 3/2006 | Runge et al. |
| 7,225,037 | B2 * | 5/2007 | Shani .................. 700/18 |
| 7,359,769 | B2 | 4/2008 | Bailey et al. |
| 7,423,985 | B1 * | 9/2008 | Hill .................. 370/310.1 |
| 2002/0027894 | A1 * | 3/2002 | Arrakoski et al. .................. 370/338 |
| 2004/0077352 | A1 | 4/2004 | Mahany |
| 2004/0100394 | A1 | 5/2004 | Hitt |
| 2004/0181315 | A1 | 9/2004 | Cardinal et al. |
| 2004/0225411 | A1 | 11/2004 | Beutler et al. |
| 2005/0007294 | A1 * | 1/2005 | Handelsman .................. 343/867 |
| 2005/0031416 | A1 * | 2/2005 | Bishop, Jr. .................. 405/37 |
| 2005/0085928 | A1 * | 4/2005 | Shani .................. 700/18 |
| 2005/0090936 | A1 | 4/2005 | Hitt et al. |
| 2005/0107924 | A1 | 5/2005 | Bailey et al. |
| 2005/0137752 | A1 | 6/2005 | Alvarez |
| 2005/0195775 | A1 | 9/2005 | Petite et al. |
| 2005/0218218 | A1 * | 10/2005 | Koster .................. 235/383 |
| 2005/0267641 | A1 | 12/2005 | Nickerson et al. |
| 2006/0025150 | A1 * | 2/2006 | Kim et al. .................. 455/453 |
| 2006/0030356 | A1 | 2/2006 | Haub et al. |
| 2006/0049271 | A1 | 3/2006 | Hitt |

OTHER PUBLICATIONS

Peter Scholz, Basic Antenna Principles for Mobile Communications, 1998, Kathrein, 47 pages.*

International Search Report dated Sep. 7, 2007 for corresponding PCT Application No. PCT/CA/2007/000405; Filing Date Mar. 14, 2007.

"AC4868 868 MHz OEM Transceivers User's Manual Version 1.1," Aerocomm, Oct. 7, 2005.

"DP1205—C868/C915 868 and 915 MHz Drop-In RF Transceiver Modules, Revision 1," Semtech, Aug. 2005.

"Freedom-Pad," Rain Bird, 2006.

"Freedom System Wireless Remote Control," Rain Bird, 2006.

"S-Shaped Dipole and Swastika Antennas," Mustafa Abu Nasr and Hassan Elkamchouchi, Alexandria University, J. Al-Aqsa Unv., 10 (S.E.) 2006.

"The Freedom System," Rain Bird Tech Specs, 2004.

"The New Freedom-Pad," Rain Bird Tech Specs, 2004.

"XE1205 433 MHz / 868 MHz / 915 MHz Low-Power, Integrated UHF Transceiver, Revision 2," Semtech, Sep. 2005.

* cited by examiner

Active State

Listen State

Standby State

Deep Sleep State

Wake Burst Mode

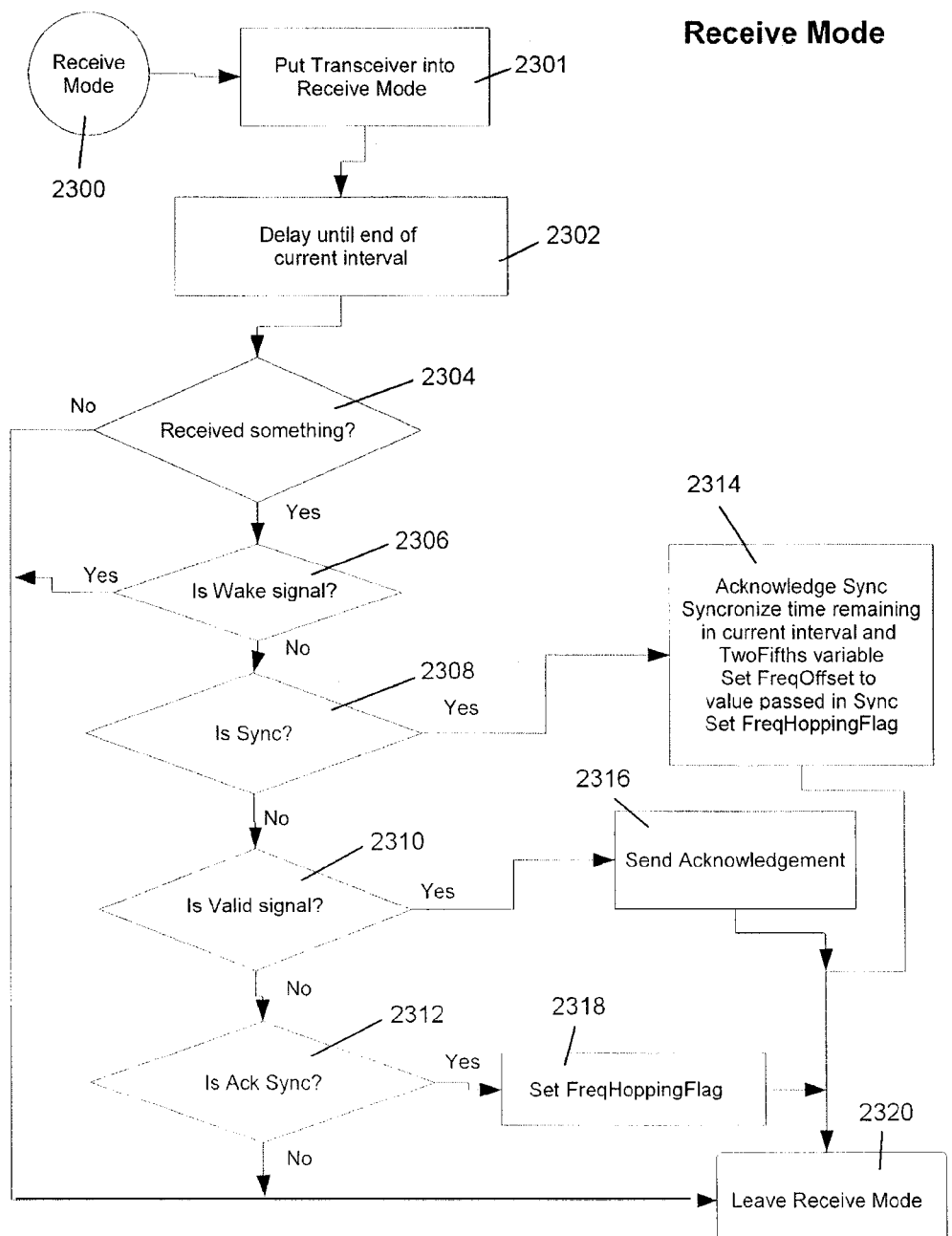

Frequency Hopping Graph

LONG-RANGE RADIO FREQUENCY RECEIVER-CONTROLLER MODULE AND WIRELESS CONTROL SYSTEM COMPRISING SAME

FIELD OF THE INVENTION

The present invention relates generally to wireless control systems and, more particularly, to wireless control systems utilising radio frequency transceivers that operate in the ISM frequency bands.

BACKGROUND OF THE INVENTION

Modern wireless communications technology uses radio frequencies (RF) to transmit information. A variety of frequencies are available for such transmission, depending on the complexity of the information being transmitted, such as text versus multi-channel video. A variety of standards, including for example Bluetooth and WiFi, have been developed for mid- to high-range data rates for voice, PC LANs, video and the like. In contrast, the only standard currently in place for remote control and sensor applications is Zigbee. Sensor and control networks do not require high bandwidth, but do require low latency and low power consumption. ZigBee provides for a general-purpose, inexpensive self-organising mesh network that is designed to use small amounts of power.

A mesh network is an example of one of a number of protocols that take advantage of peer-to-peer style networking in order to reduce complexity and power usage of wireless devices, while still providing the network with considerable overall reach. In peer-to-peer style networks, each node in the network has the capacity to communicate with any other node in the network independently of a central server or router. This network design philosophy, combined with low power, high frequency radio transmissions can be used to build a distributed intelligent network where information is routed through the network on an ad hoc basis and that organises itself to pass data from one node to the next until it reaches the destination node. Nodes act as repeaters to transmit data from nearby nodes to nodes that are too far away to reach, resulting in a network that can span large distances, especially over rough or difficult terrain. This results in a network that is extremely robust and which can adapt easily to changes in the network, such as the introduction of new nodes. Examples of peer-to-peer style network topologies include mesh, ad hoc mesh, mobile mesh, star, cluster tree and various hybrids of these.

Regulation of the radio spectrum for information requires users wishing to broadcast in the higher bandwidth frequencies to pay licensing fees. These license costs add to the creation, scalability and maintenance costs of any system using wireless communication methods. To address this, wireless devices have been developed to use frequency bands that do not require licenses, such as the unlicensed Industrial, Scientific and Medical (ISM) frequency bands. These frequency bands are, however, very narrow, which limits the amount of information that can be transmitted quickly. ZigBee uses the IEEE 802.15.4 Low-Rate Wireless Personal Area Network (WPAN) standard to describe its lower protocol layers (the physical layer PHY, and the medium access control MAC portion of the data link layer or DLL). This standard specifies operation in the unlicensed 2.4 GHz, 915 MHz and 868 MHz ISM bands. Zigbee products use conventional Direct Sequence Spread Spectrum (DSSS) in the 868 and 915 MHz bands, and an orthogonal signalling scheme that transmits four bits per symbol in the 2.4 GHz band. Although each node in a network employing Zigbee standard products can act as a repeater to transmit data multihop fashion to distant nodes, the transmission range of each node in a Zigbee-based network is typically between 10 and 75 metres (approximately 33 to 250 feet). Although it may be possible to extend the transmission range of a Zigbee device up to 500 m in a favourable environment, the average transmission range is about 50 m, this limiting the inter-node distance in the network to about 50 m.

A wide variety of industrial, medical, agricultural, consumer and military applications can benefit from some form of sensor or control network, such as security systems, monitoring digital precision instruments on the factory floor, monitoring shipments through a supply chain, monitoring and reporting seismic activity, medical implants, irrigation management, and the like.

A number of control systems have been developed for automatic irrigation systems that are used for landscape and agricultural maintenance. Automatic irrigation systems generally comprise a network of under and above-ground pipes and pumps that convey water to desired areas, and water valves and pumps that are used to control the flow of irrigation water through a variety of water dispensing devices, including rotors and sprinklers. Rotors are typically enclosed in a protective housing, and a rotating nozzle pops up from the top of the housing during desired irrigation times and irrigates by throwing a jet or spray of water that is rotated about a generally vertical axis. Each rotor, when not in use, sits in its protective housing such that the top cover of the rotor is generally flush with the surrounding ground. Rotors are typically actuated by electric solenoid-controlled valves, which are in turn generally controlled via wires that are run from a controller to each solenoid valve and a pump that controls the flow of water to a sprinkler or group of sprinklers. Control wires to the valves, pumps and rotors are typically buried below ground, often in the same trenches used to run supply pipes to the valves. Control systems vary from simple multi-station timers to complex computer-based controllers.

Hard wired systems such as these are, however, expensive to install, are not easily scalable and are extremely vulnerable to lightning strikes or damage to the control wires. Damage to buried control wires can be difficult to trace and repair, increasing the cost of such systems. As a result, attempts have been made to develop wireless and quasi-wireless system using two-way paging, cellular and GPS technologies as well as primary wireless radio frequency communication platforms. Such communication systems are, however, power intensive, and the signals can be disrupted by obstacles such as buildings, metal structures, hills, cloud cover or even dense foliage. Most of these systems employ one-way communications to change or modify a pre-programmed irrigation schedule stored in the control mechanism. Pre-programmed irrigation schedules, however, are unable to adapt to environmental changes such as precipitation or microclimates, which can result in water being wasted in irrigating at times when irrigation is not required.

A number of wireless or quasi-wireless controls for irrigation systems have been described. U.S. Pat. No. 6,782,310, for example, describes a network of irrigation control devices in wireless communication with a main controller. The main controller uses commercial paging or public broadcast network signals to update watering schedules stored in the memory of the irrigation control devices.

U.S. patent application Ser. No. 10/732,911 describes an automated landscape irrigation control system which uses communication techniques such as wireless telephone transmissions to collect environmental information and derive irrigation schedules which are then sent to irrigation control units. The irrigation control units in turn control a plurality of irrigation stations such as valves or sprinklers.

U.S. Pat. No. 6,600,971 describes a system for operating a distributed control network for irrigation management. The system incorporates a peer-to-peer network of satellite irrigation controllers which can be in communication with a central computer. The network is connected by a communication bus which includes a radio modem but can be controlled through wireless transmissions. Each irrigation controller controls solenoid operated sprinkler valves and optionally sensors. The system is a quasi-wireless system in which the satellite irrigation controllers have wireless capability to be controlled from a central computer or hand held device, but the satellite irrigation controllers need to be hard-wired to the solenoid operated sprinkler valves by field wiring. Thus, although control wiring from the central computer to the satellite station could be eliminated, the system would still require the laying of control wire underground from the satellite irrigation controllers to the solenoid operated sprinkler valves. The system operates on AC power so each satellite irrigation controller requires a 120 volt power supply, which requires 120 volt wiring to the satellite irrigation controller from a generator and hard wiring from the satellite irrigation controller to each sprinkler valve.

U.S. patent application Ser. Nos. 10/692,645 (2005/0090936), 10/692,476 (2004/0100394), 10/692,518 (2004/0090345), 10/692,519 (2004/0090329) and 10/693,017 (2004/0083833) all describe a method for wireless environmental monitoring and control utilising a distributed wireless network of independent sensor and actuator nodes that communicate with each other to transmit sensor data or a command to control the sensor or actuator. The system is designed to be self-operating without the need for a central controller and thus requires that the nodes in the system be relatively complex and able to make decisions independently. These patent applications also describe a multi-hop wireless sensor irrigation control system configured into a plurality of irrigation zones, each comprising a plurality of sensor nodes, actuator nodes and repeater nodes. Control of the system requires a large number of independent sensor and actuator nodes, which in combination with the multi-hop transmission of information signals, results in a large amount of RF traffic within the system. The amount of traffic is further increased when independent repeater nodes are used.

The above patent applications also describe a wireless control system that can be used as an add-on to a pre-existing hard-wired irrigation system. The sensor system provides a moisture control override mechanism to an existing wired irrigation system that schedule irrigation cycles and times. The system of wireless moisture sensor nodes communicate moisture levels to an actuator node that is attached to the common power line of a two-wire power supply system and provides the ability to control and/or override the predetermined irrigation schedule that is controlled by hard-wire from the main terminal.

U.S. Pat. No. 5,813,606 describes a plurality of moisture sensors in wireless communication with a control unit that activates an irrigation system in response to signals from the moisture sensors.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a long-range radio frequency transceiver-controller module and wireless control system comprising same. In accordance with one aspect of the present invention, there is provided a wireless control system for controlling a plurality of devices via a central controller, said wireless control system comprising:

- a radio frequency (RF) apparatus comprising a first RF transceiver and a first antenna operatively associated with a computing device for interfacing with said central controller, said RF apparatus configured to transmit and receive radio frequency (RF) signals in one or more of the ISM frequency bands, and
- a network of radio frequency transceiver-controller (RFTC) modules each in wireless communication with one or more other of said RFTC modules and/or with said central controller, each of said RFTC modules configured for operative association with one or more of said devices and configured to transmit and receive radio frequency (RF) signals in one or more of the ISM frequency bands, at least some of said RFTC modules further configured to transmit said RF signals a distance of at least 100 m without line of sight, wherein said RFTC modules actuate or de-actuate said plurality of devices in response to commands from said central controller transmitted via RF signals.

In accordance with another aspect of the present invention, there is provided a wireless irrigation management system for controlling an irrigation system having a plurality of water management devices, said wireless irrigation management system comprising a central controller and a wireless control system of the invention, wherein each RFTC module is configured for operative association with one or more of said plurality of water management devices via an actuating means and with one or more sensors, wherein said RFTC modules actuate the associated one or more water management devices and/or gather data from said one or more associated sensors in response to commands from said central controller transmitted via RF signals.

In accordance with another aspect of the present invention, there is provided a method for controlling an irrigation system comprising a plurality of water management devices and a central controller, said method comprising: (a) providing a wireless control system comprising

- a radio frequency (RF) apparatus comprising a first RF transceiver and a first antenna operatively associated with a computing device for interfacing with said central controller, said RF apparatus configured to transmit and receive radio frequency (RF) signals in one or more of the ISM frequency bands, and
- a network of radio frequency transceiver-controller (RFTC) modules in wireless communication with one or more other of said RFTC modules and/or with said central controller, each of said RFTC modules configured for operative association with one or more of said water management devices, each RFTC module configured to transmit and receive radio frequency (RF) signals in one or more of the ISM frequency bands, at least some of said RFTC modules further configured to transmit said RF signals a distance of at least 100 m without line of sight; and (b) transmitting a command via a RF signal on one of the ISM frequency bands from said central controller to a RFTC module; wherein said RFTC module processes said command and determines whether to re-transmit the signal, actuate a water management device or collect data from a sensor based on said command.

BRIEF DESCRIPTION OF FIGURES

These and other features of the invention will become more apparent in the following detailed description in which reference is made to the appended drawings.

FIG. 13K presents a flow chart of a transceiver Receive Mode, depicting establishment of a communication path with a central controller for signal transmission therefrom, in accordance with one embodiment of the present invention.

DETAILED DESCRIPTION OF THE INVENTION

Figure 1:
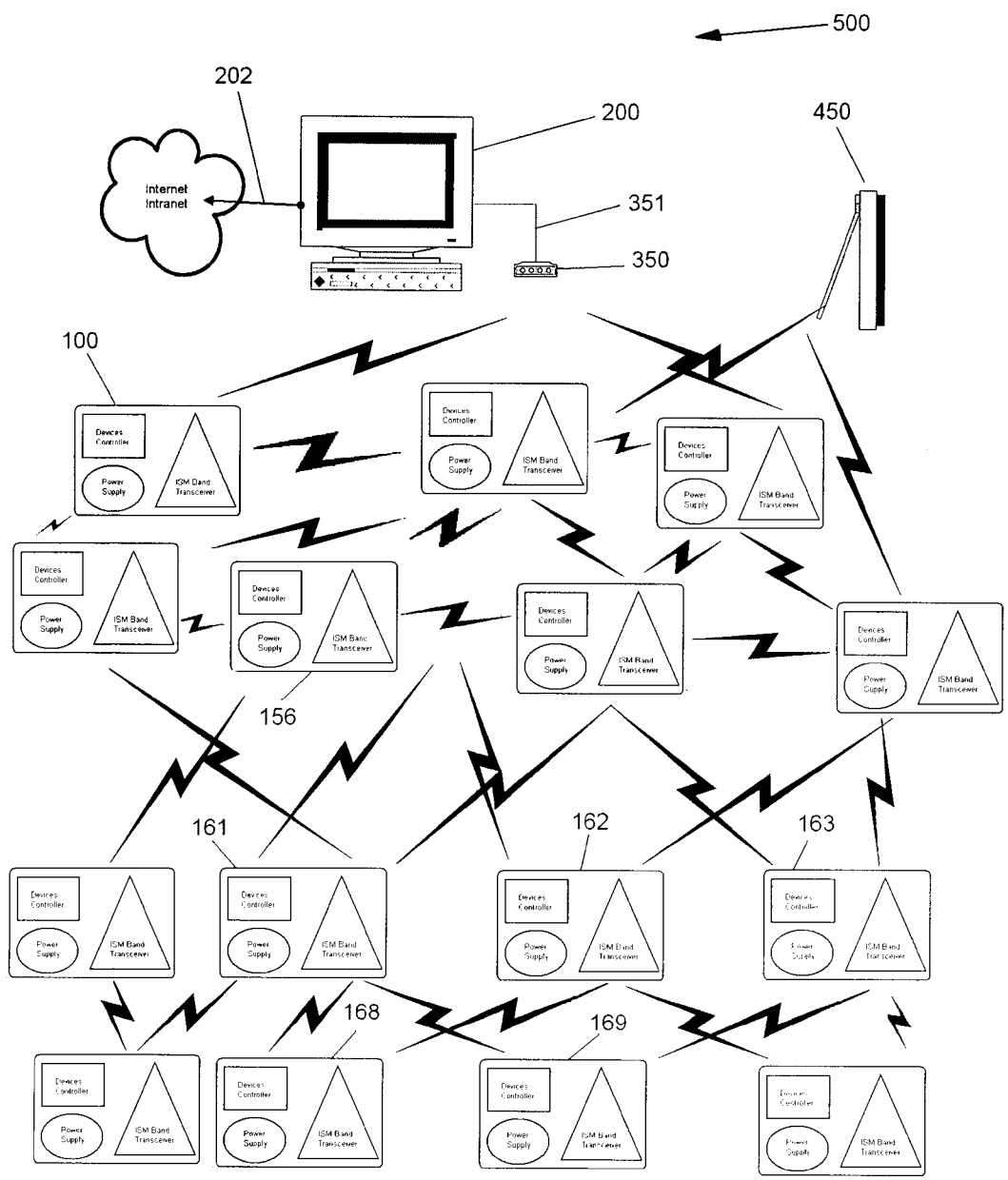
FIG. 1 presents a schematic representation of the topology of a wireless control system in one embodiment of the invention, including a central controller and an optional hand-held controller.

The present invention relates to a wireless control system that operates in Industrial, Scientific and Medical (ISM) frequency bands and comprises RF transceiver-controllers that are capable of transmitting signals over a long range.

In one aspect, the present invention provides for a long-range radio frequency (RF) transceiver-controller module configured to transmit and receive RF signals in one or more of 433, 868, 915 MHz, and 2.4 and 5.8 GHz ISM frequency bands and which is capable of consistently transmitting such signals over a range of 100 metres or more without line of sight, including underground and in situations wherein the RF antenna is below ground or otherwise occluded. With line of sight, the RF transceiver-controller (RFTC) module, in accordance with one embodiment of the present invention, is capable of transmitting RF signals over a range greater than one kilometre. Long range transmission by the RFTC module within a control system can be achieved, for example, by one or more of: configuring the module to use frequency hopping for signal transmission, configuring the module to operate at a low data rate, antenna selection, orientation and/or configuration, and selection of direction of signal propagation.

In general, the RFTC module is capable of operating with low power consumption and in a variety of hostile environments. In one embodiment of the present invention, the RFTC module is configured to operate in one or more of a simple network with single retransmission of received signals, a star network with a master/slave hierarchy, or a smart mesh network with master/slave hierarchy and gateway mapping and routing protocols. The person of ordinary skill in the art will appreciate that other types of network configuration may be considered without departing from the general scope and nature of the present disclosure.

In a specific embodiment, the RFTC module is configured for operative association with one or more actuating means and optionally one or more sensors.

The RFTC module is suitable for use in various communication systems including point-to-point, point-to-multipoint and peer-to-peer systems. In another aspect, therefore, the present invention provides for a wireless control system that comprises a plurality of the long-range RF transceiver-controller modules arranged in a distributed, ad hoc networking topography. In this context, all or a sub-set of the long-range RFTC modules in the system are operatively associated with an actuating means for actuating a device to be controlled by the system and can optionally be further operatively associated with one or more sensors. The wireless control system may be controlled by one or more central computing devices, which interface with the network through a RFTC module incorporated into, for example, a modem or other such communication devices, which can be integrated or external.

The present invention also contemplates that the wireless control system can optionally further comprise one or more mobile modules, such as hand-held devices, as described in more detail below. For example, the system can comprise a mobile controller that also interfaces with the network through an integrated RFTC module and provides a means of controlling the system remotely.

In one embodiment of the present invention, the wireless control system comprises a plurality of wireless nodes, each of which comprises one or more devices to be actuated, one or more sensor(s) and a RFTC module operatively associated with the one or more devices to be actuated via actuating means and further operatively associated with one or more sensor(s). Integrating the sensor(s) and device(s) to be actuated into a single node with one RFTC module allows the number of nodes within the system to be minimised and can reduce the amount of RF traffic required to control and monitor the system.

The wireless control system has utility in a wide range of medical, industrial, agricultural, military and commercial applications, including, for example, the management of irrigation systems, manufacturing processes, security systems, sewage treatment and handling systems, hospital management systems, tracking systems and ground telemetry systems.

In a specific embodiment, the present invention provides for a wireless irrigation management system that allows for the management of irrigation in real-time and is applicable to the management of irrigation systems in agricultural, recreational or landscaping settings. In a specific embodiment of the present invention, a wireless irrigation management system for a golf course is provided.

Other applications should be apparent to the person ordinarily skilled in the art, and as such, are not meant to depart from the general scope and nature of the present disclosure.

As used herein, the term "about" refers to a +/−10% variation from the nominal value. It is to be understood that such a variation is always included in any given value provided herein, whether or not it is specifically identified.

Long-Range Radio Frequency (RF) Transceiver-Controller Module

A long-range RF transceiver-controller module is described in more detail below having reference to FIG. 2, which provides an electronic block diagram of a RFTC module 100 in accordance with one embodiment of the present invention.

Figure 2:
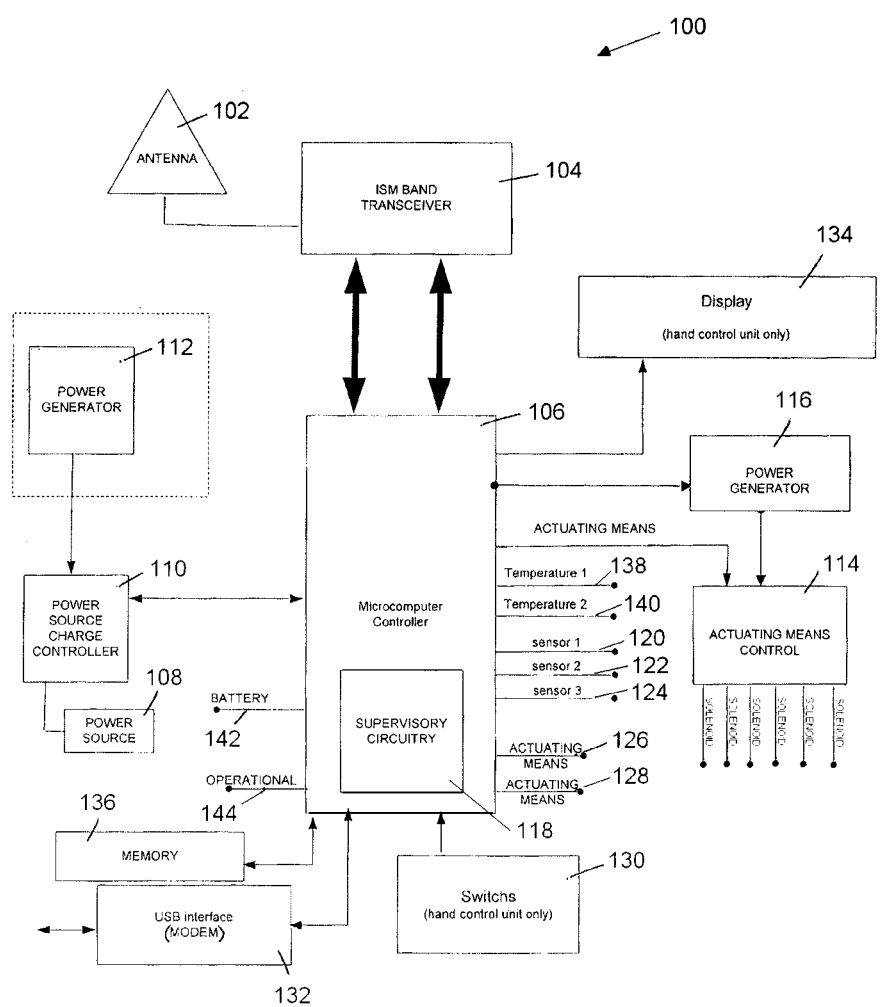
FIG. 2 is an electronic block diagram of a long-range RF transceiver-controller module in one embodiment of the invention.

As shown in FIG. 2, the long-range RF transceiver-controller module 100 comprises a RF transceiver 104, which is configured to transmit and receive RF signals in one or more of the 433, 868, 915 MHz, and 2.4 and 5.8 GHz ISM frequency bands, an antenna 102, and a controller 106, the latter illustratively comprising supervisory circuitry 118, and operative access for memory 136 and power source 108.

In one embodiment, the long-range RF transceiver-controller module 100 is configured for operative association with an actuating means 114 for actuating one, or a plurality of devices, to be controlled by the system and optionally one or more sensors (or monitors) 120-124, for example, for sensing and/or monitoring environmental conditions, system conditions and/or motion. In one embodiment, the actuating means controls between one and about 6 solenoids. The actuating means interfaces with the controller 106 through a wireless or a hard-wired connection.

In various embodiments, the RFTC module 100 is optionally configured for operative association with one or more of the following sensors:

one or more temperature sensors 138 and 140 for sensing external temperatures, for example, air, soil or equipment temperatures, and internal temperatures, for example to detect overheating of the RFTC module or to allow for scheduling of a sleep mode, as discussed below;

a power source sensor 142 for monitoring the status of the power source in real time and to provide proactive failure warning, and/or an operational sensor 144 for monitoring one or more functions of the device actuated by actuating means 114.

Other examples of sensors that can be associated with the RFTC module may include, but are not limited to, light sensors (such as sensors to monitor ambient light levels), motion sensors, moisture sensors, humidity sensors, and the like.

The one or more sensors and monitors can be connected to the RFTC module via a wireless or a hard-wired connection. The sensors/monitors interface with the controller 106, which can be programmed to collect data from and/or send commands to the sensors and monitors.

In one example, the long-range RF transceiver-controller module 100 can be further configured for operative association with more than one actuating means, as shown in FIG. 2 at 126 and 128, which will also be controlled by the controller 106. The controller 106 can control the actuating means directly and/or control the power source for the actuating means.

The RFTC module can further optionally comprise, or be operatively associated with, a power generator 112 for recharging the power source 108, which can be controlled via the controller 106. Power source 108 can be for example, a battery, a solar power source, or an oscillator power source. Power generator 112 can be, for example, a solar panel array or a battery charging device. In one embodiment of the present invention, the power source is a battery. In another embodiment, the power source is a solar panel array.

In operation, the RF antenna 102 intercepts, or receives, transmitted signals from another RFTC module, the central controller, a mobile unit or a repeater, and transmits the signals, as necessary, to one or more other RFTC modules or repeaters. The antenna 102 is coupled to the RF transceiver 104, which employs conventional demodulation techniques for receiving the RF signals. In general, the RF signals are signals comprising data (such as operating data and/or sensor data) and/or commands. In accordance with the present invention, the antenna 102 and RF transceiver 104 operate on one or more of the 433, 868, 915 MHz, and 2.4 and 5.8 GHz ISM frequency bands. The RF transceiver 104 is coupled to the controller 106 and is responsive to commands from the controller 106. When the RF transceiver 104 receives an appropriate command from the controller 106, the RF transceiver 104 sends a signal via the antenna 102 to one or more other long-range RF transceiver-controller modules. In this manner, the antenna 102 and the RF transceiver 104 enable the RFTC module 100 to operate in a RF operating mode. In one embodiment of the present invention, the antenna 102 and RF transceiver 104 are configured to operate on multiple frequencies to help reduce traffic within the network on any one frequency.

In an alternative embodiment of the present invention, the long-range RF transceiver-controller module 100 includes a receive antenna and a receiver for receiving signals from another long-range RFTC module and a transmit antenna and a transmitter for transmitting signals to one or more other long-range RFTC modules.

Coupled to the RF transceiver 104 is the controller 106, which utilises signal-processing techniques for processing received signals and for sending commands, as necessary, to one or more of the RF transceiver 104, the actuating means 114, and/or any associated monitors or sensors. The controller 106 thus controls the operation of the RF transceiver 104 and the actuating means 114, and optionally associated sensors and monitors. The controller 106 generally includes a data interface for processing received signals and for sending commands. If the received signal is an analogue signal, the data interface may include an analogue-to-digital converter to digitise the signals. The controller 106 also determines whether any incoming signal is addressed to the RFTC module 100 and directs the RF transceiver to re-transmit the signal if it is addressed to another RFTC module.

To facilitate controller 106 carrying out its various functions, the controller 106 may also comprise supervisory circuitry 118 and be operatively coupled to the memory 136. The supervisory circuitry 118 can be programmed to regulate the power consumption of the RFTC module, such that it operates within acceptable limits, and to interface with the associated sensors and/or monitors when present, for example, to establish reporting parameters based on predetermined ranges for each sensor/monitor. The supervisory circuitry 118 can be hard coded or programmed into the long-range RF transceiver-controller module 100 during manufacturing, can be programmed remotely, or can be a downloadable application. It will be appreciated that other programming methods can be utilised for programming the supervisory circuitry 118 into the RFTC module 100. It will be further appreciated by one of ordinary skill in the art that the supervisory circuitry 118 can be hardware circuitry within the RFTC module 100.

The memory 136 can be provided in one of a variety of standard formats known in the art, for example, random access memory (RAM), read-only memory (ROM), electrically erasable programmable read-only memory (EEPROM), flash memory and the like. The memory 136 can include various memory locations, for example, for the storage of one or more received or transmitted signals, one or more software applications, one or more location data, and the like. Memory 136 can also function to maintain records of transmission and acknowledgment packets in order to avoid duplicate transmissions being broadcast, as well to hold data collected from any associated sensor(s) so that it can be broadcast at later time, for example, when system communications are low. It will be appreciated by those of ordinary skill in the art that the memory 136 can be integrated within the RFTC module 100 itself, or alternatively, can be at least partially contained within an external memory such as a memory storage device.

The RFTC module can further comprise a self-protection health check capability. The self-protection health check module comprises, for example, one or more of methods for:
reconfiguring software;
hardware and RF identification;
time synchronization;
setting, confirming, and/or changing an active schedule for a device associated with the RFTC module, for example, an irrigation schedule for a water management device;
system check operations;
reporting on system activation for a set period of time, for example, the past 24 hours;
communication routing checks and analysis, and
frequency availability and congestion checks.

In one embodiment of the present invention, the RFTC module is configured to accommodate one or more of three specific communication networks and associated protocols. The particular communication network(s) and protocol(s) are selected based on the intended field application of the RFTC module. In accordance with this embodiment, the networks and protocols are selected from a simple network with single retransmission of received signals, a star network with a master/slave hierarchy, or a smart mesh network with master/slave hierarchy and gateway mapping and routing protocols.

In another embodiment, the controller 106 of the RFTC module is programmed with a dynamic channel assignment capability, which facilitates management of RF transmissions within wireless control systems that comprise large numbers of RFTC modules. For example, in a smart mesh network having a star topology with gateway routing, the dynamic channel assignment methodology is as follows. RFTC modules at different levels within the network are configured to operate on three different channels, thus for example, a gateway RFTC module operates on Channel 1, a star RFTC module operates on Channel 2 and a RFTC module that is a slave to the star RFTC module operates on Channel 3. After a time of operation a fourth RFTC needs to enter the system. The last time the RFTC module entered the system, it used Channel 2. By default, therefore, the fourth RFTC uses Channel 2. As this RFTC module starts to communicate, the star RFTC module already operating on Channel 2 will register an increase in the packet loss rate (PLR) as will the fourth RFTC module. The RFTC module that first registers a PLR higher than a pre-determined threshold will start to change channel. The dynamic channel assignment is configured such that when a RFTC module starts up on a channel, the threshold is low but gets increasingly higher the longer the RFTC module stays on the channel. This configuration will force the "intruder" RFTC module to change channel first.

In another embodiment of the present invention, the controller 106 of the RFTC module is programmed to generate and receive two types of signals, a data signal that contains control or sensor data, and an acknowledgment signal. An acknowledgment signal is sent out each time a signal is received by the RFTC module. Both types of signals include, in addition to an address and a cyclic redundancy check (CRC), between 0 to about 25 bytes of data and about one byte of control information consisting of a sequence number and a signal type. An acknowledgment signal contains 0 bytes of data. The sequence number contains a four bits counter that increments after each signal is sent and can be used by the receiver to keep track of which packet it has received.

As depicted in FIG. 2, the long-range RF transceiver-controller module can further be equipped with power management capability 116 to reduce overall power consumption when various portions of transceiver's circuits are not required. For example, the actuating means 114 can be put into sleep mode when they are not used for long periods of time. As a separate example, the receiving portion of the RF transceiver 104 can be powered down when there is no incoming traffic and can be provided with an automatic (timeout) wake-up protocol, or an interrupt driven wake-up protocol from the controller 106. For example, the receiver can be operatively associated with a timer that is set to wake up the receiving portion periodically to listen for network activity. Exemplary listen, sleep, and wake modes are described further below with reference to FIGS. 13G, 13I, and 13J respectively, in accordance with different embodiments of the present invention. As noted above, the RFTC module is configured to transmit and receive RF signals in one or more of the 433, 868 and 915 MHz ISM frequency bands. In one embodiment of the present invention, the RFTC module is configured to transmit and receive RF signals in one or more of the 433, 868 and 915 MHz ISM frequency bands meeting the European (ETSI, EN300-220-1 and EN301 439-3) or the North America (FCC part 15.247 and 15.249) regulatory standards. In a further embodiment of the present invention, the RFTC module is configured to transmit and receive RF signals in the 868 and/or 915 MHz ISM frequency bands.

In an alternative embodiment of the present invention, the RFTC module is also configured to transmit and receive RF signals in the 2.4 or 5.8 GHz ISM frequency band.

A number of suitable RF transceivers that operate in the 433, 868 and 915 MHz ISM frequency ranges are known in the art and are commercially available, for example, from Aerocomm (Kennexa, Kans.), Semtech (Camarillo, Calif.), Amtel (California) and Nordic VSLI ASA (Norway). Such RF transceivers are suitable for use in the RFTC modules of the present invention.

The antenna comprised by the RFTC module can be an omni-directional antenna, i.e. an antenna that radiates energy substantially equally in all directions, or it can be a directional antenna, which radiates energy preferentially in one or two directions. The antenna can be internal to the module, for example an internal printed board antenna, or it can be external. The antenna may also be polarized, namely vertically or horizontally polarised.

Various commercially available antennas may be suitable for use with the RFTC module. Non-limiting examples include, the Patch Antenna and Sector Antenna from Teletronics International Inc. (Rockville, Md.), the Flagpole Stealth Omnidirectional Antenna, NLOS Series Omni Antenna and NLOS Series Sector Directional Antenna from Pacific Wireless (Bluffdale, Utah), the ANT915OMNI Antenna from Trio Datacom (Carrum Downs, Australia), the AO900-3-PTM Omnidirectional Antenna from Trango Systems, Inc (San Diego, Calif.) and the Splatch ANT-916-SP Internal Antenna from Antenna Factor (Grants Pass, Oreg.).

In one embodiment of the present invention, in which the RFTC module is intended for in-ground use, the antenna is a quarter wave, helical stub, quarter wave wire, inverted F or inverted L antenna, which may be vertically or horizontally polarised. In another embodiment, the antenna for in-ground use is omni-directional, unidirectional or bidirectional. In a further embodiment, the antenna for in-ground use is integrated into the module. In a further embodiment, the antenna for in-ground use is printed onto a circuit board comprised by the RFTC module and can be vertically or horizontally polarized. In another embodiment, in which the RFTC module is intended for above ground use, the antenna is a vertically polarised antenna. For above ground use, the antenna can be omni-directional, bidirectional or unidirectional. In one embodiment, the antenna for above ground use is mounted externally to the module.

In accordance with the present invention, the long-range RF transceiver-controller module is capable of transmitting RF signals over a long-range with or without line of sight. In one embodiment, the RFTC module is capable of transmitting RF signals over a distance of about 100 m or more without line of sight and over a distance greater than about 1 km with line of sight. In another embodiment, the RFTC module is capable of transmitting RF signals over a distance of about 250 m or more without line of sight and over a distance greater than about 1 km with line of sight. In a specific embodiment, the RFTC module is capable of transmitting RF signals underground and/or in situations in which the antenna is occluded for a distance of about 100 m or more, for example 250 m or more. In another embodiment, the RFTC module is capable of transmitting RF signals over a distance of about 250 m or more without line of sight and over a distance between about 1.1 km and about 7.5 km with line of sight. In a further embodiment, the RFTC module is capable of transmitting RF signals over a distance between about 5 km and about 15 km with line of sight. In another embodiment, the RFTC module is capable of transmitting RF signals over a distance between about 4.8 km and about 24 km with line of sight.

Experimentation with transmission range and antenna design and orientation has provided transmission ranges, such as a minimum of about 1 km and maximum of about 3 km with a RFTC embedded below ground level without 100% line of sight. With a RFTC embedded below ground level within, for example, a golf course terrain, there has been found transmission ranges from about 700 m to about 2.5 km. A RFTC embedded below ground level with foliage obstruction up to 300 FT, the transmission range has been found to be from about 500 m to about 1.5 km. When a ½ wave antenna is attached to the RFTC that is embedded below ground level, the transmission range has been between about 1.5 km and about 5.5 km without 100% line of sight. The RFTC with ½ wave antenna embedded within a golf course terrain has given transmission ranges from about 900 m to about 3.5 km, and with up to 300 FT of foliage obstruction, about 700 m to about 2.5 km. These transmission range results are further discussed in Example 2 below.

Further investigation into extending transmission range has led to transmission ranges between about 2.2 km and about 12 km with 100% line of sight, and between about 1.7 km and about 9.5 km with some foliage obstruction.

In another embodiment, the RFTC module is capable of transmitting RF signals over a distance of 200 m or more without line of sight. In a further embodiment, the RFTC module is capable of transmitting RF signals over a distance of 300 m or more without line of sight. In other embodiments, the RFTC module is capable of transmitting RF signals over a distance of 400 m or more, and 500 m or more without line of sight. In a further embodiment, the long-range RF transceiver-controller module is capable of transmitting RF signals over a distance of greater than 500 m without line of sight. In other embodiments, the RFTC module is capable of transmitting RF signals over a distance of 600 m or more, 700 m or more and 800 m or more without line of sight.

As noted above, the RFTC module is capable of operating at low power consumption, as well as being capable of transmitting RF signals long-range. Examples of low power consumption as applied to various RFTC components are provided in Example 3.

In accordance with various embodiments of the present invention, the low power consumption and long-range transmission capability are provided by one or more of the following:

- configuring the RFTC module to operate at maximum output power allowed for unlicensed operation under FCC Part 15;
- configuring the RFTC module to utilise Gaussian-frequency shift keying (GFSK) modulation and/or frequency hopping (for example, using a hop rate and timing similar to that used by Bluetooth devices, or other hop rate and timing conducive to achieve a desired range), and operate at a data rate of between about 3 and about 200 kbps (as opposed to the data rate associated with Bluetooth devices which is typically in the range of 1 Mbps). In various embodiments, the RFTC module is configured to operate at a data rate of between about 4 and about 200 kbps; between about 3 and about 100 kbps; about 4 and about 100 kbps; between about 10 and about 100 kbps, and between about 100 and about 200 kbps;
- selecting an antenna that will allow propagation to be maximised over terrain in area of intended use;
- configuring the RFTC module to operate at an average power consumption of 10 µA;
- configuring transceivers antenna orientation to optimize signal transmission by minimizing noise interference and power loss;
- configuring the RFTC module to provide short response time. For example, the RFTC module can be configured to provide an access time between about 1 second and about 10 seconds with 10 µA average operating current (at 2.7 V);
- configuring the RFTC module to utilise routing protocols that offset the exponential increase in communications that occur when a plurality of RFTC modules are utilised in a control network;
- configuring the RFTC module to operate at a data link rate at about 15 dBm output power and receiver sensitivity of about −113 dBm to −120 dBm at 4.8 kbps;
- configuring the RFTC module to utilise a channel bandwidth of about 500 Hz with a data rate between about 3 kbps and up to about 200 kbps.

In a further embodiment, the RFTC module is configured with a sleep/wake-up mode that allows for relaxed network synchronization in that modules do not have to stay on and synchronized for extended periods of time.

Wireless Control System

The present invention further provides for a wireless control system comprising a distributed, self-organizing network of long-range RFTC modules and one or more central controllers, wherein at least some of the RFTC modules in the system are capable of transmitting RF signals over a distance of 100 m or more without line of sight and signals are transmitted within the system based on ad hoc routing protocols. In one embodiment of the present invention, each RFTC module in the system is configured to transmit RF signals over a distance of 100 m or more without line of sight.

The central controller can interface with the rest of the system either through an associated RFTC module, or through a less complex module, such as a RF transceiver operatively coupled to a computing device, for example, capable of receiving and transmitting RF signals in the appropriate range. The system can optionally further comprise one or more repeater nodes, which may be RFTC modules, or less complex modules, that allow for additional transmission coverage.

FIG. 1 depicts schematically an example of a wireless control system 500 according to one embodiment of the invention. The individual RFTC modules 100 within the system 500 communicate with at least one other RFTC and/or with one or more central computing devices 200 that control the activities of the RFTC modules. The network is able to use transmissions in the license free ISM frequency bands because the signals being sent through the network are of low complexity. The use of a central computing device 200 to manage the activity of the network of RFTC modules combined with the use of RF signals in the 433, 868 and/or 915 MHz ISM frequency bands and the low power consumption of the individual RFTC modules allows for an economical and efficient control system with a broad range of applications.

In an alternative embodiment of the present invention, the wireless control system can be configured to also utilise RF signals in the 2.4 or 5.8 GHz ISM frequency band, which allows for more complex signals to be transmitted through a higher frequency.

The individual RFTC modules 100 are distributed geographically within the system 500 such that they are in communication range with each other, for example, within a range of 100 m without line of sight and within a range of 1 km with line of sight. One skilled in the art will understand that the spacing between individual RFTC modules within the system will be dependent on the geographical environment of each RFTC, and distance between the RFTC modules that make up the network need not be uniform. The system can thus comprise RFTC modules that are within 100 m of each other due to line of sight restrictions, as well as RFTC modules that are spaced up to several kilometres apart due to the availability of unrestricted line of sight transmission. In one embodiment of the present invention, individual RFTC modules provide for transmission of signals over a distance of greater than 500 m without line of sight and the individual RFTC modules within the system can, therefore, be distributed with an inter-module distance of greater than 500 m.

Figure 15:
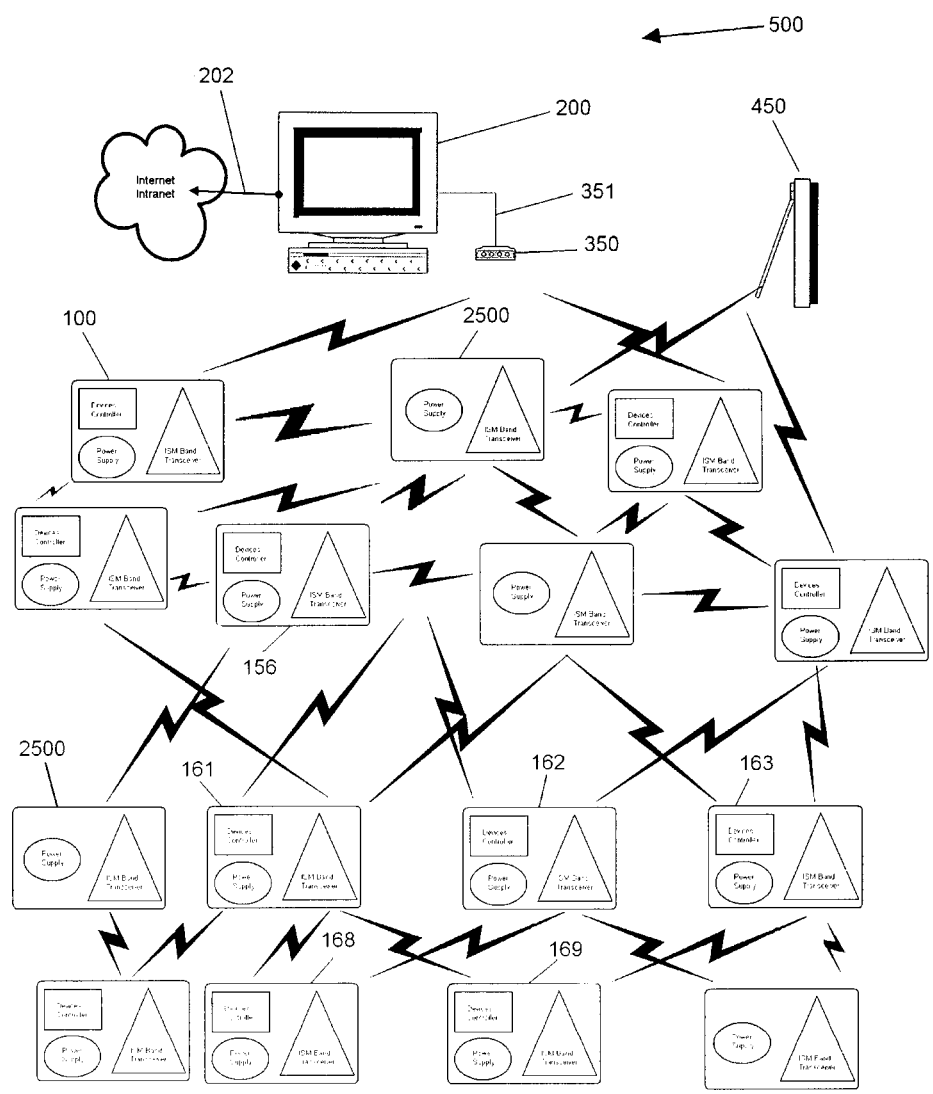
FIG. 15 presents a schematic representation of the topology of a wireless control system in one embodiment of the invention, including the central controller, an optional handheld controller and a number of repeater nodes.

In one embodiment of the present invention, as shown in FIG. 15, the system includes one or more repeater nodes 2500 to provide additional transmission coverage. A repeater node 2500 can be used, for example, where one or more RFTC modules 100 are located outside the transmission range of the central controller, or other RFTC modules that need to communicate. A repeater node can be less complex than an RFTC module as it needs to relay signals only. As such, a repeater node could be used, for example, in a location within the control system where there are no control devices and therefore no requirement for a controller to be at that location. Thus, when a RFTC module associated with a control device is outside the transmission range of the central controller or another RFTC module, a repeater node can be used to bridge the transmission gap.

The control system of the present invention is configured to have a network topology consistent with ad hoc peer-to-peer style transmission of signals within the system. Such topologies include, for example, mesh, ad hoc mesh, mobile mesh, star, cluster tree and various hybrids of these. In accordance with one embodiment of the present invention, the wireless control system is configured to operate based on one of three specific communication networks and associated protocols, which are designed to minimise the number of transmission signals, reduce power consumption and/or reduce RF traffic within the system. The particular communication network(s) and protocol(s) are selected based on the intended field application of the RFTC module. The network is infinitely scalable provided that each module is within communication range of at least one other module in the network.

The three specific communication networks and protocols noted above are selected to accommodate a single RFTC module up to an unlimited number of RFTC modules. Briefly the three communication networks and protocols are: (1) Single retransmission of received signals designed for smaller system applications of about 100 or less RFTC modules in a single RF network (see, for example, FIGS. 10A and 10B); (2) a star network with a master/slave hierarchy, designed for systems with up to about 1000 RFTC modules that requires RF range extension network (see, for example, FIGS. 11A and 11B); and (3) a Smart Mesh Network with mapping of gateways through neighbouring RFTC modules for systems in remote or adverse terrain that require RF range extension, and/or mobile RFTC module control, RFTC application mapping, equipment security, or location telemetry for gaming consoles, or for systems intended for unreliable RF zones/locations/networks (see, for example, FIGS. 12A and 12B). These communication networks and protocols are described in more detail below. The person of ordinary skill in the art will understand that other network configurations and protocols may be considered herein without departure from the general scope and nature of the present disclosure.

The wireless control network comprises a network of long-range RF transceiver-controller modules 100 configured to both transmit and receive RF signals in one or more of the 433, 868, 915 MHz, and 2.4 and 5.8 GHz ISM frequency bands and one or more central controllers in communication with the network of RFTC modules. The routing of the RF signal from a controller to a destination RFTC module is determined on an ad hoc basis by the system and may be direct, if the destination RFTC module is within range, or via re-transmission of the signal by one or more intermediate RFTC modules. The RF signals transmitted from the central controller(s) represent commands to the RFTC modules to execute an event, such as activating or deactivating one or more of the actuating means with which it is operatively associated, collecting data from one or more sensors, or checking the status of the actuating means or sensor(s).

With reference to FIG. 1, the wireless control system 500 comprises a plurality of RFTC modules 100, which are in communication via RF signals with at least one central controller 200. The central controller 200 is operatively associated with a RFTC module 100 to interface wirelessly with the network. The RFTC module can be integrated into the central computing device or can be part of an intermediary device, such as a modem 350. In an alternative embodiment, a less complex module, such as a RF transceiver, can be used in place of the RFTC associated with the central controller. If necessary, the intermediary device can be configured to convert the transmissions between TCP/IP format and wireless network format to provide communications between RFTC modules on the wireless network and the central computing device 200 via TCP/IP. The central controller 200 can further be connected to the internet through a standard connection 202.

The central controller 200 also comprises a processor to process the signals. When the control system is in operation, the RFTC modules 100 transmit signals to the central controller 200 either constantly or at predetermined intervals. Each RFTC module 100 possesses a unique identifier that enables the system 500 to route transmissions from any one module within the system to any other module in the system. A RFTC module 100 that is out of range of the central controller 200 routes its transmission through the intervening RFTC modules using routing protocols until the transmission reaches its destination and vice versa.

By way of example, in the network shown in FIG. 1, the RFTC modules are geographically arranged such that the communication radius associated with each RFTC module overlaps to create a coverage area. Thus an individual RFTC module 156 associated with the coverage area can communicate with another RFTC module 168 in the coverage area through a number of different routing options. For example, three options would be available via intermediate RFTC module 161; via intermediate RFTC modules 163, 162 and 161, and via intermediate RFTC modules 163, 162 and 169.

Figure 5:
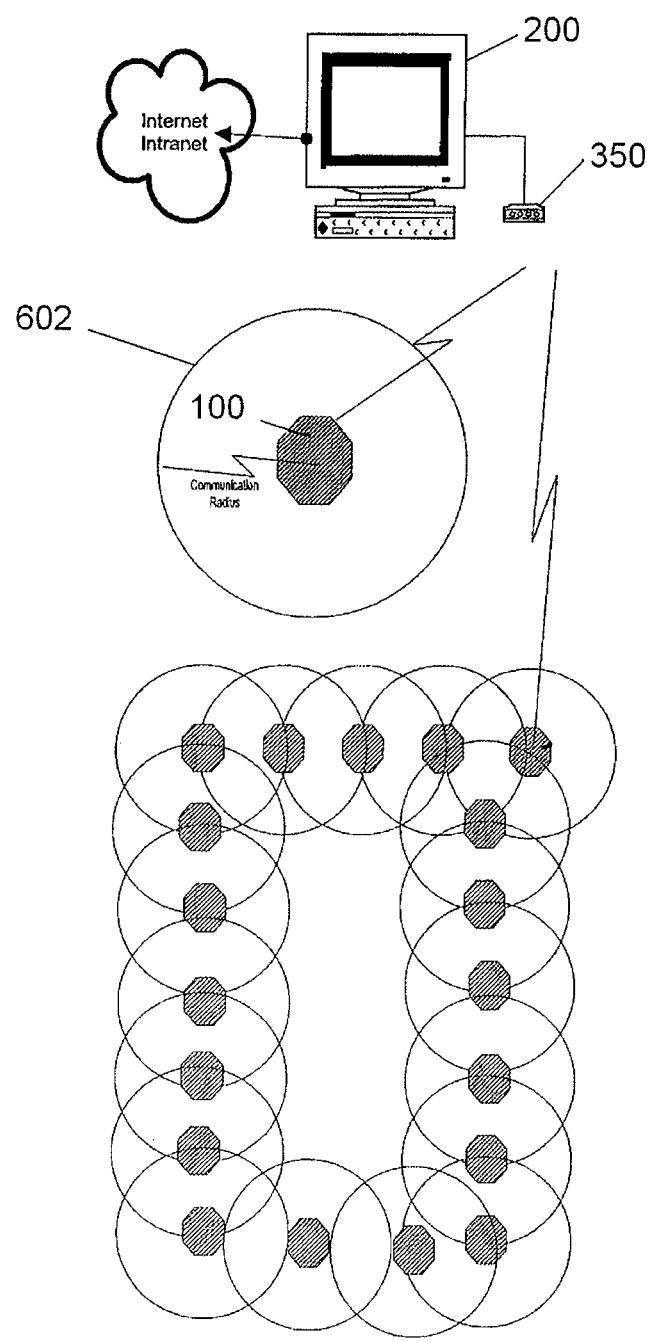
FIG. 5 presents a schematic representation of the overlapping communication radii of individual long-range RF transceiver-controller modules in a wireless control system in one embodiment of the invention.

FIG. 5 depicts an example of an arrangement of RFTC modules in a control system in one embodiment of the invention and illustrates schematically the overlap of the communication radius 602 of each RFTC module 100 with neighbouring RFTC modules. Central controller 200 needs to communicate only with the most proximal of the RFTC module(s), which will in turn route the signal via other RFTC module(s) within its communication radius 602. Subsequent RFTC modules continue to re-transmit the signal until it ultimately reaches its target RFTC module. The topology of the network of RFTC modules thus allows for an extended reach for the control system even when the communication radius of each module is limited.

Typically, and with reference to the RFTC module depicted in FIG. 2, the system handles transmitted signals as follows. A RFTC module 100 receives an incoming signal via the antenna 102 and passes the signal on to the controller 106, which evaluates the signal to determine whether the identifier matches the identifier of that particular RFTC module. If the intended recipient is the RFTC module itself, the RFTC module then prepares the appropriate response, such as activating an associated actuating means or collecting data from a sensor or monitor. If the intended recipient is not the RFTC module itself, the controller 106 then prepares the signal to be re-transmitted to the intended recipient module. The controller 106 determines the best route to the destination, based on its knowledge of the positions of other RFTC modules in the network and re-transmits the signal as necessary. The best route can be determined, for example, by the smallest number of intermediate modules, by modules with the maximum power available, by the most reliable links or by a pre-established routing protocol. The transmitting RFTC module awaits confirmation of receipt of the signal. If confirmation is not received, the RFTC module attempts to re-transmit the signal. When confirmation is received, the processing for the signal is completed. This routing process allows for the transmission of data around obstacles, such as buildings or metal structures that may block RF signals. The supervisory circuitry for supporting the operation of each RFTC module can be implemented in software or in firmware that is stored in a memory, such as memory 136. The controller 106 executes the instructions stored in the memory to carry out the signal interpretation and transmission functions of the RFTC module 100.

The data transmitted from the RFTC modules 100 to the central controller 200, in FIG. 1, can include status information, power levels and/or it can include data gathered from any connected sensors. In one embodiment of the present invention, a RFTC module can periodically sample one or more sensor or monitor to obtain sensor/monitor data for processing by controller 106 and/or transmission. Processing of the data can include, for example, statistical analysis (average, median, standard deviation and higher order correlations), linear regression, linear approximation and other mathematical modelling processes to facilitate the end use of the data. The processed data can be stored in memory 136 and accumulated over a pre-determined period of time and then transmitted, or it can be transmitted directly after processing. Data compression can be performed if required to reduce the data transmission requirements and/or to facilitate the end use of the data. Compression can include differential coding within a channel or jointly between multiple correlated channels. Similarly, the data can be filtered prior to transmission, for example, by noise reduction, cross-channel interference reduction, missing sample interpolation and other signal processing to enhance the quality of the data.

The data thus processed can be transmitted to other RFTC modules, to the central controller(s) or to any mobile module incorporated into the system, as described below. The data can be transmitted on a pre-determined schedule, when the accumulated data reaches a pre-determined size or when requested by a central controller or an auxiliary mobile controller. When the data is delivered on a schedule, the memory 136 or controller 106 of transmitting RFTC module is programmed with the address of the RFTC modules or controllers that are to receive the data as well as the schedule for delivery. When data is delivered on request or on command, the request or command sent to the transmitting RFTC module contains the address of the requesting module/controller.

Depending upon the size of the system 500 and the power of the central controller 200, the system can be organised such that certain RFTC modules 100 act as "reporter-nodes" to collect data from surrounding modules and transmit this data to the central controller 200, as well as receiving and transmitting signals from the central controller 200 and distributing these to surrounding RFTC modules, in order to reduce the volume of incoming transmissions. Each RFTC module 100 of the network, however, remains independent and can send and receive transmissions independently. In one embodiment of the present invention, the RFTC modules 100 are in constant communication with the central controller 200 and the control system is dynamic allowing for real time control.

The central controller 200 can be, for example, a personal computer, dedicated server, PDA, laptop or other sufficiently powerful electronic information processing device. The central controller 200 may be part of a multi-layered communication network such as a communications node to communicate, for example, with several data termini in a connected wired network, as well as with the wireless network. As such, central controller 200 can serve as a wireless access point, a wireless access server, or another type of wireless device providing access to the wireless network. The central controller 200 can optionally further comprise other function performing devices such as printers, stationary scanners, and the like. In one embodiment, the central controller 200 is connected to an intranet or to the internet. In another embodiment, the central controller is programmed to interface with, for example, a smart phone/PDA or a Blackberry to allow the central controller to be controlled remotely from a mobile unit.

Figure 3:
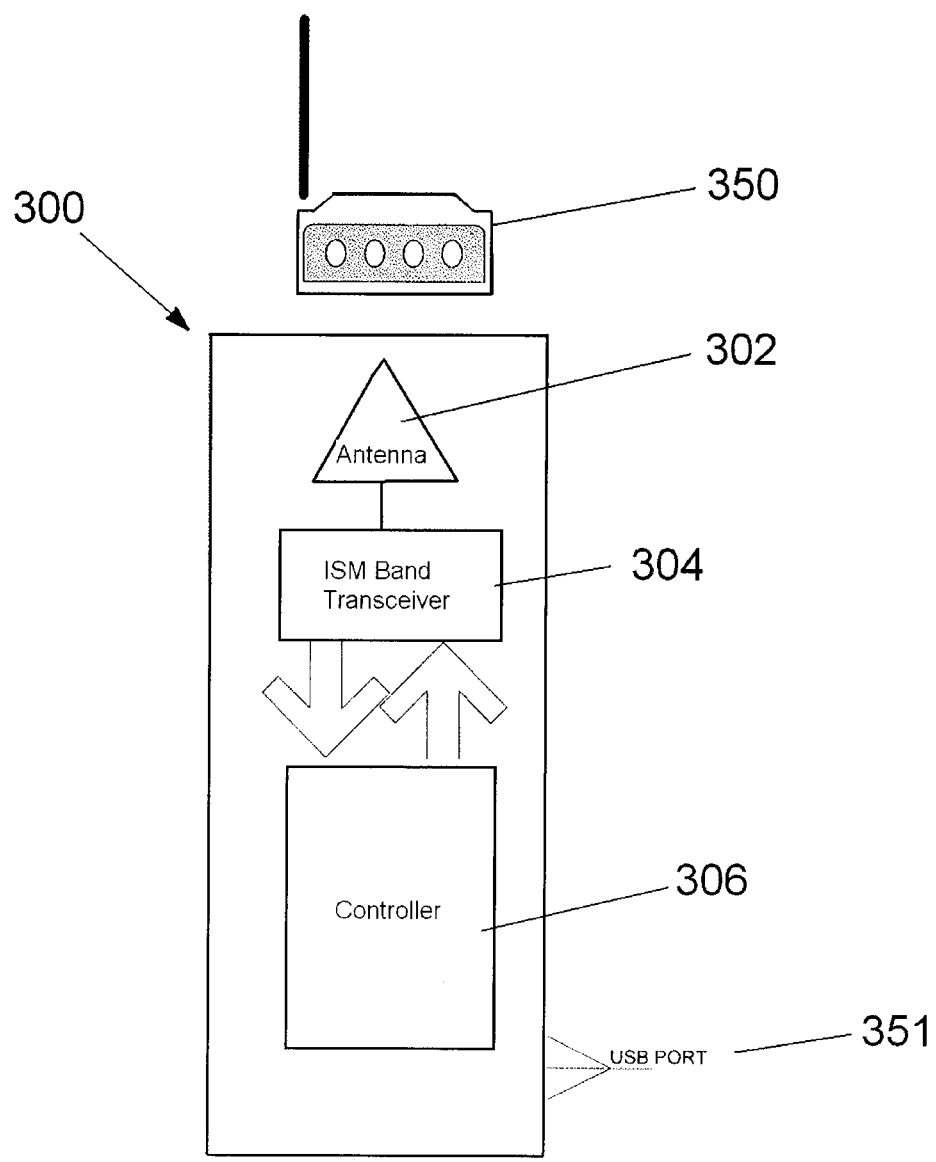
FIG. 3 is an electronic block diagram of a long-range RF transceiver-controller module incorporated into a wireless modem for use with a central controller in one embodiment of the invention.

In one embodiment of the present invention, the central controller 200 interfaces with the wireless network through a wireless modem 350 illustratively depicted in FIG. 3, that comprises a long-range RFTC module 300, or other module capable of receiving and transmitting RF signals in the appropriate range. In one embodiment, the modem 350 comprises a RFTC module 300 and is hard-wired to the central computing device through, for example, a USB port 351.

Various modems known in the art are suitable for use in the control system. In one embodiment, the modem used in the wireless control system is a high-speed non-line of sight (NLOS) wireless connection capable of operating in the lower frequency 900 to 928 MHz band. An example of such a modem is the WaveRider EUM3000-4 NLOS modem (WaveRider Communications Inc, Toronto, Canada).

The present invention also contemplates the inclusion of one or more mobile modules in the wireless control system. Mobile modules comprise a long-range RF transceiver-controller module 100, or a less complex module capable of receiving and transmitting RF signals in the appropriate range, and can be equipped with a user interface suitably configured with software to accept operator input including, for example, one or more of pushbutton controls, switches, an alphanumeric keypad, LED indicators, and a display screen. Mobile modules can be, for example, a portable wireless device, such as a laptop, mobile phone, PDA, or Blackberry, comprising a RF transceiver or RFTC module 100 configured to communicate with other modules in the system. In addition to various hand-held devices, the present invention also contemplates that the mobile module could be installed in vehicles, worn by a user/operator, or generally installed in a manner that causes the device to be mobile. In one embodiment, the mobile module is a hand-held device, as depicted generally at 450 in FIG. 1. In another embodiment the mobile device functions as an auxiliary hand-held controller.

Figure 4:
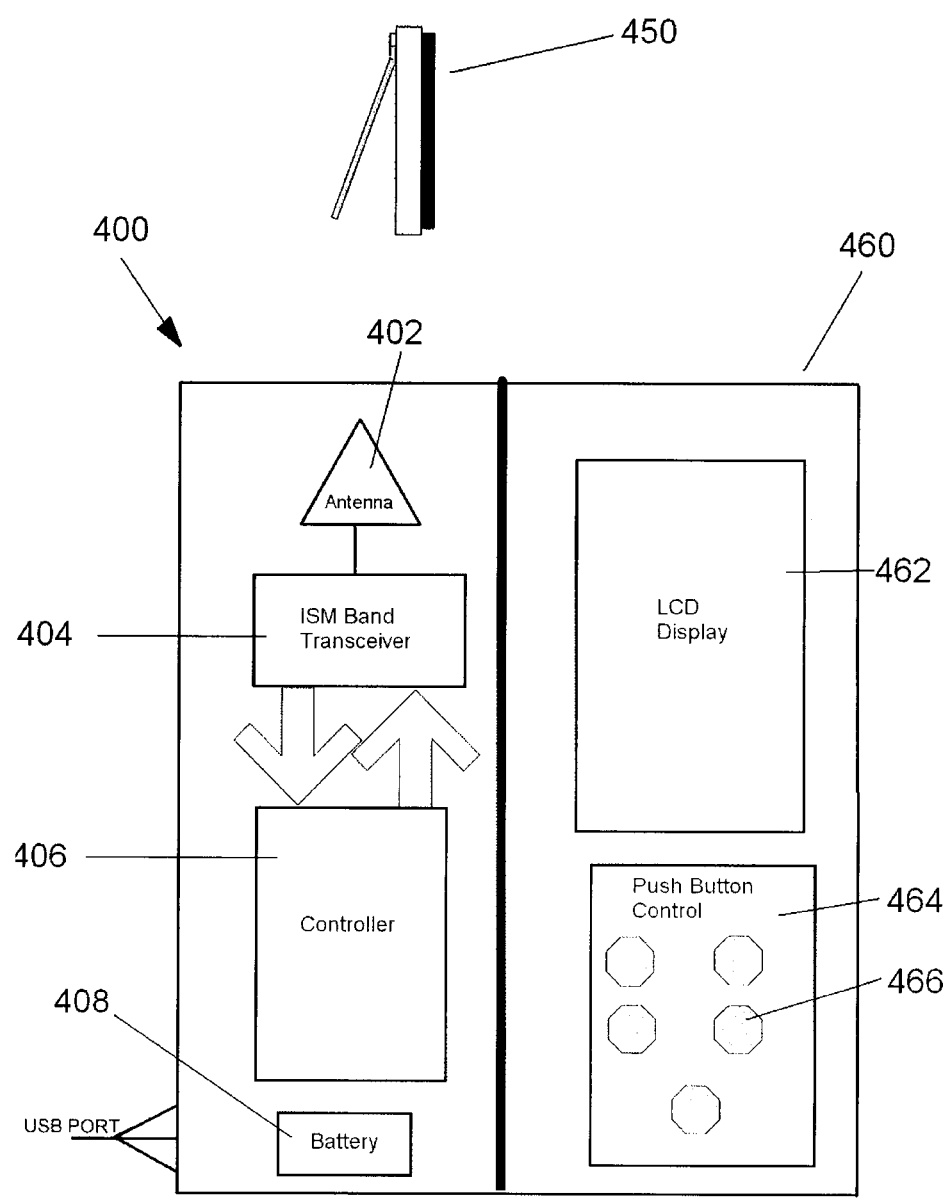
FIG. 4 is an electronic block diagram of a long-range RF transceiver-controller module incorporated into a handheld controller in one embodiment of the invention.

An example of a mobile module that is a hand-held device is shown in FIG. 4. As shown in FIG. 4, the hand-held controller 450 comprises a RFTC module 400, which in turn comprises an antenna 402, a RF transceiver 404 configured to transmit and receive RF signals in the ISM frequency band, a controller 406, a power source 408 and a user interface, shown generally at 460. The user-interface can comprise a display screen 462 for displaying program information and a keypad 464 comprising a plurality of keys 466 for entering data into the hand-held controller 450 and for control of the hand-held controller 450 by the operator. The display screen 462 can be a liquid crystal display (LCD), for example, a reflective super-twist LCD.

Mobile modules can be configured for a variety of applications within the control system, for example, for manual control of the operation of individual RFTC modules, manual control over or override of commands initiated by the central controller 200, real time mobile monitoring of the control system, and providing telemetry information for navigation. In order to accomplish these tasks, mobile modules can transmit to and receive data from the central controller 200 or from individual RFTC modules 100 as required. Mobile modules can also be configured to exchange signals with other nearby RFTC modules and use the information to triangulate the physical location of the mobile module relative to the rest of the system, for example by measuring RF signal strength between the mobile module and the surrounding RFTC modules.

Power conservation can be an important feature for control systems, for example, when the RFTC modules are powered by battery, or by solar power. As described above, one embodiment of the present invention provides for RFTC modules that are equipped with power management capability to reduce overall power consumption wherein various portions of transceiver's circuits can be put into sleep mode when they are not in use. The present invention contemplates various power conservation options for the wireless control system. For example, all the RFTC modules can be powered down at once when there is no activity in the network, or when the control system is not required for a certain period of time. Alternatively, individual RFTC modules within the network can be powered down on a cyclic schedule, such that some RFTC modules are always powered up in order to listen for, and transmit, signals.

Another option includes the powering down of certain subsets of RFTC modules within the system, which could also be on a cyclic schedule such that each RFTC module in the system is powered down at some point in the cycle. In the former instance when all RFTC modules are powered down at once, when signals are to be transmitted, a synchronisation event can be used to synchronously bring all RFTC modules out of a powered down state and restore end-to-end network connectivity. The synchronisation event can be a command generated by the central controller 200, by an auxiliary controller, such as a hand-held device comprising a mobile RFTC 450, or by the individual controller 106 within the RFTC module. The event can be time based, for example, a period of time determined by an operator or set by a pre-determined schedule that can be programmed into the central controller 200, auxiliary controller or the controller 106 of the RFTC module. Alternatively, the controller 106 can be programmed to wake up the RF receiver 104 periodically to listen for a synchronisation signal generated by the central controller 200, or auxiliary controller. After a pre-defined period or the receipt of a power-down signal, the RFTC modules can power down. One example of the use of a synchronisation event to establish a communication path between components of the control system is shown in the flow charts presented in FIGS. 13A-L and described in more detail below.

To assist in signal routing and also to allow the control system to recognise the location of individual RFTC modules within the system, it can be beneficial to be able to determine the relative geographical position of each RFTC module. Accordingly, in one embodiment of the present invention, the wireless control network allows for determination of the relative position of RFTC modules within the system by measurement of the RF power received and transmitted from each RFTC module. RF power drops off by the square of the distance from the source, therefore, measurement of the RF power of a received signal defines a distance radius around the receiver within which the source can be located. By triangulating the measured RF power from multiple RFTC modules and/or mobile modules, the position of an individual RFTC module or mobile module can be determined. For example, a RFTC module may transmit a signal that indicates the measured transmit power. Each RFTC module that receives this measurement signal can measure the transmit power and report this back to the transmitter RFTC module. The transmitter RFTC module processes the received information and calculates the relative position of each RFTC module in the network from which it has received information. The processed data provides the relative positions of the modules, which can be converted into physical positions based on the known physical positions of at least two RFTC modules in the network, which are used to orient and scale the relative positions.

Scheduled Transmissions

The wireless control system can further be configured to implement a scheduled transmission protocol in order to conserve power further. A non-limiting example of a scheduled transmission protocol is as follows: the RFTC module 100 is allocated a transmission slot by the central controller 200 by way of a signal sent from the central controller 200 that contains the timing information for the next scheduled signal transmission. After the RFTC module 100 receives and acknowledges the signal containing the timing information, the RFTC module 100 powers down until the next scheduled time slot.

The central controller 200 and the RFTC module 100 can also negotiate the next scheduled time slot, for example, the central controller 200 can publish its available timeslots to the RFTC module 100. The RFTC module 100 processes the information and compares the information with its own available timeslots, selects a desired timeslot and sends an acknowledgment signal to the central controller 200 to confirm the selected timeslot. Thus, the central controller 200 and the RFTC module 100 can schedule a time slot on an ad hoc basis, depending on the response time requirements of the application. During the communication between the central controller 200 and the RFTC module 100, the start time of the next timeslot is determined so that the RFTC module 100 can power down until the next scheduled transmission time. To further reduce power requirement, the RFTC module 100 is capable of maintaining a sufficiently accurate time base to ensure that transmissions can be synchronised. Synchronisation of all RFTC modules in the network can be enhanced by periodically broadcasting a synchronisation signal from the central controller 200 or the auxiliary controller throughout the system at a time when all RFTC modules are scheduled to be listening, thus allowing all RFTC modules in the system to synchronise their time bases. To ensure all RFTC modules in the network receive the synchronisation signal, nodes that receive the synchronisation signal can re-transmit the signal for RFTC modules that are not in range of the central controller 200. Such synchronisation signals can optionally be acknowledged by the RFTC modules that receive them.

Another example of a scheduled transmission protocol is as follows: the RFTC module 100 schedules a transmission slot. The other RFTC modules, central controller, auxiliary controller and/or the sensor(s) associated with the RFTC module send a signal to the RFTC module at the scheduled time and the RFTC module receiver responds to the signal with an acknowledgment signal, which terminates the transmission time slot. The acknowledgment signal contains the timing information for the senders next scheduled signal transmission and the next frequency of transmission (if frequency hopping is used). If the RFTC module wants to communicate with another node in the system, such as another RFTC module, the central controller, or the auxiliary controller, the RFTC module sends a signal to the node after receiving a signal from the node, but before sending the acknowledgment signal that terminates the time slot. In this instance also, the RFTC module can sleep until the next scheduled transmission slot, thus saving power.

Network Topologies and Routing Protocols

As described above, the wireless control system can be configured to have one of a number of network topologies. In accordance with one embodiment of the present invention, the wireless control system is configured to operate based on one of three specific communication networks and associated protocols. These communication networks and associated protocols are described below.

1. Single Retransmission of Received Signals

Figure 10A:
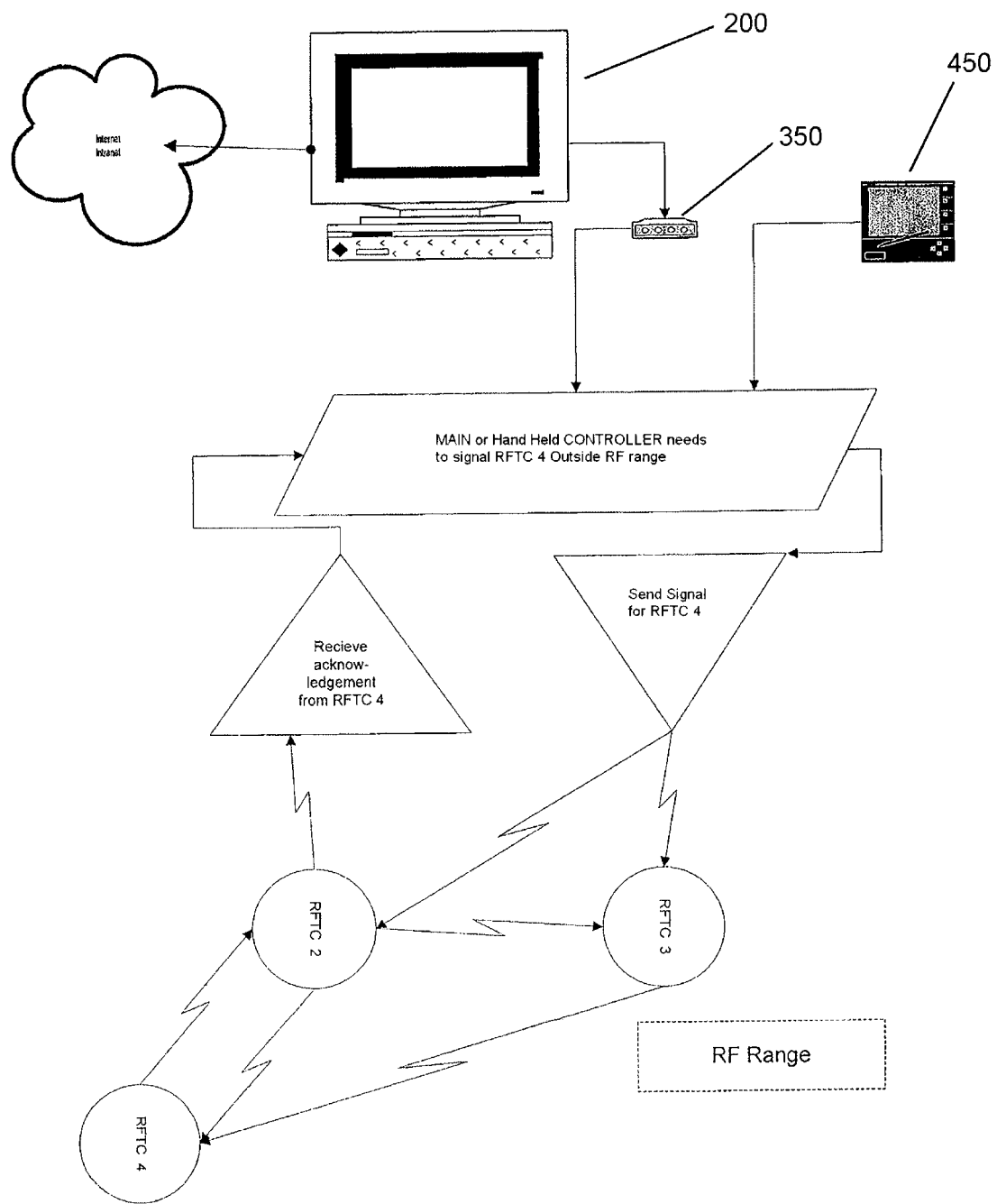
FIG. 10A presents a schematic representation of a single transmission of a received signal within a wireless control system in accordance with one embodiment of the present invention.

An example of a single retransmission network is shown in FIG. 10A. In this simple network approach, all RFTC modules re-transmit received signals not addressed to them once. The link layer makes sure that previously received signals are identified, avoiding infinite retransmissions. This necessitates that memory 136 of the RFTC module stores recently received signal identity information.

Figure 10B:
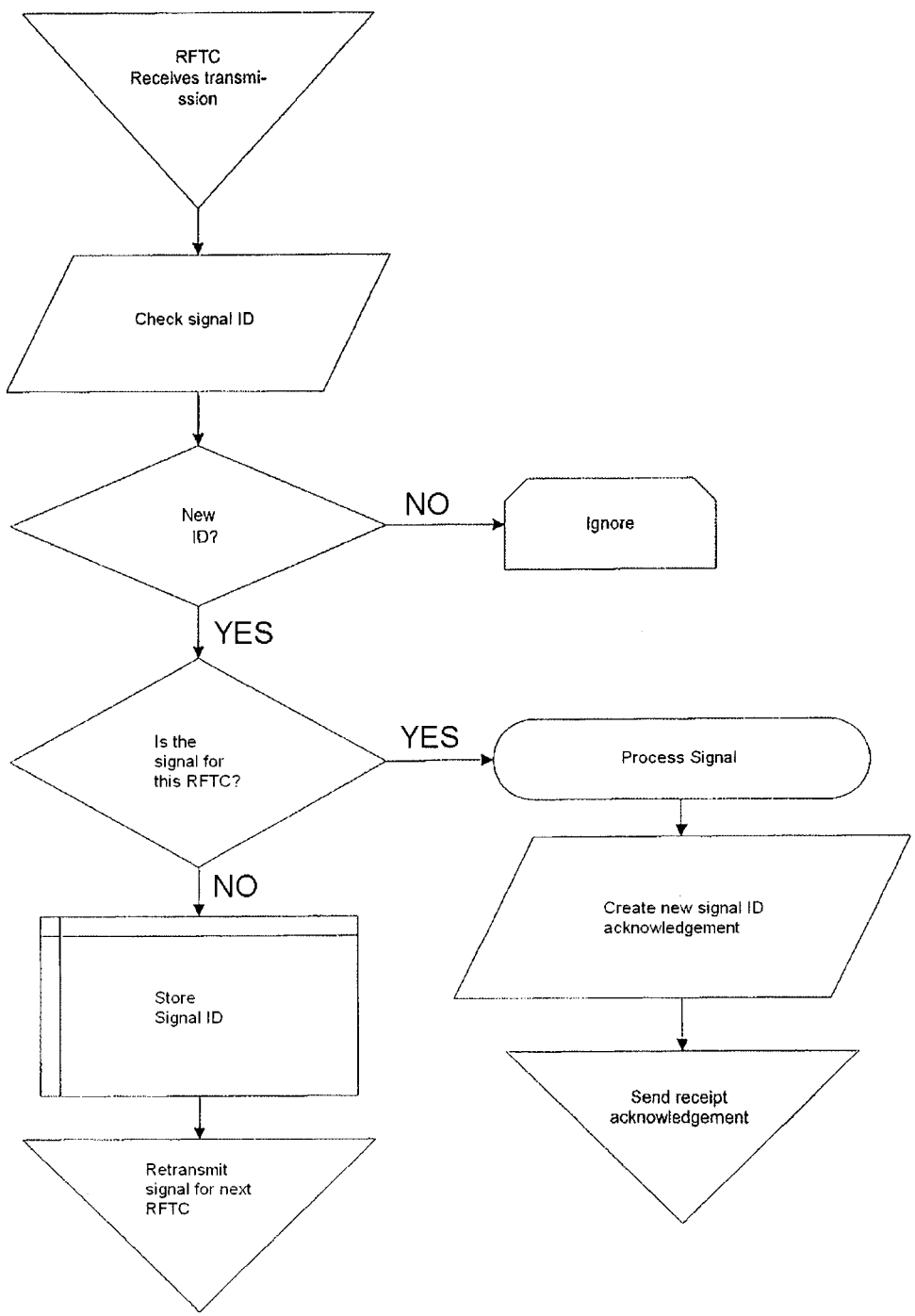
FIG. 10B presents a flow chart illustrating a single transmission of a received signal within a wireless control system in accordance with one embodiment of the present invention.

The flow chart provided in FIG. 10B shows the typical routing protocol for a signal within this type of network. Described below is an example of a typical basic network scenario in which the central controller 200 needs to alert RFTC 4, which is outside its transmission range. The course of action is as follows:

1. Central controller 200 generates and transmits a signal to RFTC 4, requesting acknowledgment;
2. RFTC 2 and RFTC 3 are the only recipients, as RFTC 4 is outside radio range of central controller 200;
3. RFTC 2 and RFTC 3 identify the recipient address to be another node;
4. RFTC 2 and RFTC 3 re-transmit the signal at a random time instant, remembering the signal ID to prevent multiple retransmissions;
5. Central controller 200 receives the retransmitted signal and discards it as a retransmitted version of it's original transmitted signal;
6. RFTC 4 receives a retransmitted signal from RFTC 2 and RFTC 3 (depending on which of the two modules retransmitted the signal first);
7. RFTC 4 recognizes itself as recipient and transmits an acknowledgment signal addressed to central controller 200;
8. RFTC 4 receives the second retransmitted signal from RFTC 2 or RFTC 3, and ignores it as already being processed;
9. The nodes RFTC 2 and RFTC 3 are the only recipients of the acknowledgment signal from N4, as RFTC 4 is outside radio range of central controller 200;
10. RFTC 2 and RFTC 3 identify recipient address to be another node;
11. RFTC 2 and RFTC 3 re-transmit the acknowledgment signal to central controller 200 at a random time instant;
12. RFTC 4 receives the retransmitted acknowledgment signal and discards it as a copy of the recently transmitted signal;
13. Central controller 200 receives a retransmitted acknowledgment signal from RFTC 2 or RFTC 3 (depending on which of the two nodes that retransmitted the signal first);
14. Central controller 200 recognizes itself as recipient of the acknowledgment signal, ending the communication with central controller 200;
15. Central controller 200 receives the second retransmitted acknowledgment signal and discards it as a copy of the previously received signal.

In total, 6 signals are sent in order to achieve a successful acknowledgment of a transmitted signal.

2. Star Network with Master/Slave Hierarchy

Figure 11A:
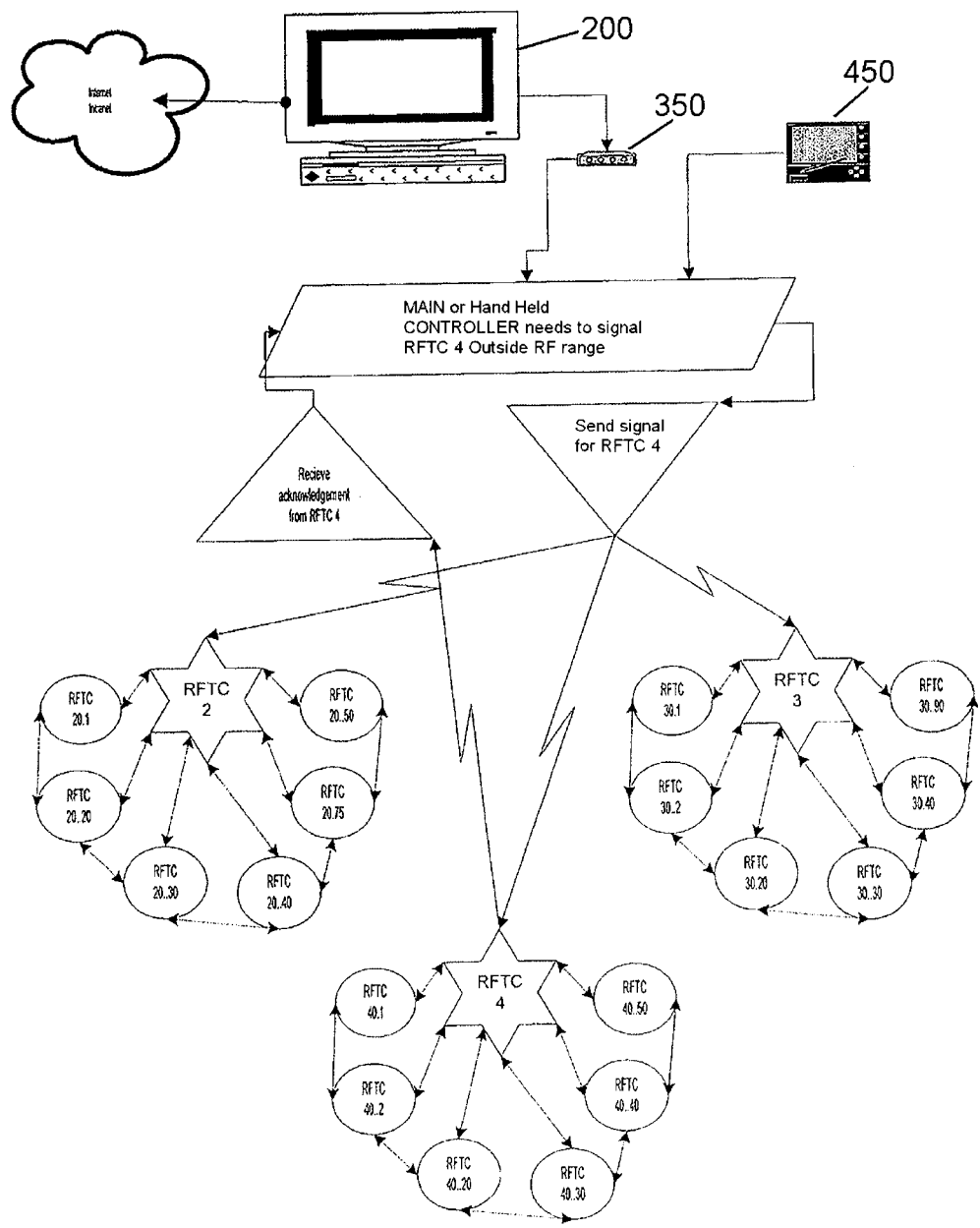
FIG. 11A presents a schematic representation of transmission of a signal within a wireless control system in accordance with one embodiment of the present invention in which the system has a star network topology and master/slave communication.

An example of this communication network is shown in FIG. 11A. In this network, all communication is directed via a star RFTC module, which re-transmits the information to the destination RFTC module. The star RFTC module (or "master") acts as a relay station and is therefore positioned within radio range of all modules in the "star" (the "slave" RFTC modules). In this network, the radio range of the RFTC modules in the network can be as much as doubled.

Figure 11B:
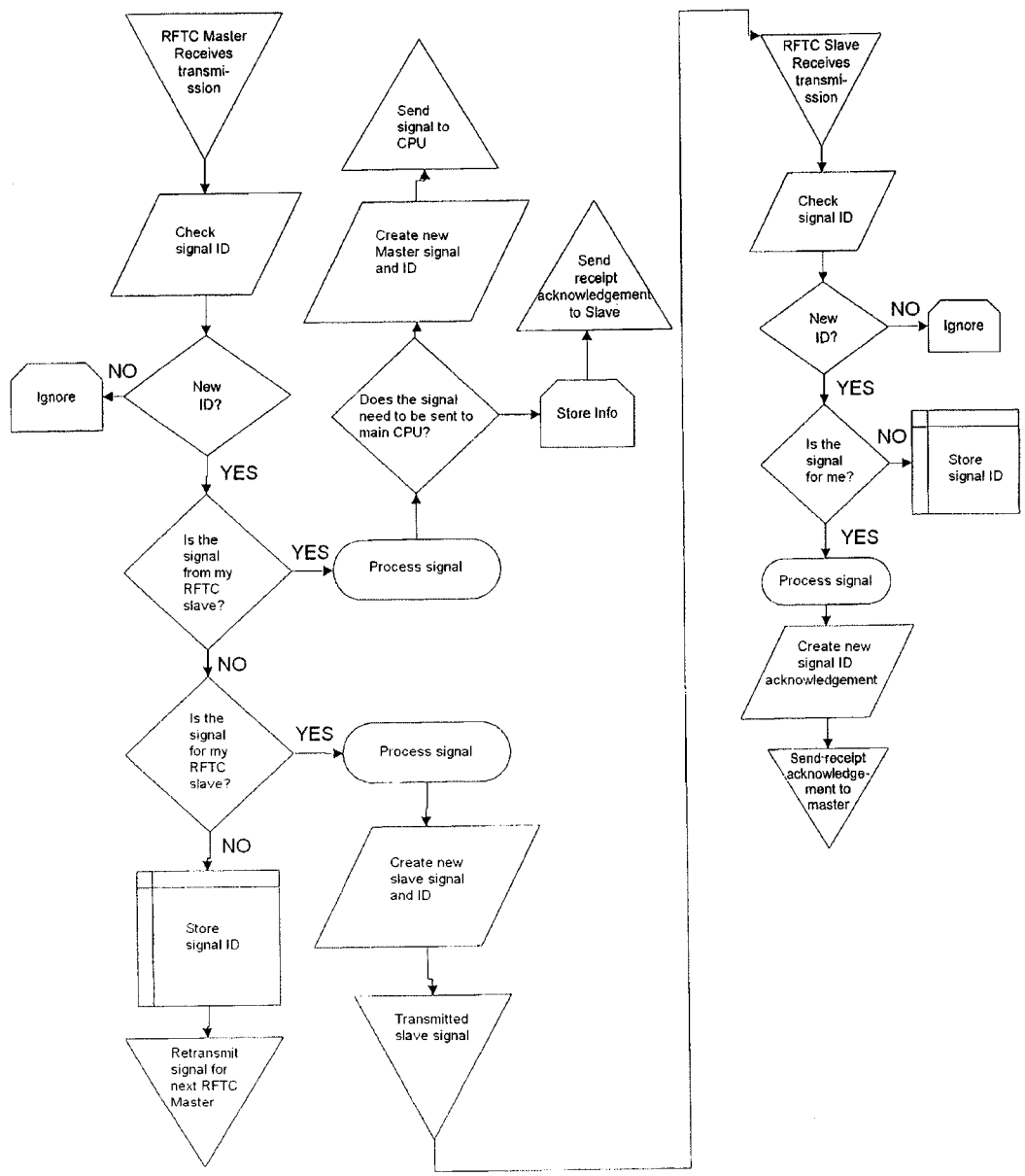
FIG. 11B presents a flow chart illustrating transmission of a signal within a wireless control system in accordance with one embodiment of the present invention in which the system has a star network topology and master/slave communication.

The flow chart presented in FIG. 11B shows the typical routing protocol for a signal within this type of network. Described below is an example of a basic network scenario in which central controller 200 needs to alert RFTC 40.40, which is outside its transmission range. The course of action is as follows:

1. Central controller 200 generates and transmits a signal to RFTC 4, requesting acknowledgment;
2. RFTC 2 and RFTC 3 ignore the signal as they are not the designated recipients;
3. RFTC 4 recognizes itself as recipient and transmits an acknowledgment signal addressed to central controller 200;
4. RFTC 2 and RFTC 3 ignore the signal as they are not the designated recipients;
5. Central controller 200 recognizes itself as recipient of the acknowledgment signal from RFTC 4, ending the communication with central controller 200;
6. RFTC 4 re-transmits the signal to RFTC 40.40 without delay (provided there is no other channel traffic);
7. RFTC 40.40 recognizes itself as recipient of the retransmitted signal and transmits an acknowledgment signal addressed to RFTC 4;
8. RFTC 2 and RFTC 3 ignore the signal as they are not the designated recipients;
9. RFTC 4 recognizes itself as recipient of the acknowledgment signal from RTC 40.40, ending communication.

In total, 4 signals are sent in order to achieve a successful acknowledgment of a transmitted signal, which is considerably less than in a multi-hop communication system, which would require transmission of between 14 and 18 signals to achieve successful acknowledgment of a transmitted signal.

Multiple "slave nodes" can be added to this type of network, thus increasing coverage distance for each RFTC module and reducing transmission and power requirements as one Star RFTC can communicate directly with an unlimited number of slave RFTC modules provided they are within the RF range.

3. Smart Mesh Network (Mapping of Gateways Through Neighboring Nodes)

A smart mesh network is more bandwidth efficient and is based on the RFTC modules having the ability to "learn" the existence of the other RFTC modules in the system, including RFTC modules outside its own radio range. The information is stored in a table, which is updated on an ongoing basis as the network is established, and also when communication is lost between two RFTC modules during normal operation. The table has the following principal organization and information content:

| Active nodes in the application network | Which node within radio range is the gateway to the network node in the left column |
| --- | --- |
| 1 | X |
| 2 | Y |
| ... | ... |
| N | Z |

Two different signal types are used in the network—Network mapping signals and Application communication signals. When a network mapping signal is sent, each RFTC module intercepting the signal answers with its address and a list of RFTC modules with which it is able to communicate. This enables the transmitting RFTC module to build a table in which gateways to RFTC modules outside radio range can be identified. If two RFTC modules both provide a gateway to the same distant RFTC module, the first network mapping signal received decides the gateway module.

When an RFTC module transmits a signal to a dedicated RFTC module, the RFTC module has two options; either sending the signal directly to the recipient (if it is within radio range) or via a gateway RFTC module. If the recipient RFTC module is within range, network traffic is limited to only two signals; the information signal, and the resulting acknowledgment signal from the recipient. If the signal has to pass through a gateway RFTC module, the number of signals is doubled. Normal procedure is that the gateway RFTC module sends an acknowledgment signal to the signal originator, taking over the responsibility of the transmission. The gateway RFTC module then transmits the signal to the recipient (or via another gateway RFTC module) closing the transmission upon receipt of an acknowledgment signal. If a recipient RFTC module has moved out of range, or is obscured by a noise source, the signal transmission chain is broken. If a RFTC module fails to receive an acknowledgment signal within a predefined time period, it initiates the mapping procedure in order to rebuild a valid communication table. This enables the establishment of an alternative signal transmission path through the network. For a relatively stable network, mapping traffic is significantly lower than the normal communication traffic.

A typical network topology mapping sequence that is performed by all RFTC modules in the system is as follows:

RFTC module A transmits a network mapping signal asking: "Who can hear me, and who can you communicate with?"

All RFTC modules receiving the signal respond with a signal indicating "I can hear you, and I can communicate with nodes; X, Y, Z . . . "

RFTC module A updates its network gateway table.

The above sequence is repeated until the content of all tables is stable.

In this type of network, the communication path is known at transmission and the system response time is, therefore, kept at a minimum.

Figure 12A:
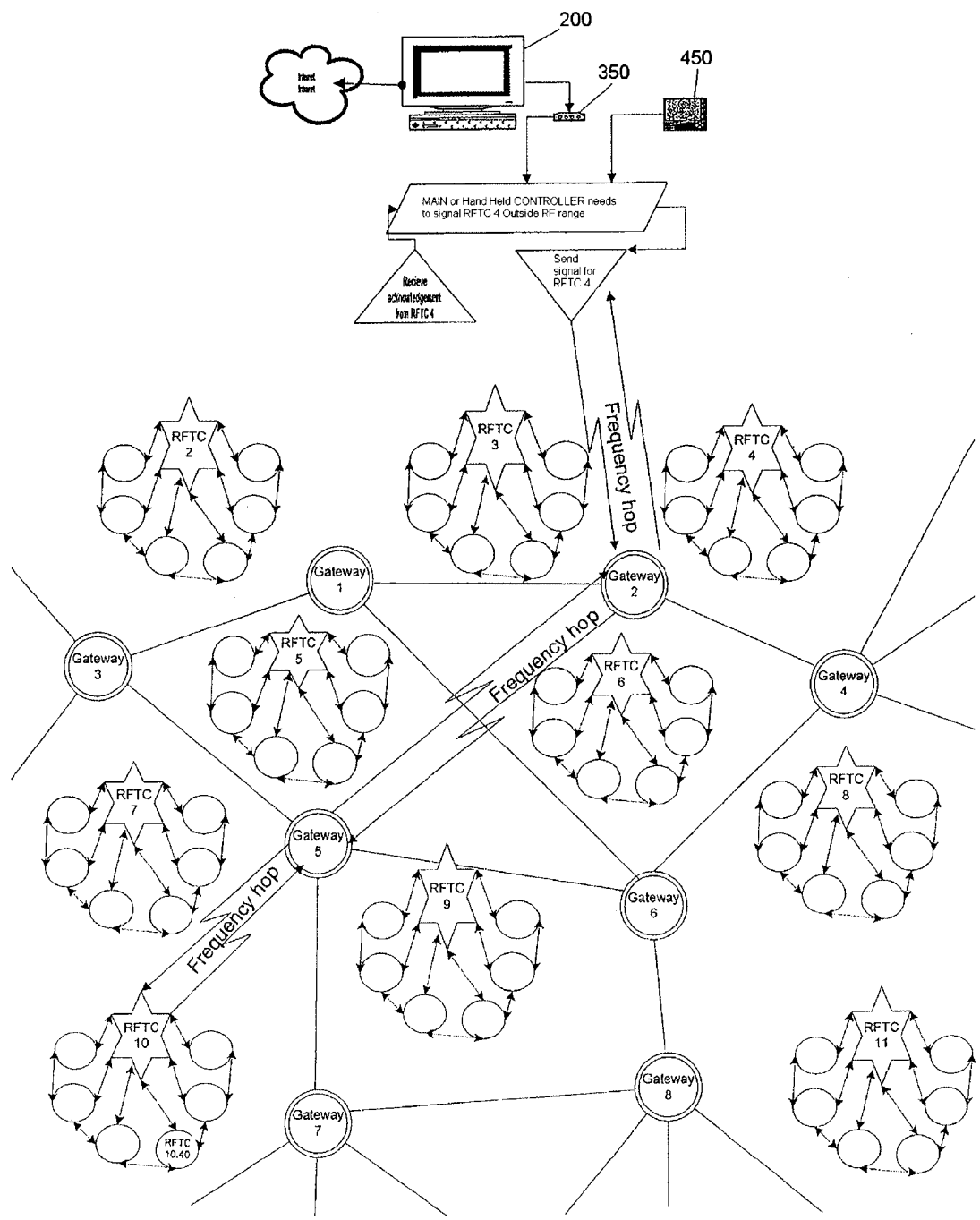
FIG. 12A presents a schematic representation of transmission of a signal within a wireless control system in accordance with one embodiment of the present invention in which the system has a star network topology, master/slave communication and gateway mapping and routing.
Figure 12B:
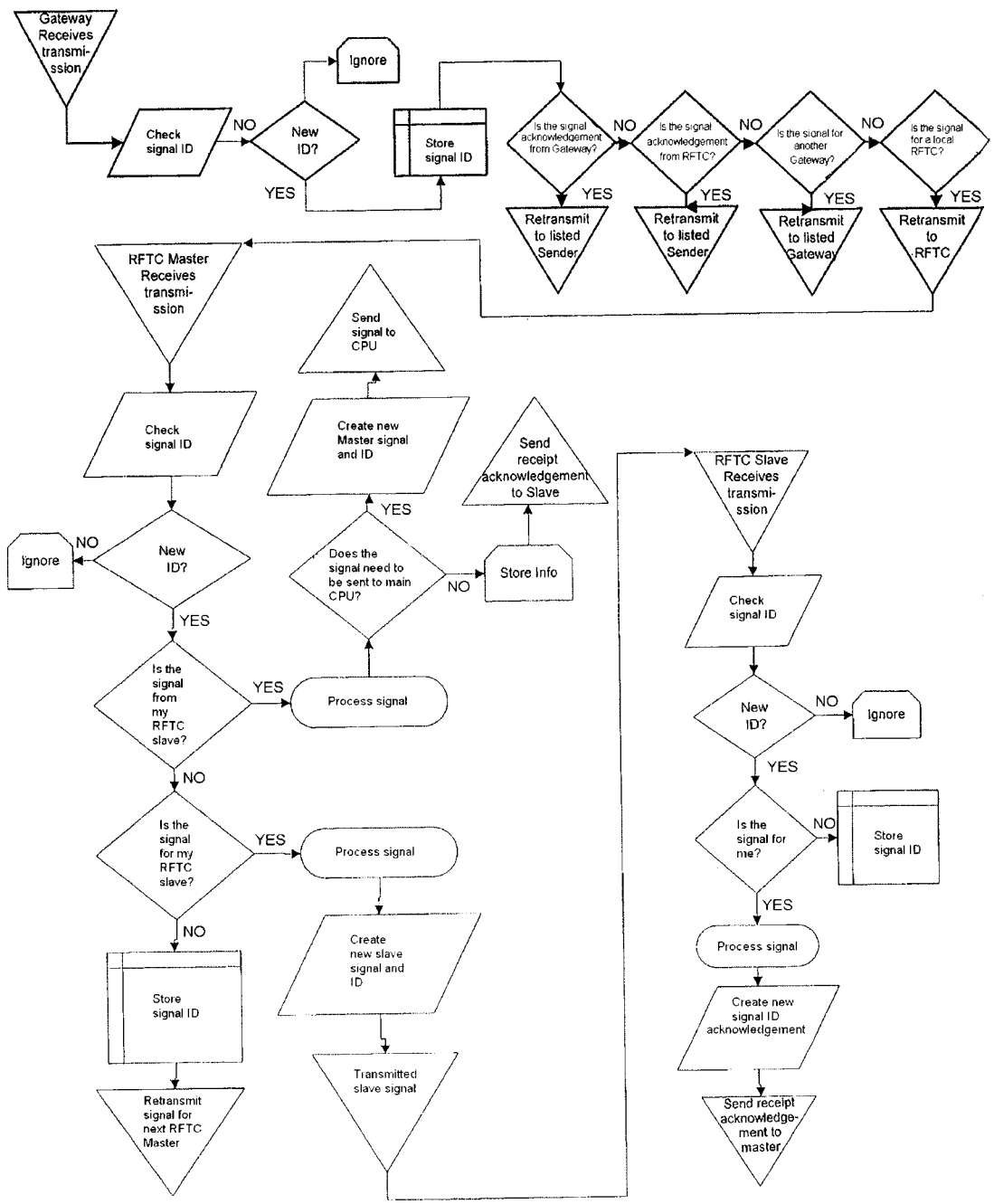
FIG. 12B presents a flow chart illustrating transmission of a signal within a wireless control system in accordance with one embodiment of the present invention in which the system has a star network topology, master/slave communication and gateway mapping and routing.

An example of this communication network is shown in FIG. 12A and the flow chart presented in FIG. 12B shows the typical routing protocol for a signal within this type of network. Described below is an example of a communication sequence in which central controller 200 needs to communicate with RFTC 10.40, which is outside its transmission range. The course of action is as follows:

1. Central controller 200 generates and transmits a signal to RFTC 10 requesting acknowledgment. Mapping protocols route the signal through gateway RFTCs 2 and 5;
2. All other gateway RFTCs and other RFTCs ignore the signal as they are not the designated recipient;
3. RFTC 10 recognises itself as recipient and transmits an acknowledgment signal addressed to central controller 200. Mapping protocols route the signal through gateway RFTCs 2 and 5;
4. All other gateway RFTCs and other RFTCs ignore the signal as they are not the designated recipient;
5. Central controller 200 recognises itself as recipient of the acknowledgment signal from RFTC 10, ending the communication with RFTC 10;
6. RFTC 10 re-transmits the signal to RFTC 10.40 without delay (provided there is no other channel traffic);
7. RFTC 10.40 recognises itself as recipient of the retransmitted signal and transmits an acknowledgment signal addressed to RFTC 10;
8. All other slave RFTCs to RFTC 10 ignore the signal as they are not designated recipients;
9. RFTC 10 recognises itself as recipient of the acknowledgment signal from RFTC 10.40 ending communication.

In total 4 signals are sent in addition to the signals generated in the network mapping sequence, where 8 is the absolute minimum number of network mapping signals. The total number is dependent on the node communication order and may vary.

Signal Transmission

In accordance with one embodiment of the present invention, the wireless control system employs frequency-shift keying (FSK) and/or frequency hopping to transmit signals within the system. As noted above, signal transmission is in the 433, 868, 915 MHz, and 2.4 and 5.8 GHz ISM frequency bands. In one embodiment, signal transmission is in the 915 MHz ISM Frequency Band. This frequency requires the use of a low bit rate, which can help to increase the range and receiver sensitivity, and may also provide better soil penetration than other frequencies, which can facilitate signal transmission in applications related to landscape management.

Frequency-Shift Keying

In one embodiment of the present invention, the control system employs FSK to transmit signals between components of the system. FSK allows the frequency of the signal carrier to vary between lower and upper operating frequency limits, but the signal can only be carried on one frequency channel. The carrier frequency is shifted using a set of predetermined values.

In a specific embodiment of the present invention, the operating frequency used is in the 915 ISM Frequency Band, and can shift between 902 MHz and 928 MHz with the typical frequency used being 915 MHz.

In one embodiment of the present invention, a signal is transmitted by the central controller either directly to a RFTC module or via gateway transceivers using the FSK method. In accordance with this embodiment, the central controller attempts to send the signal across the network using a particular frequency channel, for example, the 915 ISM Frequency Band. If the RFTC module or gateway transceiver does not receive the signal, no acknowledgment signal is sent to the central controller, and the central controller attempts to re-transmit the signal using a different carrier frequency on the same frequency channel. This process continues until the central controller receives an acknowledgment signal from the RFTC module or gateway transceiver. If the signal needs to be re-transmitted in order to reach its final destination RFTC module, the RFTC module or gateway transceiver attempts to send the signal to another gateway transceiver, another RFTC module or to the destination RFTC, depending on whether the destination RFTC is within its range, and repeats the above transmitting process until it receives an acknowledgment signal from the proper transceiver.

The person of ordinary skill in the art will understand that other signaling algorithms may be considered herein, such as Amplitude-Shift Keying (ASK), Minimum Frequency-Shift Keying (MSK), Phase-Shift Keying (PSK), and the like, without departing from the general scope and nature of the present disclosure.

Frequency Hopping

In one embodiment of the present invention, the wireless control system employs frequency hopping, optionally in combination with FSK or other such algorithms, for signal transmission.

In one embodiment, FSK and frequency hopping are used to minimise the time to complete a system wide communication. For example, using a single channel transmission system, updating RFTC modules may take approximately 20 minutes. When large numbers of RFTC modules are involved in a control system, the communication may take multiple hours based on the very low bit rate used. The frequency hopping method increases transmission time and reduces the time it takes to complete a communication. In addition, the power used on a single channel is limited and can reduce the range capability of the system. Using frequency hopping, the upper limit of power is increased, which in turn increases the range capability. It also allows for an amplifier of up to 1 W, which can increase the range even further (see, for example, Example 4).

Use of the frequency hopping in the present context can provide advantages over a fixed-frequency transmission, for example, signals transmitted using frequency hopping are more resistant to noise and interference and are more difficult to intercept. In addition, transmissions can share a frequency band with many other transmissions with minimal interference.

In one embodiment of the present invention, frequency hopping is used to vary the frequency of the signal carrier between pre-set operating frequencies, and the signal can be carried on more than one frequency channel, for example, up to 50 channels. In a specific embodiment, the operating frequency used is in the 915 ISM Frequency Band, and can shift between 902 MHz and 928 MHz with the typical frequency used being 915 MHz.

FIG. 12A illustrates an example of a wireless control system in one embodiment of the present invention that uses frequency hopping. The central controller 200 attempts to send a signal through the network to a particular RFTC. In one embodiment, the signal is transmitted via gateway transceivers, as in gateway transceiver 1200, to a particular transceiver, the destination RFTC. If the signal transmission fails to reach the first gateway transceiver, i.e. the receiving gateway transceiver does not send an acknowledgment signal to the central controller, the central controller changes the frequency channel used to send the signal and re-transmits the signal. The central controller continues this process until it receives an acknowledgment signal from the gateway transceiver. The first gateway transceiver attempts to send the signal through the network, for example, to another gateway transceiver, or directly to the destination RFTC, depending on whether the destination RFTC is within the range of the first gateway transceiver. If the gateway transceiver does not receive an acknowledgment signal from the destination transceiver, it changes the frequency channel and re-transmits the signal until it receives an acknowledgment signal from the destination transceiver. If the signal is sent to another gateway transceiver, this process continues until the signal reaches the final destination RFTC.

A similar sequence is followed when the central controller sends a signal directly to the destination RFTC module, to an intermediate RFTC module, to a gateway transceiver or to a repeater node, and when the signal is re-transmitted within the system. A worker skilled in the art will recognize that when gateway transceivers and/or repeater nodes are employed in the system and all the transceivers use frequency hopping for transmission, the gateway nodes/repeater nodes will need to be programmed appropriately to allow them to carry out the required frequency hopping activities.

FIGS. 13A to 13L provide flow charts outlining the frequency hopping method employed by a wireless control system in one embodiment of the present invention. In this embodiment, each RF transceiver in the control system has four different modes when it is transmitting. A "Wake Burst" mode is used to attempt to wake remote transceivers into an active state when they are in power saving mode that temporarily turns off the receiver. In this mode the transceiver transmits short messages on all channels without waiting to receive a reply. A "Transmit Sync" mode is used to try to synchronize frequency hopping with a remote transceiver. A "Transmit Message" mode is used after synchronization is established to transmit a message to the remote transceiver, and a "Receive" mode in which acknowledgment is transmitted back in response to synchronization or to a message. As illustrated in more detail below, in a specific embodiment of the invention, the frequency hopping method transmits for less than 400 msec in any 20 sec period. In FIGS. 13A-L, the following terms are used:

"FreqHoppingFlag" (referred to in FIGS. 13F, 13K and 13H) is a variable set when a Sync or Sync Ack is received, and cleared upon entry to Standby Mode. It allows the receiver to continue to hop in synchronization with a recently received sync signal, so as to not have to send another sync signal to acquire another communication path.

"Fraction" (as referred to in FIGS. 13B and 13D) is a time variable used to keep track of the timing in sync mode when the interval time is only ¼ of the standard interval. It may have values of 0, 13, 26, and 39. It is used in the Sync State to adjust the FreqIndex.

"FreqIndex" (as referred to in FIGS. 13D, 13E and 13F) is an index between 0 and 49 used to select the frequency in the Frequency Table. While the Frequency Hopping method is used, the FreqIndex is incremented every 406.25 msec. In Sync State and Wake Burst mode, it is adjusted every 101.563 msec.

"FreqOffset" (as referred to in FIGS. 13D, 13E and 13F) is a variable set on entry to Sync State when FreqHoppingFlag is not set. It is a pseudorandom number between 0 and 49. It is added to FreqIndex to calculate the location in the Frequency Table. It is invariable until the State Machine enters the Standby State.

"TwoFifths" (as referred to in FIGS. 13B, 13D, 13E and 13F) is the standard timing index that counts from 0 to 49. In Transmit State and in Active State when frequency hopping, the FreqIndex is set to this value. It is incremented every 406.25 msec.

Figure 16:
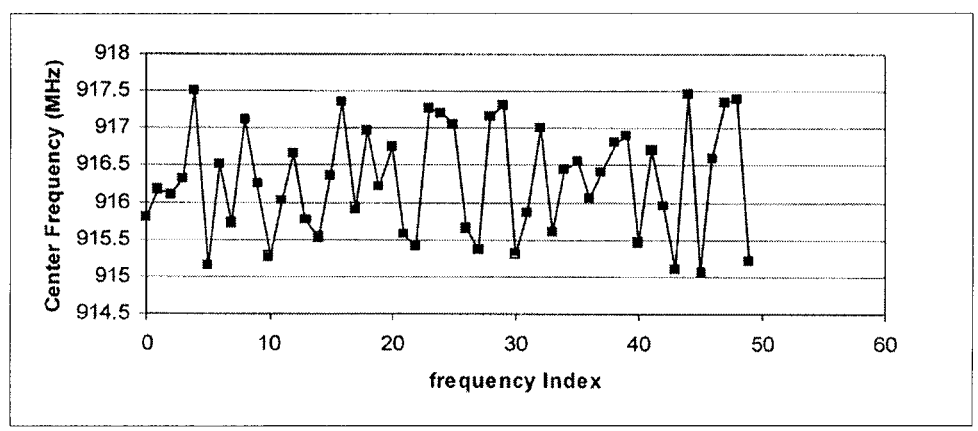
FIG. 16 presents a Frequency Table used in a frequency hopping algorithm employed by a wireless irrigation control and management system in one embodiment of the present invention.

A "Frequency Table" is a table that holds frequency channels in pseudo random order. In one embodiment of the present invention (as shown in FIG. 16), the table holds 50 frequency channels between 915.0055 and 917.555 MHz.

Figure 13A:
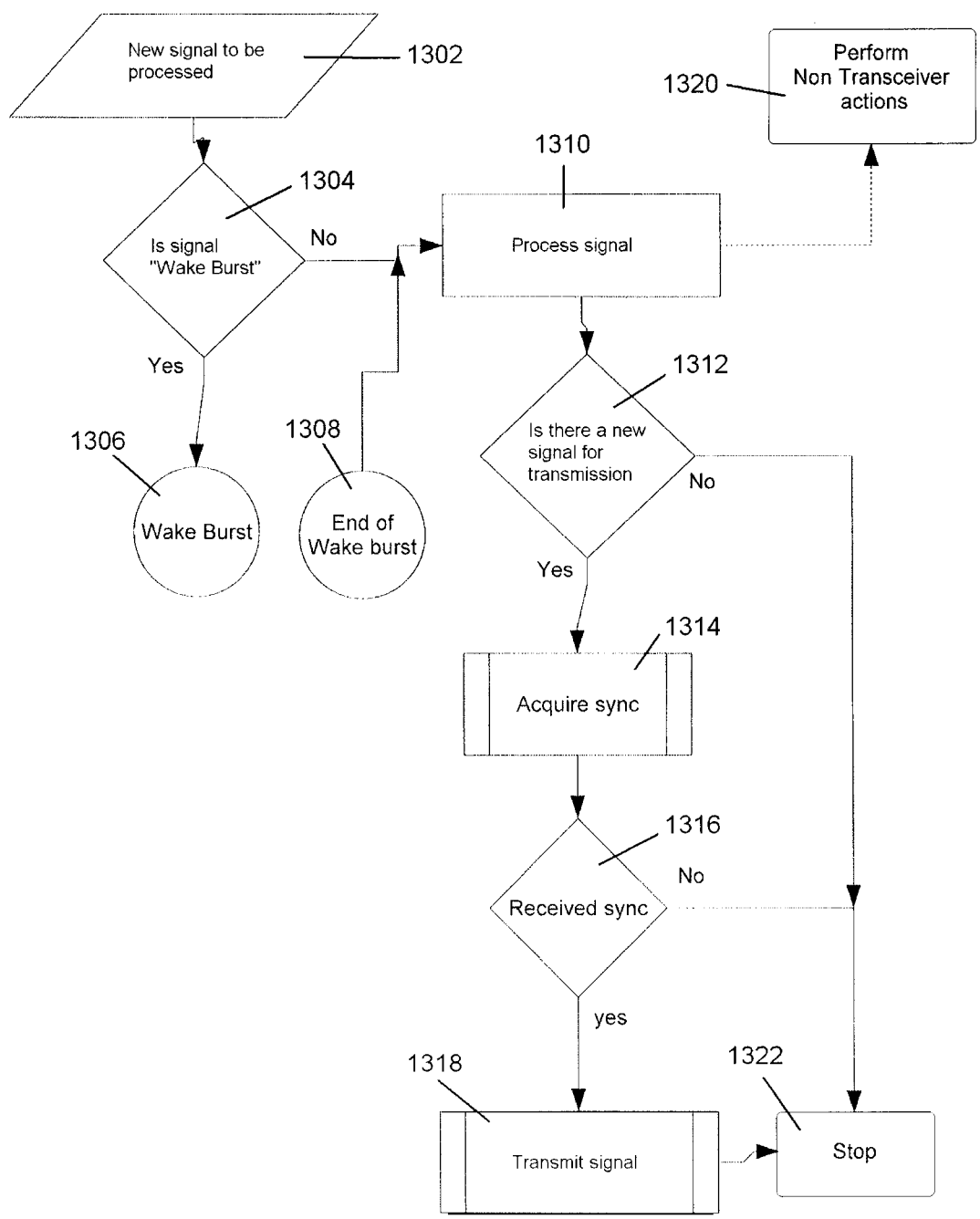
FIG. 13A presents a flow chart of steps taken in a system during a signal transmission, in accordance with one embodiment of the present invention.

FIG. 13A depicts the overall process a transceiver follows when sending a signal through the system in one embodiment of the invention. The transceiver receives a new signal 1302 to be processed. If the signal is a "Wake Burst" signal determined at step 1304, the transceiver enters the "Wake Burst Mode" 2200 (e.g. see FIG. 13J at step 1306). If the signal is not a "Wake Burst" signal, or once the transceiver completes the "Wake Burst Mode", the transceiver begins to process the signal at step 1310. The transceiver checks to see if there is a new signal to be sent at step 1312, if there is no longer a signal to be transmitted, it will exit the Frequency Hopping Algorithm at step 1322. If the signal is a command to execute a non-transceiver action, the signal is passed on to the associated controller at step 1320.

If there is a new signal to be sent as determined at step 1312, the transceiver attempts to acquire synchronization by entering the "Sync State" 1600 (e.g. see FIG. 13D) at step 1314, to acquire a communication path with another transceiver. Once a communication path has been acquired, the first transceiver receives an acknowledgment signal from the second transceiver at step 1316, and enters the "Transmit State" 1700 (see FIG. 13E) to transmit the signal at step 1318. Once the signal has been successfully transmitted to the final destination transceiver, the transceiver exits the Frequency Hopping Algorithm, again at step 1322.

Figure 13B:
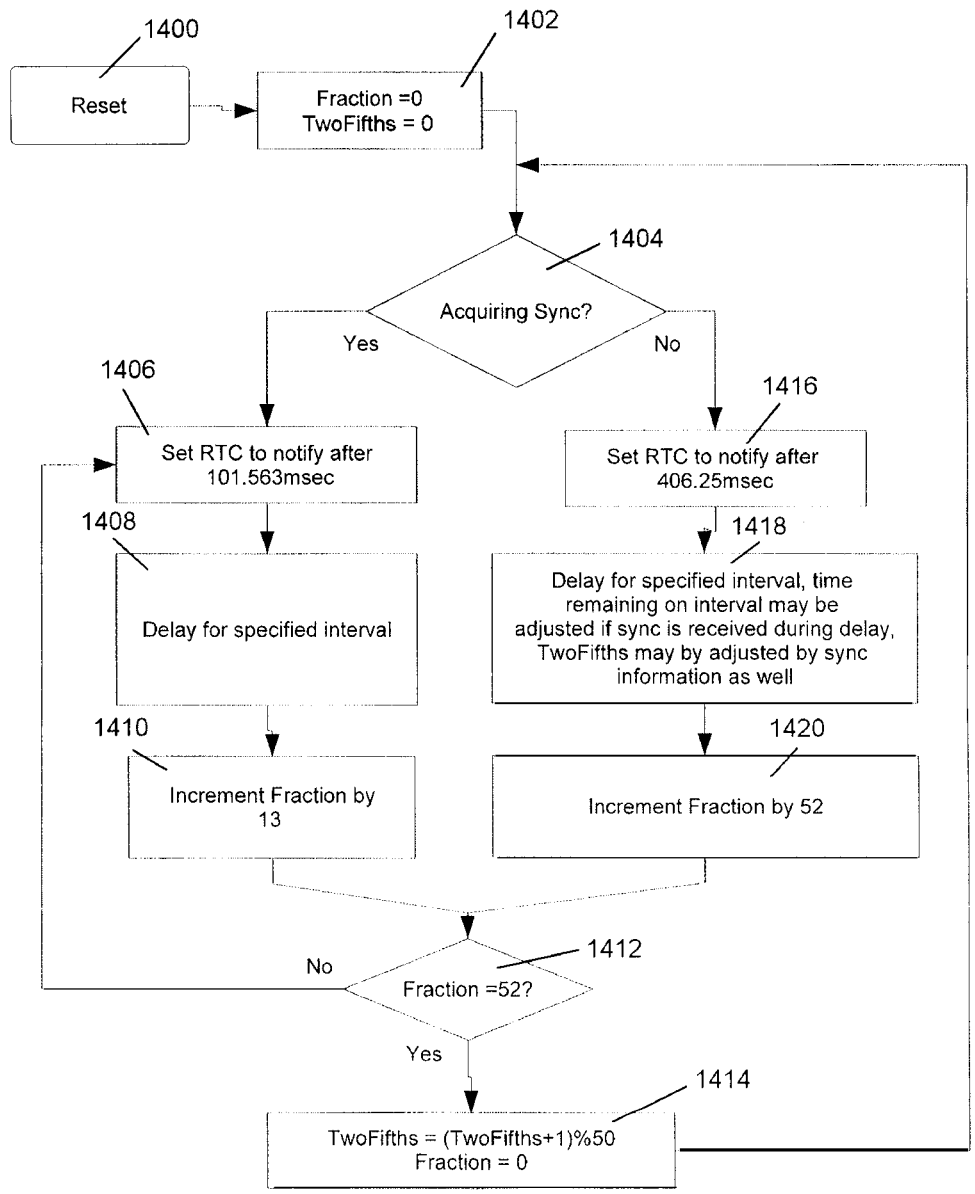
FIG. 13B presents a flow chart of Timing Details for acquiring a communication path over which a signal may be transmitted, in accordance with one embodiment of the present invention.
Figure 13C:
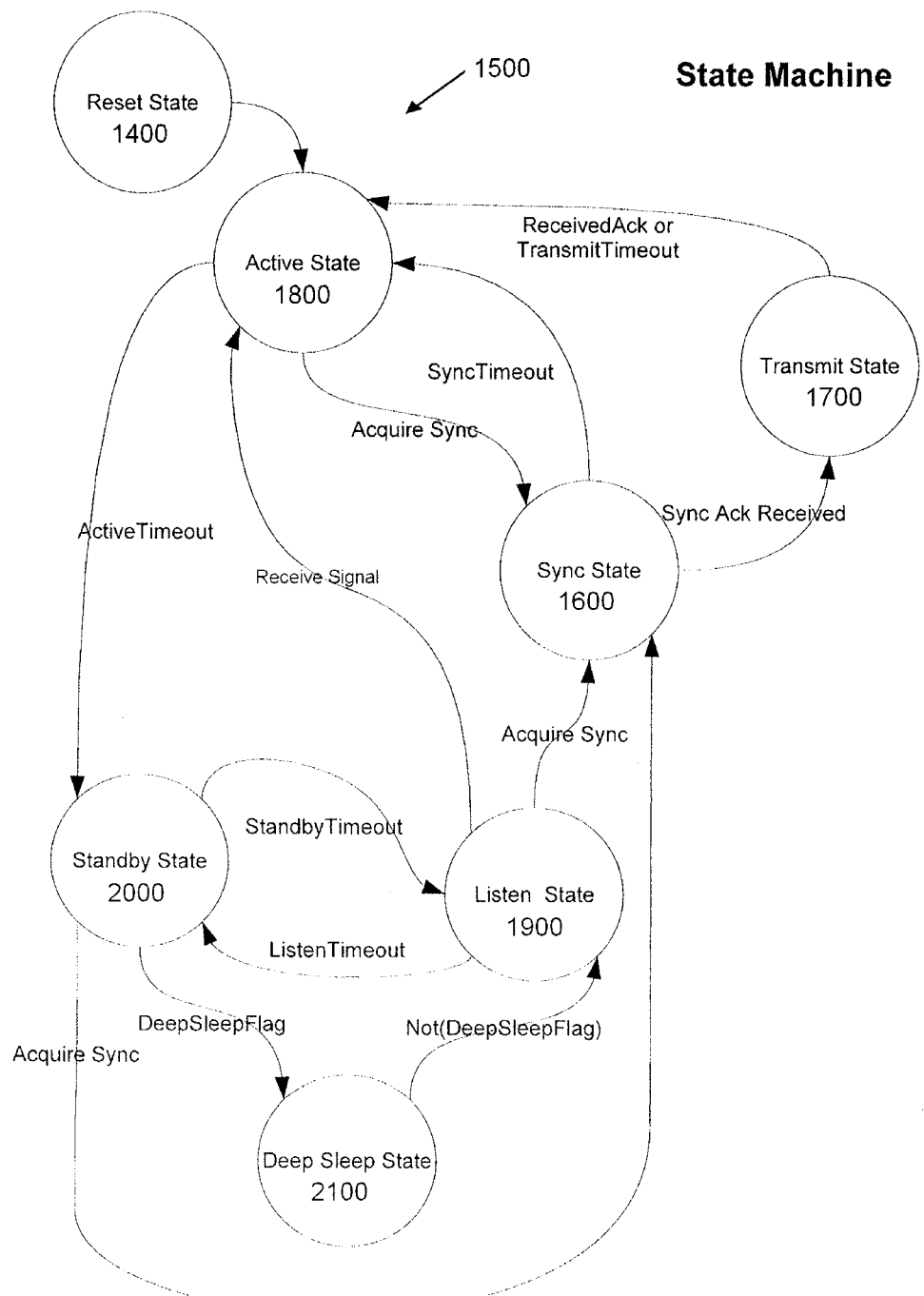
FIG. 13C presents a flow chart depicting different RF transceivers states and transfer there between in response to different events, in accordance with one embodiment of the present invention.
Figure 13D:
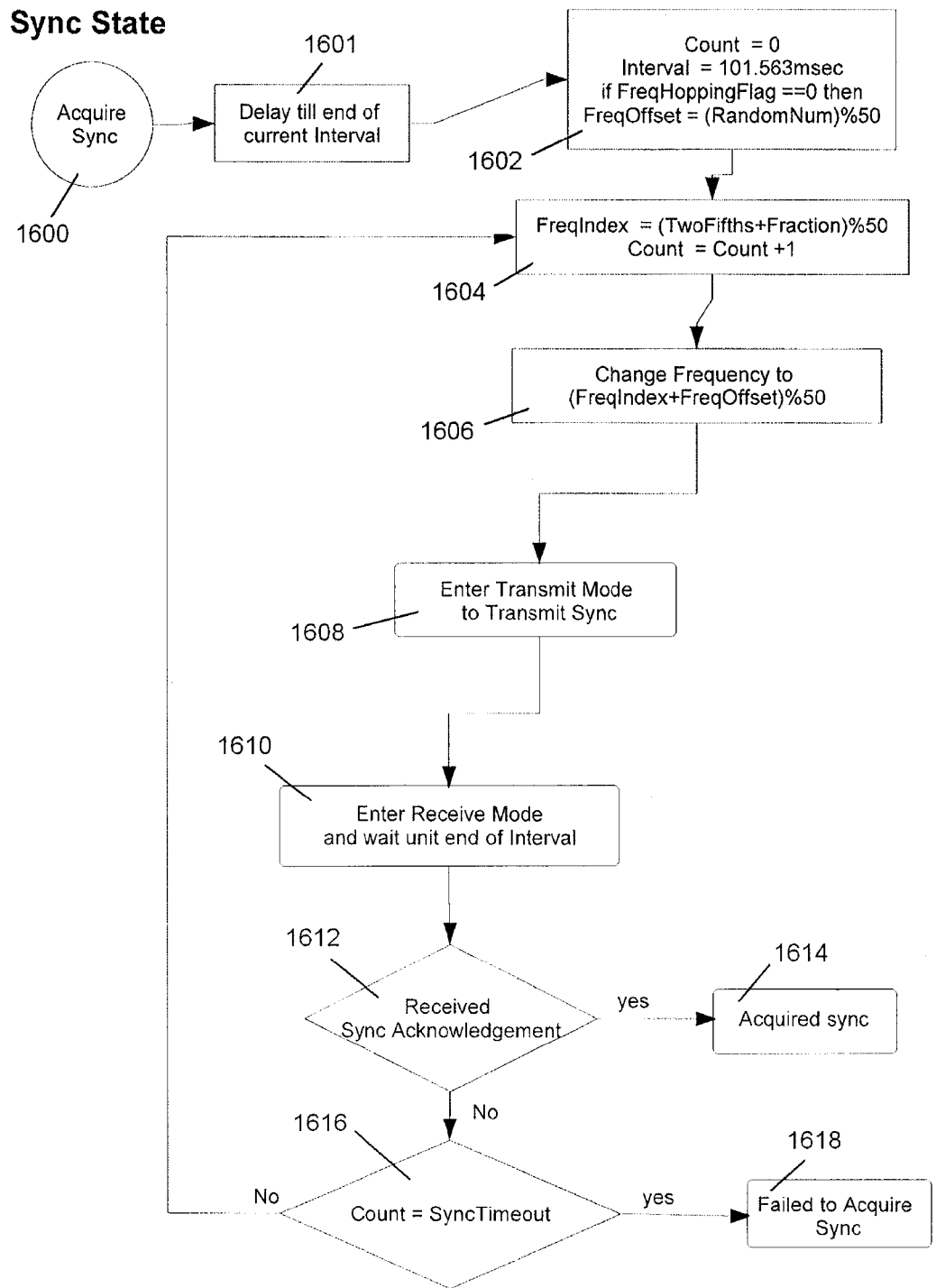
FIG. 13D presents a flow chart of a transceiver Sync State, depicting acquisition of a communication path between a controller and a transceiver, in accordance with one embodiment of the present invention.
Figure 13E:
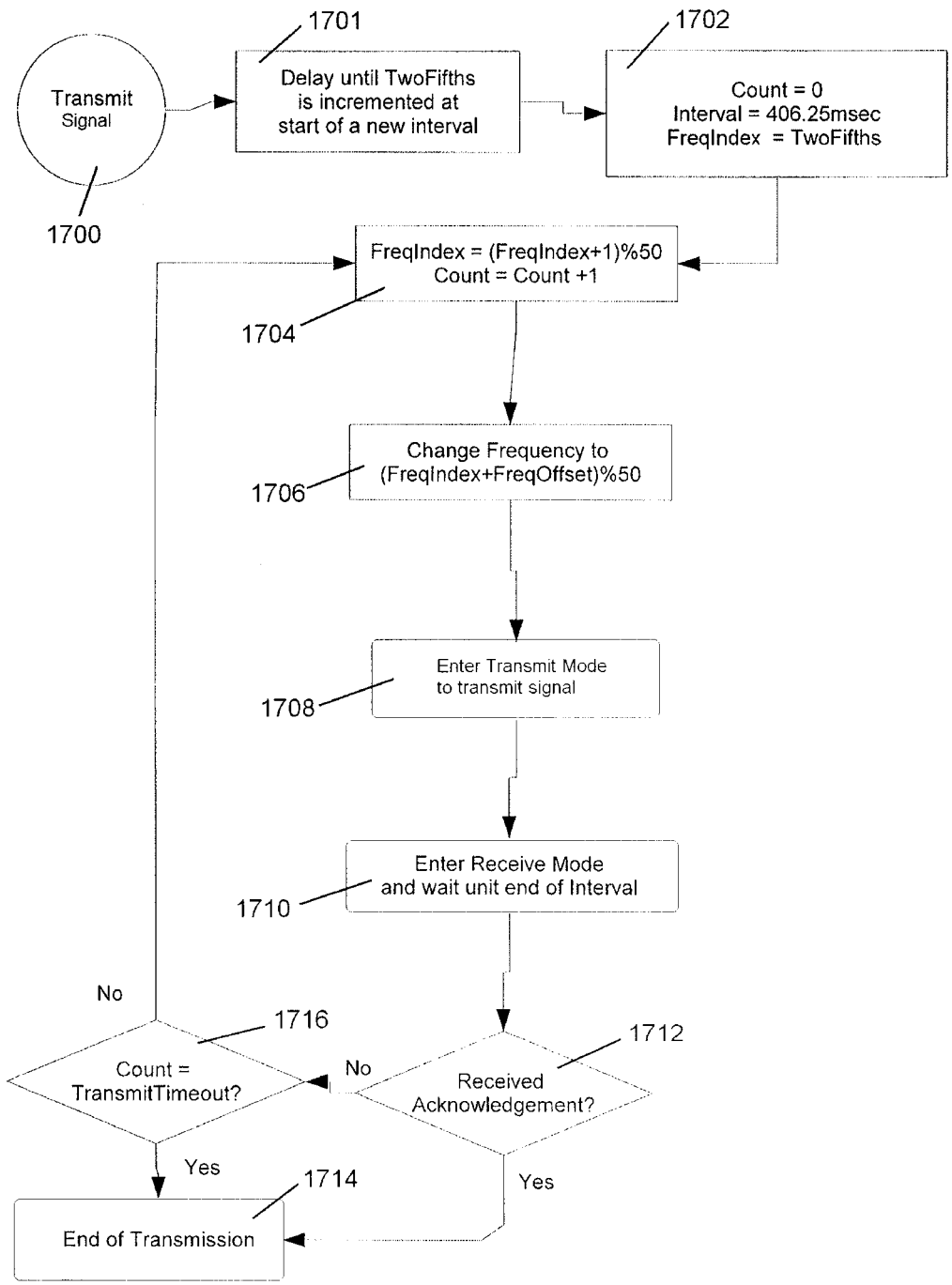
FIG. 13E presents a flow chart of a transceiver Transmit State, depicting signal transmission between transceivers, in accordance with one embodiment of the present invention.
Figure 13F:
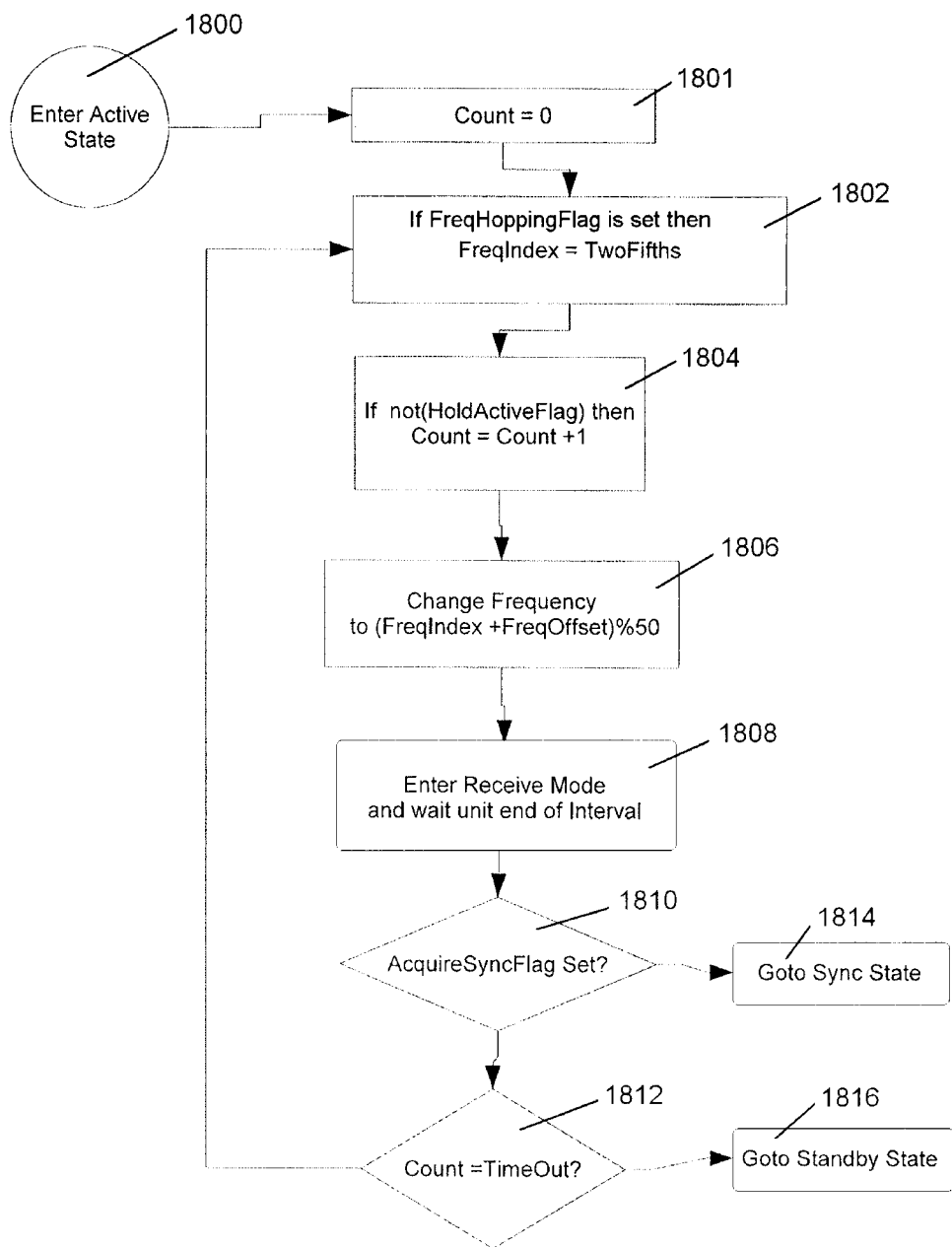
FIG. 13F presents a flow chart of a transceiver Active State, wherein the transceiver actively waits for a signal transmission to be received, in accordance with one embodiment of the present invention.
Figure 13G:
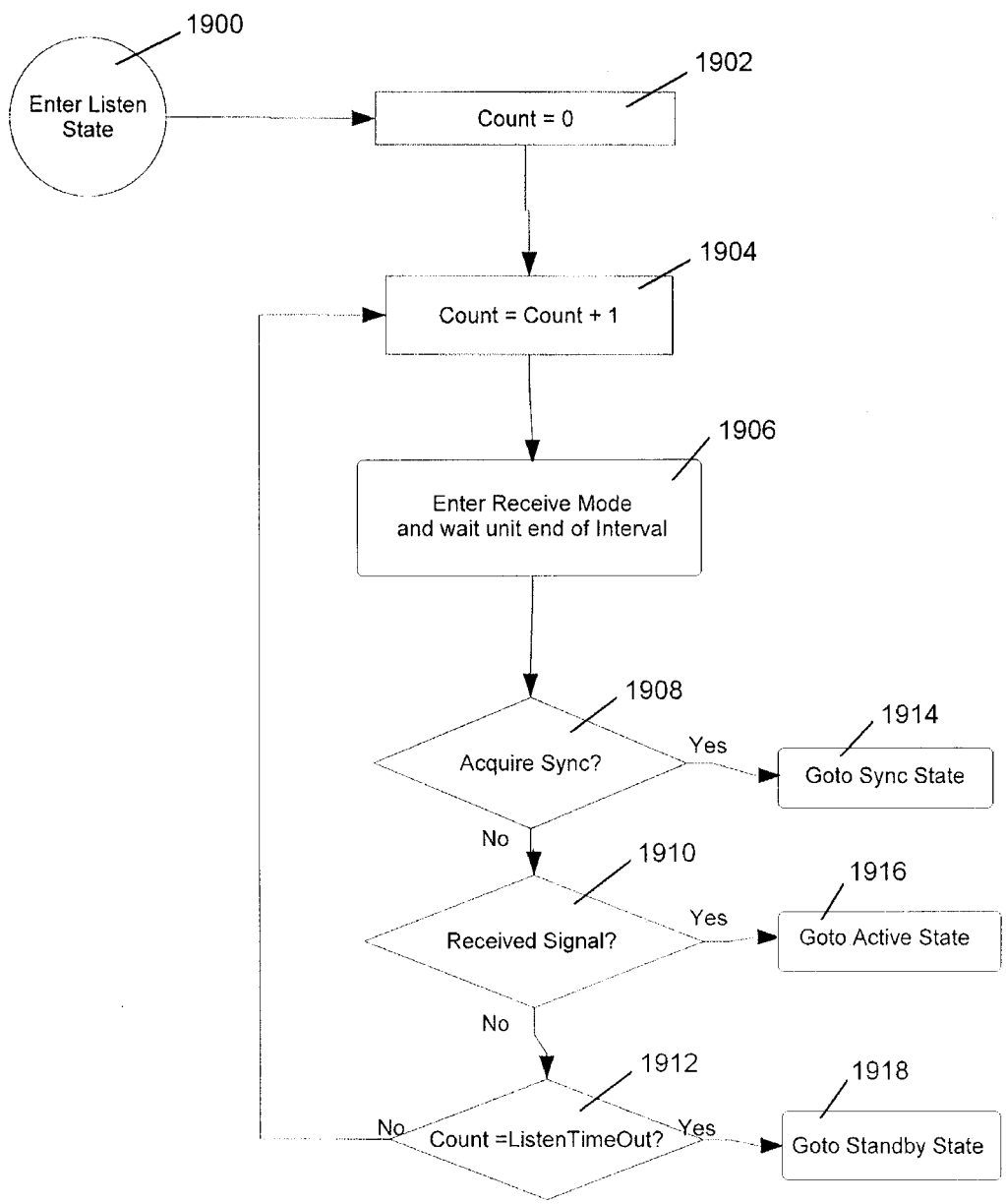
FIG. 13G presents a flow chart of a transceiver Listen State, wherein the transceiver inactively waits for a signal transmission, in accordance with one embodiment of the present invention.
Figure 13H:
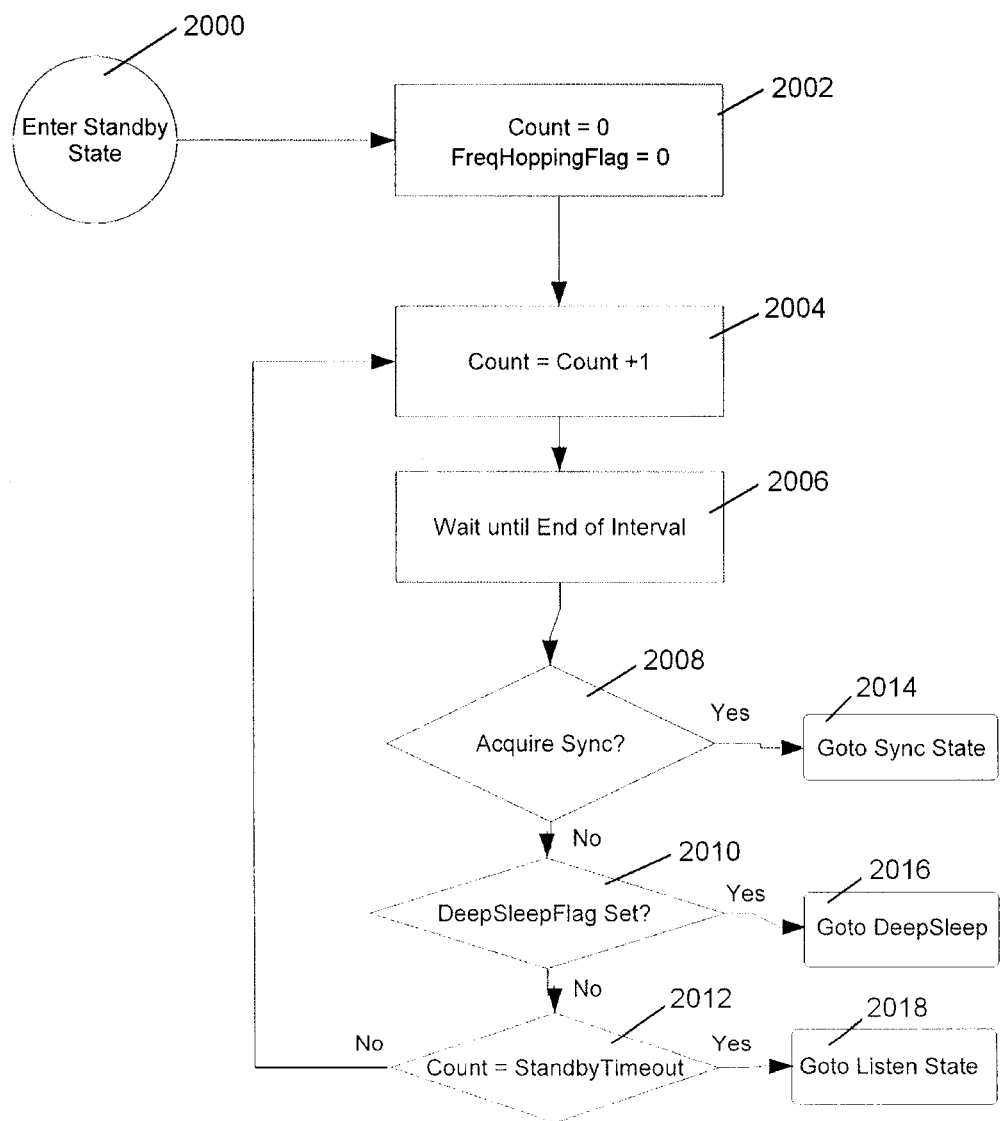
FIG. 13H presents a flow chart of a transceiver Standby State, depicting an inactive transceiver, in accordance with one embodiment of the present invention.
Figure 13I:
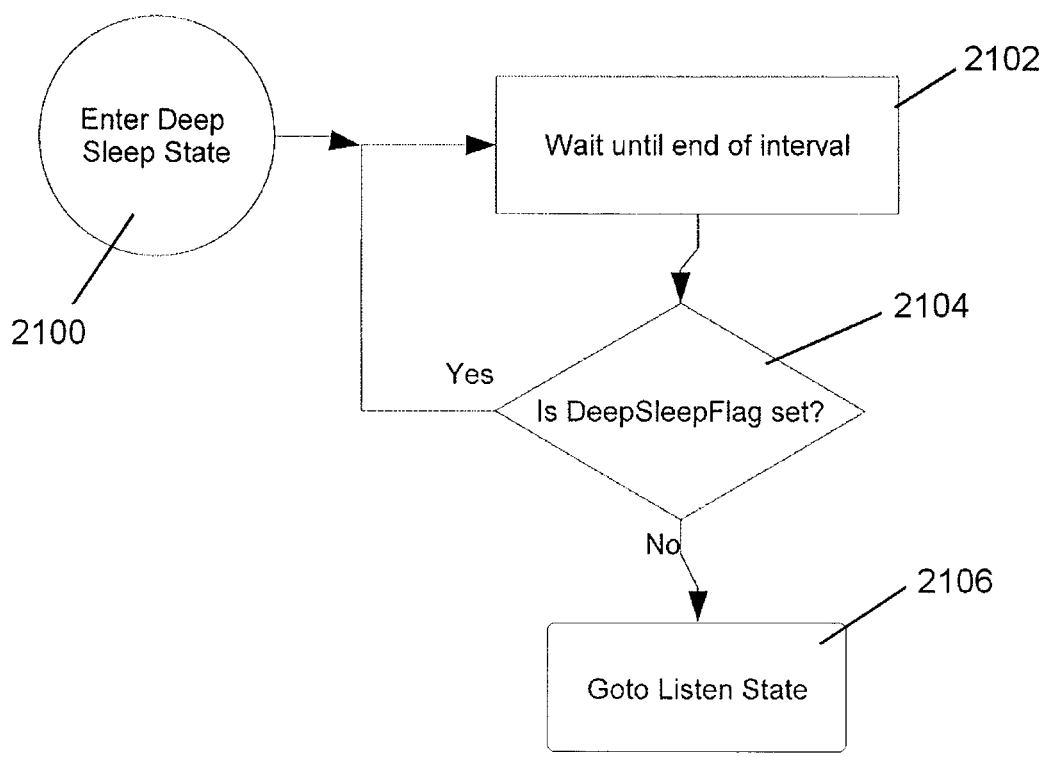
FIG. 13I presents a flow chart of a transceiver Deep Sleep State, depicting an inactive transceiver after a long wait time, in accordance with one embodiment of the present invention.
Figure 13J:
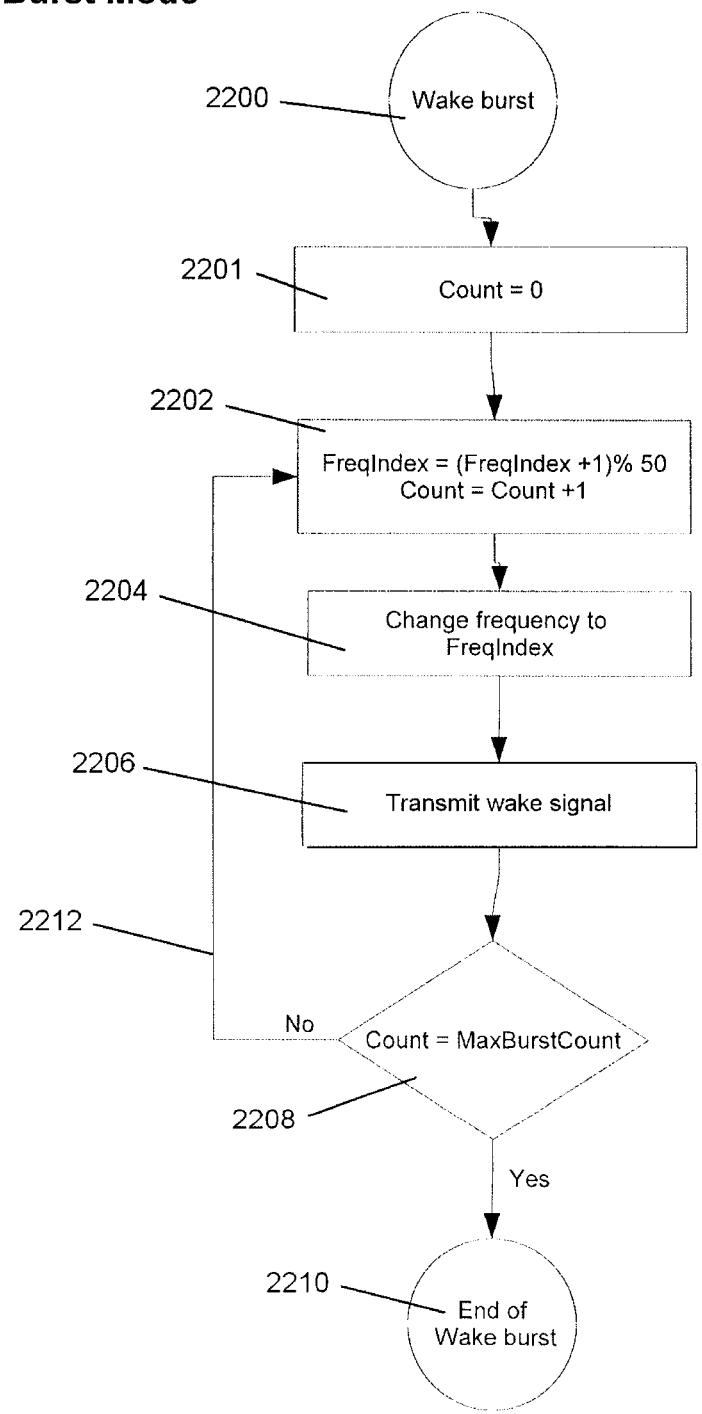
FIG. 13J presents a flow chart of a transceiver Wake Burst Mode, wherein a central controller awakens a transceiver to enable signal transmission, in accordance with one embodiment of the present invention.

While in the "Wake Burst Mode" 2200, illustratively shown in FIG. 13J, the transceiver sets the FreqIndex variable to a particular frequency channel from the Frequency Table at step 2202, and changes its carrier frequency to that FreqIndex at step 2204, and transmits a wake signal to the transceivers within its transmission range at step 2206. The transceiver continues this process repeatedly sending out signals on all frequency channels in the Frequency Table (step 2212), until the number of transmissions reaches the maximum allowed attempts (step 2208). When the transceiver has sent out its maximum number of signal transmissions on each frequency channel in the Frequency Table, the transceiver exits the "Wake Burst Mode" (step 2210).

While in the "Sync State" 1600, illustratively shown in FIG. 13D, the transceiver attempts to acquire a communication path with the destination transceiver. The transceiver sets the FreqHoppingFlag to on or off (step 1602). If the FreqHoppingFlag is off, the FreqOffset value is set to a random number to randomly select what frequency channel to use from the Frequency Table to transmit the sync signal (step 1602). The transceiver changes the FreqIndex variable to select a different frequency channel each time through the "Sync State" (step 1604). The transceiver changes its carrier frequency to the frequency selected by the Freqindex and the FreqOffset to randomly select the frequency used to transmit the signal (step 1606). The transceiver enters the "Transmit Mode" 1700 (e.g. see FIG. 13L), to transmit the sync signal containing timing information and a random FreqOffset (step 1608). Once the transceiver completes the "Transmit Mode" 1700, it then enters the "Receive Mode" 2300 (e.g. see FIG. 13K), to see if it has received a signal (step 1610). Once the transceiver completes the "Receive Mode" 2300, it checks to see if it received an acknowledgment sync signal (step 1612). If it has not received a sync acknowledgment signal and it is at the maximum number of attempts, the transceiver exits the "Sync State" 1600, and having failed to acquire a communication path 1316, it exits the Frequency Hopping Algorithm (step 1322 of FIG. 13A). If it is not at the maximum number of attempts to acquire a sync signal, the transceiver repeatedly attempts to acquire a sync signal (step 1616). If the transceiver has received a sync acknowledgment, it has acquired synchronization 1614, it then attempts to transmit the signal 1318.

While in the "Transmit State" 1700, illustratively shown in FIG. 13E, the transceiver resets the FreqIndex to TwoFifths (step 1702), and sets the amount of time the transceiver can be within the "Transmit State" 1700. The transceiver may have to attempt to transmit the signal more than once and, therefore, it sets the FreqIndex to change throughout the state (step 1704). The transceiver then changes its frequency to that of the FreqIndex and FreqOffset (step 1706), and enters the "Transmit Mode" 2400 (e.g. see FIG. 13L) to actually attempt to transmit the signal (step 1708). Once the transceiver leaves the "Transmit Mode" 2400, it enters the "Receive Mode" 2300 (e.g. see FIG. 13K) to wait for a return signal. If the transceiver receives an acknowledgment signal it ends the transmission of the signal (step 1714) and exits the Frequency Hopping Algorithm (step 1322 of FIG. 13A). If no acknowledgment signal is received, the transceiver repeats this process (step 1716) until it reaches the time limit set at step 1702 for the transceiver to be within the "Transmit State" 1700.

Figure 13L:
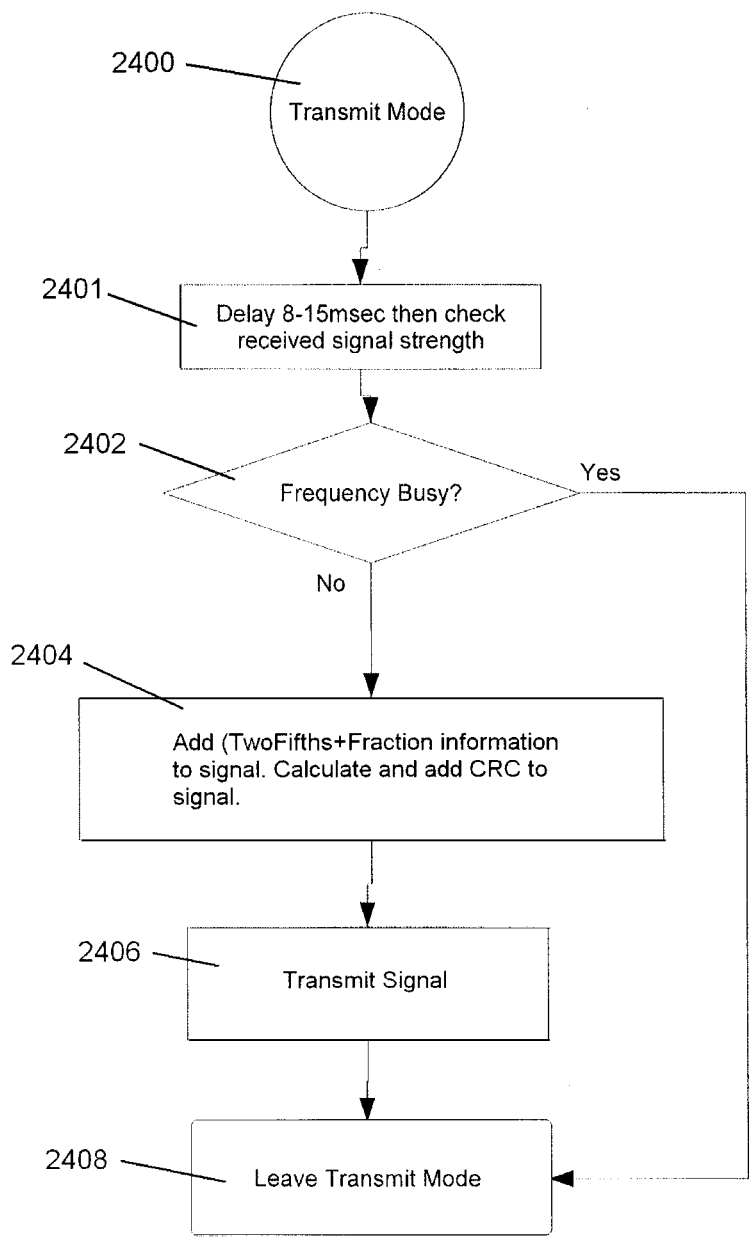
FIG. 13L presents a flow chart of a central controller and transceivers Transmit Mode, depicting signal transmission between controllers, in accordance with one embodiment of the present invention.

While in the "Transmit Mode" 2400, illustratively shown in FIG. 13L, the transceiver attempts to send the signal over the frequency channel as set in the "Transmit State" at step 1706 of FIG. 13E, if that frequency channel is busy at step 2402, the transceiver leaves the "Transmit Mode" (step 2408) and goes back to the "Transmit State" 1700 (e.g. see FIG. 13E) to acquire another frequency channel from the Frequency Table, and re-enters the "Transmit Mode" 2400. If the new frequency channel received from the "Transmit State" at step 1706 is not busy, the central transceiver adds the information and a Cyclic Redundancy Check (CRC) to the signal (step 2404). The transceiver then transmits the entire signal over that frequency at step 2406. Once the signal is transmitted, the transceiver leaves the "Transmit Mode" 2400 and re-enters the "Transmit State" 1700 (e.g. see FIG. 13E) at step 1708.

While in the "Receive Mode" 2300, as shown in FIG. 13K, the transceiver is limited to the amount of time it can wait to receive a signal (step 2302). The transceiver checks if it has received a signal at step 2304, if not, it leaves the "Receive Mode" 2300 and returns to whatever state it left at step 2320. If it has received a signal, it checks if it is a wake signal (step 2306). If it is, the transceiver leaves this mode (step 2320). If it is not a wake signal, the transceiver checks if it is a synchronization signal (step 2308). If it is, the transceiver acknowledges the sync signal, synchronizes its time with that of the signal, sets FreqOffset to the value passed in the sync signal, and sets the FreqHoppingFlag (step 2314). If it is not a sync signal, the transceiver checks if it is a new "message" signal (step 2310). If it is, the transceiver sends an acknowledgment signal (step 2316) and leaves this mode at step 2320. If it is not a new "message" signal, the transceiver checks if it is a sync acknowledgment signal (step 2312). If it is, the transceiver sets the FreqHoppingFlag (step 2318) and leaves the mode (step 2320), if it is not a sync acknowledgment signal, the transceiver exits this mode (step 2320).

In one embodiment of the invention, the wireless control system can be powered down to "Standby State" for most of the day and only powered up during scheduled communications, for example, twice a day. This allows the system to reduce power consumption by powering down all transceivers, and only powering up certain transceivers at set times to listen for a wake signal to be transmitted.

An example of a "Standby State" is depicted in FIG. 13H. In "Standby State" 2000, the transceivers reset the Count variable to zero and the FreqHoppingFlag to zero, which is off (step 2002). The transceiver waits for the set period of time at step 2006 and then checks to see if an acquire synchronization signal has been received (step 2008). If a sync signal has been received, the transceiver then enters the "Sync State" 1600 (e.g. see FIG. 13D) to acquire a communication path with the sending transceiver (step 2014). If no sync signal has been received, the transceiver decides whether it should enter the "Deep Sleep State" 2100 (e.g. see FIG. 13I), or not (step 2010). If the transceiver has been in the "Standby State" 2000 for the specified amount of time, the transceiver will then enter the "Deep Sleep State" at step 2016. If the transceiver has not reached the specified time in the "Standby State" the transceiver will repeat this process (step 2012). If the transceiver has reached the specified amount of time but the transceiver controller does not tell it to enter the "Deep Sleep State" 2100, the transceiver will enter the "Listen State" 1900 as depicted, for example, in FIG. 13G.

While in the "Deep Sleep State" 2100, as shown in FIG. 13I, the transceiver waits a specified amount of time (step 2102), and checks to see if the DeepSleepFlag is still set at step 2104. If it is still set, it will remain in the "Deep Sleep State" 2100. If it is no longer set, it will enter the "Listen State" 1900 (e.g. see FIG. 13G) to listen for a signal (step 2106).

While in the "Listen State" 1900, as shown in FIG. 13G, the transceiver resets its internal counter to zero (step 1902) and begins its loop (step 1904). The transceiver then enters the "Receive Mode" 2300 (e.g. see FIG. 13K) to continuously listen for a signal to be transmitted at step 1906. If a signal is received, the transceiver checks whether it is a synchronization signal at step 1908. If the signal is a synchronisation signal, the transceiver enters the "Sync State" 1600 (e.g. see FIG. 13D) to acquire a communication path with the sending transceiver (step 1914). If the signal is not a synchronization signal, the transceiver checks to see if it is a new "message" signal (step 1910). If the signal is a message signal, the transceiver enters the "Active State" 1800 (e.g. see FIG. 13F) at step 1916. If no signal is received, the transceiver checks to see if it has remained in the "Listen State" 1900 for the specified amount of time at step 1912. If it has (step 1918), it enters the "Standby State" 2000. If not, the transceiver repeats the above process.

While in the "Active State" 1800, as shown in FIG. 13F, the transceiver checks to see if the FreqHoppingFlag was set. If it is set, the transceiver sets its FreqIndex to TwoFifths (step 1802). If the HoldActiveFlag is not set, then the internal counter is increased at step 1804. The transceiver then changes its frequency to the FreqIndex and FreqOffset and enters the "Receive Mode" 2300 (e.g. see FIG. 13K) to wait to receive a signal (step 1808). If the signal received is a sync signal and the AcquireSyncFlag is set (step 1810), the transceiver enters the "Sync State" 1600 (e.g. see FIG. 13D) to acquire a communication path with the central controller (step 1814). If there is no sync signal received, and the transceiver has not been in the "Active State" for the specified period of time, the transceiver repeats this process (step 1812). If the transceiver has been in the "Active State" 1800 for the specified period of time, it will go to the "Standby State" 2000 (e.g. see FIG. 13H) to wait for a signal (step 1816).

FIG. 13B depicts the "Timing Details" 1400 of a Frequency Hopping method in accordance with one embodiment of the present invention. At set times, the transceivers reset the Fraction and TwoFifths variables to zero (step 1402). The transceivers determine whether they are attempting to acquire a synchronization with the central controller (step 1404). If a transceiver is attempting to acquire a synchronization with the central controller, the transceiver controller is set to notify after an interval of 101.563 msec (step 1406), the transceiver waits for that period of time (step 1408), increments the Fraction variable by thirteen (step 1410), and determines whether the Fraction variable is set to Fifty-Two (step 1412), if the Fraction variable is not Fifty-Two, the transceiver repeats this process. If the Fraction variable is Fifty-Two then the TwoFifths variable is incremented, and the Fraction variable is reset to zero (step 1414). If the transceiver is not attempting to acquire a synchronization with the central controller at step 1404, then the transceiver controller is set to notify after an interval of 406.25 msec 1416. The transceiver waits for that period of time (step 1418), increments the Fraction variable by Fifty-Two (step 1420), and checks if the Fraction variable is equal to Fifty-Two (step 1412), if the Fraction variable is not Fifty-Two, the transceiver repeats this process. If the Fraction variable is Fifty-Two then the TwoFifths variable is incremented, and the Fraction variable is reset to zero (step 1414). FIG. 13C depicts the components of the "State Machine" 1500 required for the frequency hopping method in accordance with one embodiment of the present invention. At every entry into the Frequency Hopping method, a transceiver enters the "Timing Details" 1400 which resets all the variables. The system then enters the "Active State" 1800. If the "Active State" times out, then the system enters the "Standby State" 2000. If the system is attempting to acquire a synchronization signal, it enters the "Sync State" 1600. If the attempt to acquire a synchronization times out, the system returns to the "Active State" 1800. If a sync acknowledgment is received, the system enters the "Transmit State" 1700. If an acknowledgment is received or the transmission times out, the system enters the "Active State" 1800. If, while in the "Standby State" 2000, the system attempts to acquire a sync signal, the system enters the "Sync State" 1600. If, while in the "Standby State" 2000, the DeepSleepFlag is set, the system enters the "Deep Sleep State" 2100. If, while in the "Standby State" 2000, the system times out, the system enters the "Listen State" 1900. If, while in the "Listen State" 1900, the system times out, the system re-enters the "Standby State" 2000. If, while in the "Deep Sleep State" 2100, the DeepSleepFlag is not set, the system enters the "Listen State" 1900. If, while in the "Listen State" 1900, the system attempts to acquire a synchronization, the system enters the "Sync State" 1600. If, while in the "Listen State" 1900, the system receives a signal, the system enters the "Active State" 1800.

Signal Propagation

In one embodiment of the present invention, the range of the RF transceivers in the wireless control system is extended through selection of antenna type and orientation. As noted above, various types of antenna are suitable for use with the RFTC modules comprised by the control system and the type of antenna may vary depending on the function of the particular RFTC module. The antenna for the RF transceiver or RFTC module associated with the central controller may thus differ from the antenna used for an in-ground RFTC module, or an RFTC module located in an occluded position, which may also vary from the antenna selected for use in a repeater node.

Accordingly, the present invention provides for the use of multiple antenna designs in the control system. For example, a Yagi antenna can be used for long-range transmission capability, for instance a range from about 3 km to about 20 km. A ¼ or ½ wave antenna can be used for local area networks with shorter transmission range requirements, for instance between about 1 km to about 5 km.

In one embodiment of the present invention, RFTC modules intended for in-ground use or that are operatively associated with a device to be actuated use internal printed board antennas, and repeater nodes and central controller use mounted/connected antennas.

As is known in the art an antenna can be selected based on its polarization, i.e. the direction of the electromagnetic waves (described in terms of the direction of the electric field, knowing that the magnetic field is perpendicular to the electric field). Horizontal polarization occurs where the electric field radiates on the x-axis, whereas, vertical polarization occurs where the electric field radiates along the y-axis. In general, horizontal polarization is less affected by vertical reflections such as a building, whereas vertical polarization is less affected by horizontal reflections such as water or land reflections.

In one embodiment of the invention, vertically polarized antennas are connected to the repeaters and/or central controller, and antennas with horizontal polarization are used for in-ground RFTC modules and other RFTC modules operatively associated with a device to be actuated. In accordance with this embodiment, with the in-ground RFTC modules comprising printed board antenna installed in a horizontal orientation, the in-ground RFTC modules have a transmission range of about 800 m to about 1.2 km. In another embodiment, all antennas employed in the system are vertically polarised.

In accordance with one embodiment of the present invention relating to control systems requiring the use of some in-ground RFTC modules, vertically polarised repeater and/or central controller antennas are employed in the system in combination with horizontally oriented RFTC antennas for the in-ground RFTC modules. Although this arrangement can result in some signal loss due to the use of oppositely polarised antennas, the use of horizontal orientation for the in-ground RFTC modules may help reduce the effective depth at which the in-ground RFTC modules need to be placed, which in turn reduces loss of signal due to soil propagation. In addition, the horizontal orientation of the in-ground antenna can provide a larger target for the transmitted signal. In this embodiment, signal loss due to opposite antenna polarization can be reduced by angling the horizontal antenna upwardly so that they are closer to the vertically polarized signal, while still benefiting from the above and other advantages provided by a horizontally oriented antenna.

In a specific embodiment of the present invention, the in-ground RFTC modules comprising printed board antennas are installed in a generally horizontal orientation, but at an angle between about 10 and about 30 degrees above the horizontal, for example, between about 12 and about 30 degrees. In other embodiments, the in-ground RFTC modules are installed at an angle between about between about 10 and about 25 degrees, between about 12 and 25 degrees, and between about 12 and about 20 degrees above the horizontal. In accordance with this embodiment, the in-ground RFTC modules have a transmission range between about 800 m and about 3 km.

In various embodiments of the present invention in which the control system includes a number of ground-level or in-ground RFTC modules, repeater node antennas use vertical polarization with a gain not exceeding about 3 db. Higher gain may result in a narrower radiated horizontal beamwidth, which can result in the signal not encompassing ground modules. In another embodiment, the central controller antenna height is kept relatively low to facilitate ground wave propagation.

A person skilled in the art would recognize that antenna choice for the central controller and repeaters will be influenced by the type of control system, location of the central controller relative to the other components of the system, and the terrain within which the control system is to be operated. The following are non-limiting examples of the types of antennas that may be used in different control systems depending on orientation of the system and the local terrain. The following assume that at least a portion of the RFTC modules are located close to, or below, ground level and the amount of ground level propagation is, therefore, important.

Where the central controller is located centrally to the system, an omni-directional antenna with vertical polarization can be used to allow transmission in all directions, for example an antenna with about 3 db gain would be suitable.

For control systems in which the RFTC modules and repeaters are located within a narrow, elongated area with the central controller at one end, a directional antenna with vertical polarization could be used, for example, a 3 db gain Yagi antenna.

For control systems comprising a central controller located in an elevated position, for example on a hill, relative to the other components of the system, signal propagation should follow the ground contour. In this situation, a patch or cellular style antenna with vertical polarization would be suitable as this can provide a downward tilt dependant on degree of slope. For example, a 13 db gain directional Sector antenna could be used, with the appropriate degree of tilt.

For control systems in which the RFTC modules and repeaters span out in 3 directions from the central controller, more than one antenna may be required. For example, three directional antennas with horizontal polarization could be used, such as 6 db directional Yagi antennas. This situation may require the use of splitters, for example, splitters with a 3 db loss.

For control systems in which the central controller is located at the end of the system, a directional Patch antenna with horizontal and vertical polarization, such as a 9 db gain directional Patch antenna, could be used. Alternatively, where the cost of the system is not a consideration, a 9 db omni-directional antenna with horizontal polarization could be used.

Applications

The wireless control system of the present invention has utility in a wide range of applications in a number of fields. In an agricultural context, for example, the wireless control system can be used to monitor equipment and/or environmental conditions in poultry houses, dairy buildings, greenhouses, or livestock buildings. Similarly, the control system can be used to manage in-field irrigation systems.

The wireless control system can also be employed to manage temperature, humidity levels, water seepage, power and/or HVAC systems, for example, in homes, in waste water and sewage management facilities, and in heating, ventilation, air-conditioning, refrigeration (HVACR) applications for food processing or storage facilities. The wireless control systems also have applications in the oil and gas and industrial/chemical industries, as well as in laboratories, hospitals and commercial buildings in order to manage, for example, heating, venting and air-conditioning, elevators, lighting, security, access, and the like. The control system can also be used to provide a ground telemetry system as an alternative to GPS systems.

The wireless control system can be applied to the management of a security system, and can comprise sensors associated with the RFTC modules that are smoke detectors, infrared (IR) motion detectors, ultrasonic presence detectors, or security key detectors. In this embodiment, the actuating means associated with the RFTC modules can actuate an alarm, such as a bell alarm or a visual alarm indicator.

In another embodiment and as described in more detail below, the wireless control system is applied to the management of an irrigation system. The irrigation system can be in an agricultural, recreational or landscaping setting.

Wireless Irrigation Management System

In one embodiment, the present invention provides for a wireless control system for managing an irrigation system. The irrigation system can be one of a variety of known irrigation systems that comprise a plurality of water management devices, such as sprinklers, valves, pumps and the like, inter-connected by a network of water supply pipes. The wireless control system can be "retro-fitted" to an existing irrigation system or installed together with a new irrigation system.

In the wireless irrigation management system according to this embodiment of the present invention, each of the RFTC modules in the control system are configured to be operatively associated with at least one of the water management devices of the irrigation system, for example, to allow the RFTC module to switch the water management device on and off, and/or to monitor the status of the water management device, and the RF signals transmitted from the central controller(s) comprise commands to the RFTC module to execute a water management event, such as actuating a water management device, or collecting data from one or more associated sensor(s).

All or a sub-set of the RFTC modules in the network can be operatively associated with one or more sensors for measuring environmental or system conditions. In the context of an irrigation management system, such environmental or system conditions can be, for example, rainfall, water flow, water pressure, temperature, wind speed, wind direction, relative humidity, solar radiation, power consumption, status of the water management device, status of the power supply, and the like. Sensors include, for example, air temperature sensors, soil temperature sensors, equipment temperature sensors, relative humidity sensors, light level sensors, soil moisture sensors, soil temperature sensors, soil dissolved oxygen sensors, soil pH sensors, soil conductivity sensors, soil dielectric frequency response sensors, telemetry sensors, motion sensors, power level sensors and the like. Information provided to the controller of the RFTC module from the sensor(s) can be processed and transmitted back to the central controller, which in turn can process the data and transmit new commands to the RFTC modules as necessary, for example, in order to compensate for a change in environmental or system conditions.

Thus, in one embodiment of the present invention, the wireless irrigation management system comprises a central controller and a plurality of irrigation management nodes, each of which comprises a RFTC module operatively associated with at least one water management device. All or a subset of the plurality of irrigation management nodes in the system can comprise a RFTC module that is further operatively associated with at least one sensor. The wireless irrigation management system can further comprise repeater nodes to facilitate signal transmission within the system. Control signals are generated from the central controller, which is programmed statically or dynamically to control and monitor the irrigation management nodes, and are transmitted to the RFTC modules utilising the 433, 868, 915 MHz, and 2.4 and 5.8 GHz ISM frequency bands. The RFTC module receives and re-transmits the signals through its antenna to and from the central controller and/or other RFTC modules based on ad hoc routing protocols. The controller of the RFTC module activates and deactivates its associated water management device via an actuating means in response to control signals received from the central controller. The controller of the RFTC module also controls the cycle time and monitors the water management device operation and environmental conditions via its associated sensor(s) and transmits sensor data back to the central controller. The irrigation management nodes thus utilise 2-way RF communication to determine various parameters, including for example battery levels, moisture levels, activation time and operational status, to provide dynamic monitoring and regulation of the irrigation system, thus allowing real-time irrigation scheduling. The present invention further contemplates that the central controller can be connected to the internet to enable remote control and monitoring of the network. The irrigation management system can also comprise one or more mobile RFTC module, such as a hand-held device, that can act as an auxiliary controller.

In one embodiment of the invention, the RFTC modules are programmed with an override capability that allows them to disregard a command from the central controller. In this embodiment, when the RFTC module receives a command from the central controller, it also gathers environmental data through its associated sensors and compares the environmental conditions with a stored set of conditions. The RFTC module then decides to either implement the command from the central controller or to disregard the command according to whether the environmental conditions match one of the stored set of conditions. For example, a RFTC module receives a command from the central controller to activate its water management device, however, the environmental data gathered from the sensor(s) associated with the RFTC module indicates that it is raining. The RFTC module compares the sensor data that it is raining against the stored set of conditions and finds a match. The RFTC module, therefore, overrides the command from the central controller, does not activate its water management device, thus preventing wasted water, and transmits a status signal back to the central controller. The override capability of the RFTC module can thus facilitate water conservation.

Figure 6:
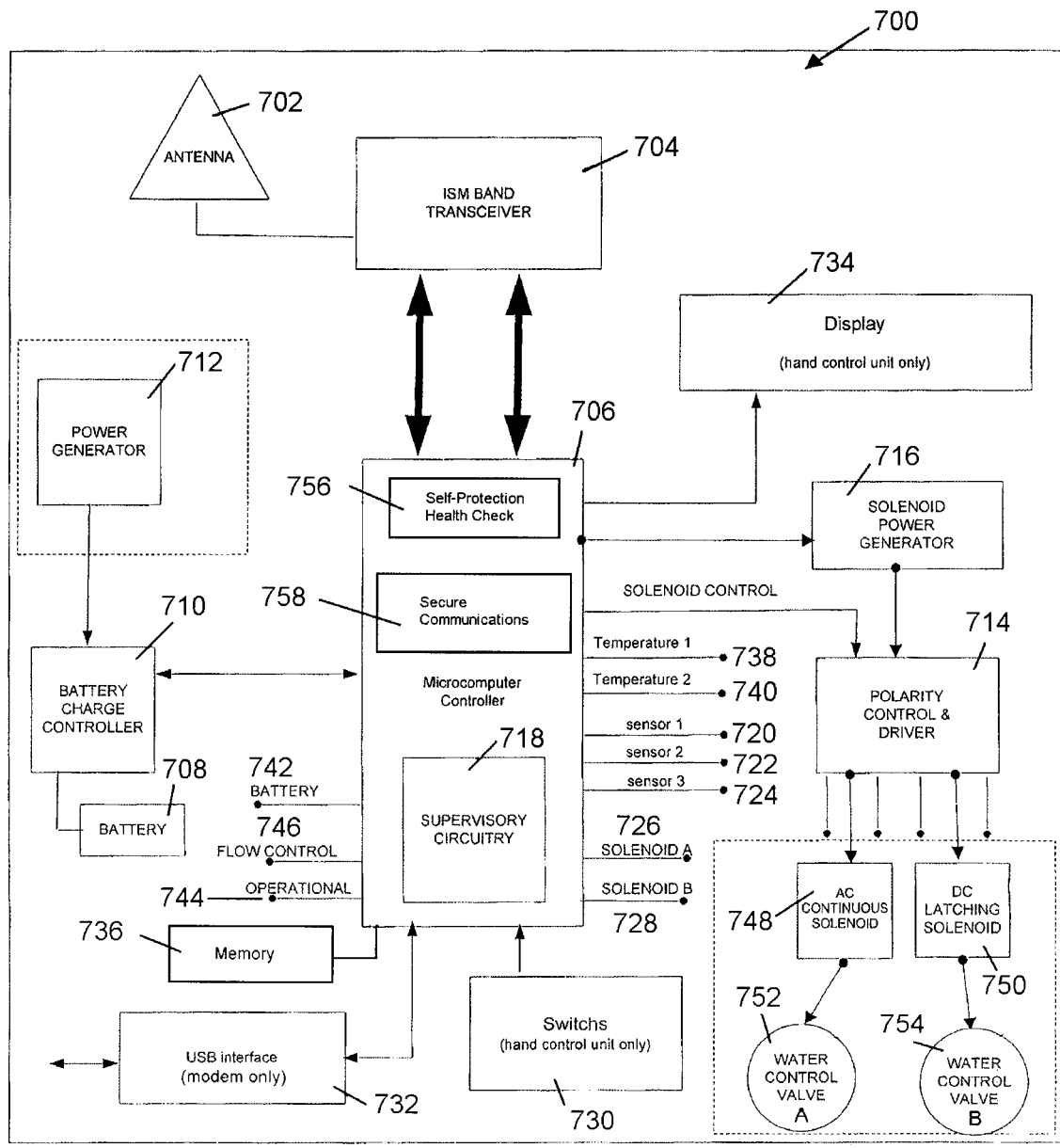
FIG. 6 is an electronic block diagram of a long-range RF transceiver-controller (RFTC) module for a wireless control system in one embodiment of the invention

An example of a RFTC module configured for incorporation into an irrigation management system in accordance with the present invention is shown in FIG. 6. The RFTC module shown generally at 700 comprises a RF transceiver 704, which is configured to transmit and receive RF signals in the 433, 868, 915 MHz, and 2.4 and 5.8 GHz ISM frequency bands, an antenna 702, a controller 706, which comprises supervisory circuitry 718, a memory 736 and a power source 708.

The RFTC module is further operatively associated with an actuating means for actuating one or more valves 752 and 754 via one or more latching solenoids, which can be AC continuous solenoids 748 and/or DC latching solenoids 750. In one embodiment of the present invention, the actuating means controls the valves via between one and about 6 solenoids. In the embodiment depicted in FIG. 6, the water management device is a valve 752/754, however, it will be understood by the skilled worker that the water management device could also be a pump, a sprinkler, a rotor, or other component of the irrigation system. Similarly, a worker skilled in the art will appreciate that actuating means other than a solenoid which are suitable for control of a water management device can also be employed.

The RFTC module 700 is further operatively associated with one or more sensors. In FIG. 6, these are shown as sensors 1 through 3 (720, 722 and 724, respectively). Sensors 1 through 3 (720, 722 and 724, respectively) can be for monitoring, for example, motion, telemetry, moisture, rainfall and the like.

Internal temperature monitor 738 provides a means of hibernating or powering down the RFTC module based on temperature and/or a means of monitoring any overheating of the RFTC module components. External temperature monitor 740 can be used to monitor ground and/or surface temperature, for example, to provide notification of soil and grass "baking" conditions to the central controller, which can then implement extra or emergency watering protocols. Battery monitor 742 allows for monitoring of the status of the battery in real time and can provide proactive failure warning. Operational monitor 744 reports on the operation of the associated water management device. For example, the operational monitor 744 can monitor incoming water pressure and report any drop in pressure that may indicate damaged water lines. Operational monitor 744 can also monitor, for example, rotation of an associated sprinkler in order to determine irrigation saturation. Flow control monitor 746 measures and reports on the volume of water during an irrigation cycle.

The controller 706 is operatively coupled to the memory 736 and also includes supervisory circuitry 718. The supervisory circuitry can also include a watch dog function that is configured to reset the controller 706 if timed out. The controller also interfaces with, controls and/or gathers and processes data from the associated actuating means and one or more sensor(s).

As depicted in FIG. 6, in one embodiment of the present invention, the controller 706 comprises in addition to memory 736, the following programming modules: secure communications module 758 for authenticating, transferring, identifying and routing signals; self-protection health check module 756 for synchronising routings and periodically checking for operational requirements, battery power, network configuration node location and the like; power management module 710 for controlling power requirements for various components, and application processing module 714 for controlling activation of the solenoid.

The present invention also contemplates that the RFTC module 700 can be configured for operative association with more than one actuating means, as depicted in FIG. 6 with reference to solenoid A 726 and solenoid B 728, which are also controlled by controller 706. The additional actuating means can be used to control, for example, the position of a water control device, flow rate through a water control device, fertiliser flow rate, rotational speed of sprinkler, lighting, and the like.

The RFTC module can further optionally comprise, or be operatively associated with, a power generator 712 for recharging the battery 708, and which is controlled by the controller 706 via the battery charge controller 710. Power generator 712 can be, for example, a solar panel, a water turbine, oscillator, or other device for recharging battery power. In one embodiment, the power generator is a solar panel array.

Figure 7:
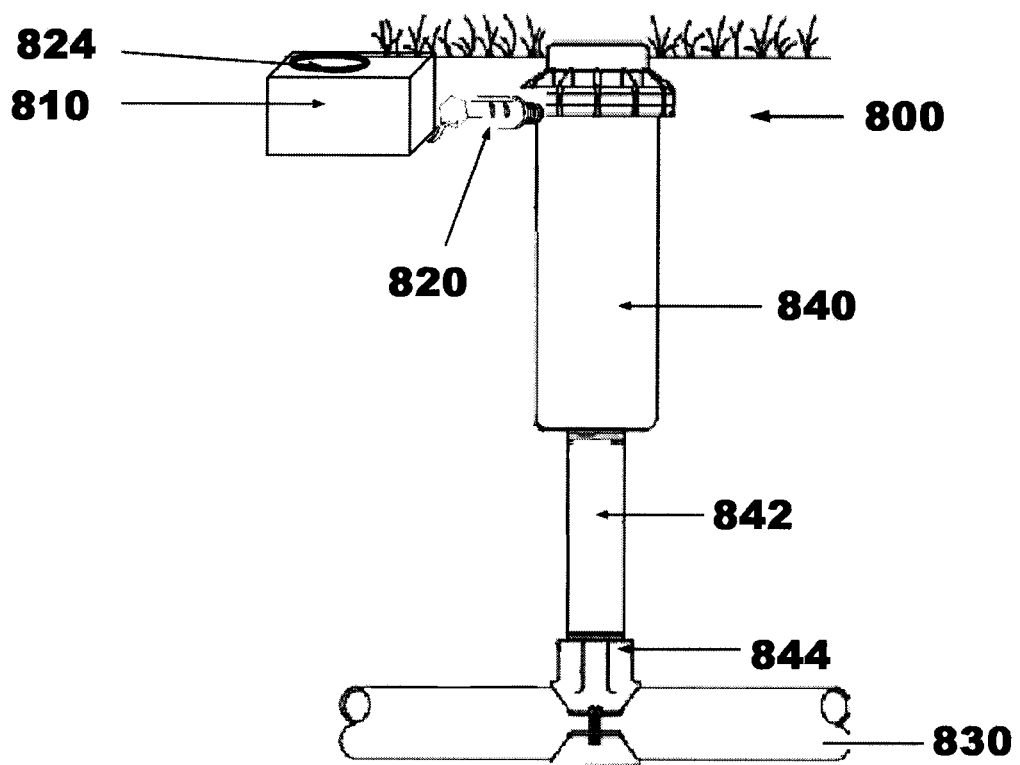
FIG. 7 is a side elevation view of a long-range RF transceiver-controller module attached to a rotor in a wireless control system according to one embodiment of the present invention.

FIG. 7 depicts a wireless irrigation node comprising a RFTC module associated with a water management device in accordance with one embodiment of the invention. The wireless irrigation node can further comprise one or more sensors (not shown) operatively associated with the RFTC module. With reference to FIG. 7, there is provided a wireless irrigation node shown generally at 800, comprising an RFTC module enclosed within housing 810. The RFTC module is operatively associated with a rotor sprinkler 840 via solenoid 820. The rotor 840 is connected to a sprinkler supply pipe 830, which supplies water to the rotor 840, via a riser 842 and a saddle 844. A solar panel array 824 is associated with the housing 810 and is operatively associated with the RFTC module for recharging the battery. Accordingly, the RFTC module does not require external electrical connections for power or control. As shown in FIG. 7, the RFTC module in housing 810 is located generally beneath the ground with the solar panels of the solar panel array 824 located above ground such that they are exposed to sunlight.

Figure 8:
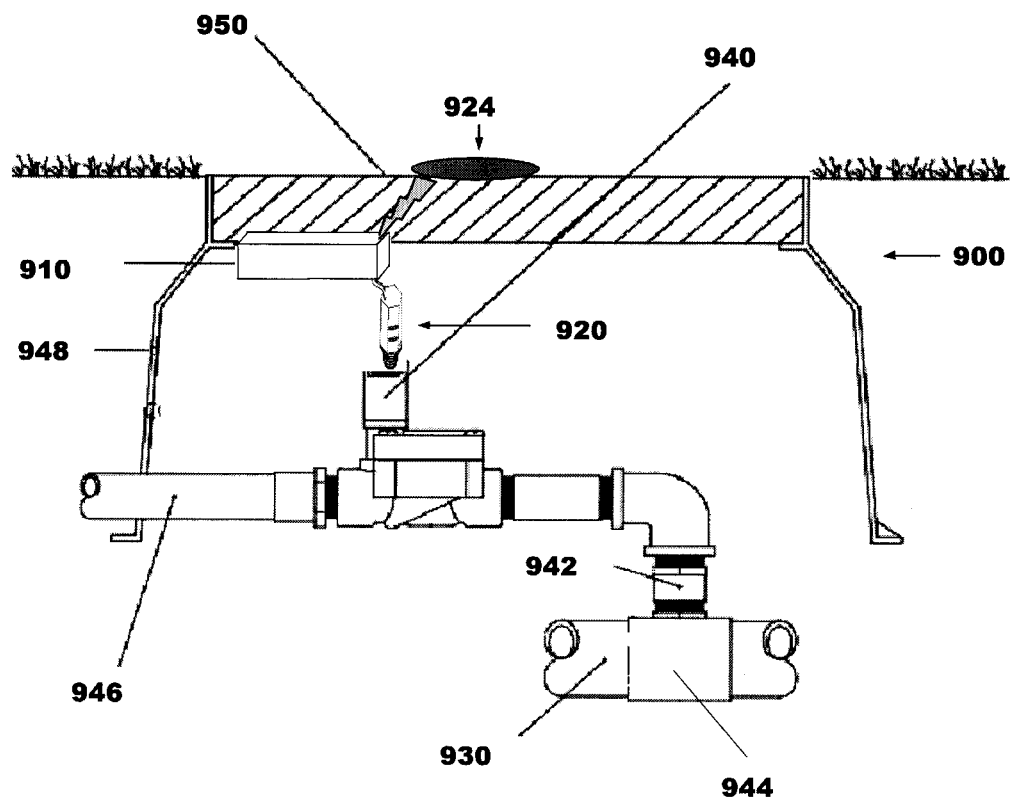
FIG. 8 is a side elevation view of a long-range RF transceiver-controller module integrated with a rotor (shown in cross-section) in a wireless control system according to one embodiment of the present invention.

A water irrigation node in an alternative embodiment of the invention in which the RFTC module is integrated into the water management device is depicted in FIG. 8. With reference to FIG. 8, there is provided a wireless irrigation node shown generally at 900, comprising a RFTC module enclosed within housing 910, which is integrated into valve 948 (shown in cross section). The RFTC module housing 920 is attached to the underside of the valve cover 950. The RFTC module is operatively associated with electric valve 940 via solenoid 920. The electric valve 940 is connected to sprinkler supply pipe 946, which supplies water to individual sprinklers in the system. The sprinkler supply pipe 946 is connected to the main water supply line 930 via main line fitting 944 and nipple 942. A solar panel array 924 is associated with the upper surface of valve cover 950 such that it remains above ground and is operatively associated with the RFTC module for recharging the battery.

As described above, the RFTC modules can be equipped with power management capabilities. To provide for additional power conservation, in one embodiment of the invention, the central controller of the irrigation management system can instruct the RFTC modules to go to a standby or sleep mode for a prolonged period of time to conserve power, for example, during the winter where irrigation is not required. The RFTC modules can be instructed to sleep for a predetermined period of time or to wake-up periodically to check for RF signals containing activation commands at predetermined intervals.

As noted above, the irrigation management system is configured to operate on one or more of the 433, 868, 915 MHz, and 2.4 and 5.8 GHz ISM frequency bands. In one embodiment of the present invention, the RFTC modules in the irrigation management system are configured to transmit and receive RF signals in one or more of the 433, 868 and 915 MHz ISM frequency bands that meet the European (ETSI, EN300-220-1 and EN301 439-3) or the North America (FCC part 15.247 and 15.249) regulatory standards. In another embodiment, the RFTC modules are configured to transmit and receive RF signals in the 868 and/or 915 MHz ISM frequency bands.

In accordance with the present invention, the RFTC modules in the irrigation management system are capable of transmitting RF signals over a distance of 100 m or more without line of sight and between about 5 km and about 15 km with line of sight. As such the RFTC modules can be located beneath ground and still be capable of communicating with other RFTC modules in the irrigation management system. One or more of the RFTC modules in the irrigation management system can be located above ground and thereby provide a means for interconnecting two subsystems having locations distal from each other. Accordingly, the present invention contemplates that the wireless irrigation system can comprise a plurality of underground subsystems that are in communication with each other via one or more RFTC modules located above ground. In one embodiment of the present invention, the RFTC modules in the irrigation management system are capable of transmitting RF signals over a distance of greater than 500 m without line of sight.

The irrigation management system can further comprise one or more mobile modules. For example, in addition to the central controller(s), the present invention contemplates that the irrigation management system can be controlled with one or more mobile auxiliary controllers as described above. Mobile modules can be used for a variety of purposes such as manual control of the operation of the irrigation nodes, manual control over or override of the irrigation schedule, real time mobile monitoring of the network and environmental conditions, and providing telemetry information for navigation. In order to accomplish these tasks, mobile modules transmit to and receive data from the central controller or from individual irrigation nodes as required.

The wireless control network provided by the present invention can be used to manage irrigation systems in a variety of agricultural, recreational or landscaping settings. For example, in one embodiment, the present invention provides for an irrigation management system for municipal land. The network can span several unconnected parcels of city land to allow centralised control of multiple physically separated irrigation systems that form part of one wireless irrigation control network by placing a RFTC module on the edge of each parcel of municipal land was within the transmission range of at least one RFTC module in the next parcel of land. In this case the installation of the wireless irrigation control network would allow new parcels of land to be added without the need for multiple site-specific central controllers or to install control wires under roads.

In another embodiment, the present invention provides for an irrigation management system for agricultural land. RFTC modules can extend the network to nearby but physically separated fields, allowing for centralized control of multiple areas. In addition to pure irrigation management, mobile nodes can be installed on farm equipment to aid in navigation and coordination based on telemetry information received from the RFTC modules. In a further embodiment, the present invention provides for an irrigation system for recreation fields.

In yet another embodiment, the present invention provides for irrigation management as part of a fire prevention system in a building. The RFTC modules are associated with sprinkler valves and are connected to environmental sensors such as smoke or heat detectors. In the event of a fire, the network would activate the sprinklers as well as fire alarms.

Golf Course Wireless Irrigation Management System

In a specific embodiment, the present invention provides for an irrigation management system for a golf course.

Figure 9:
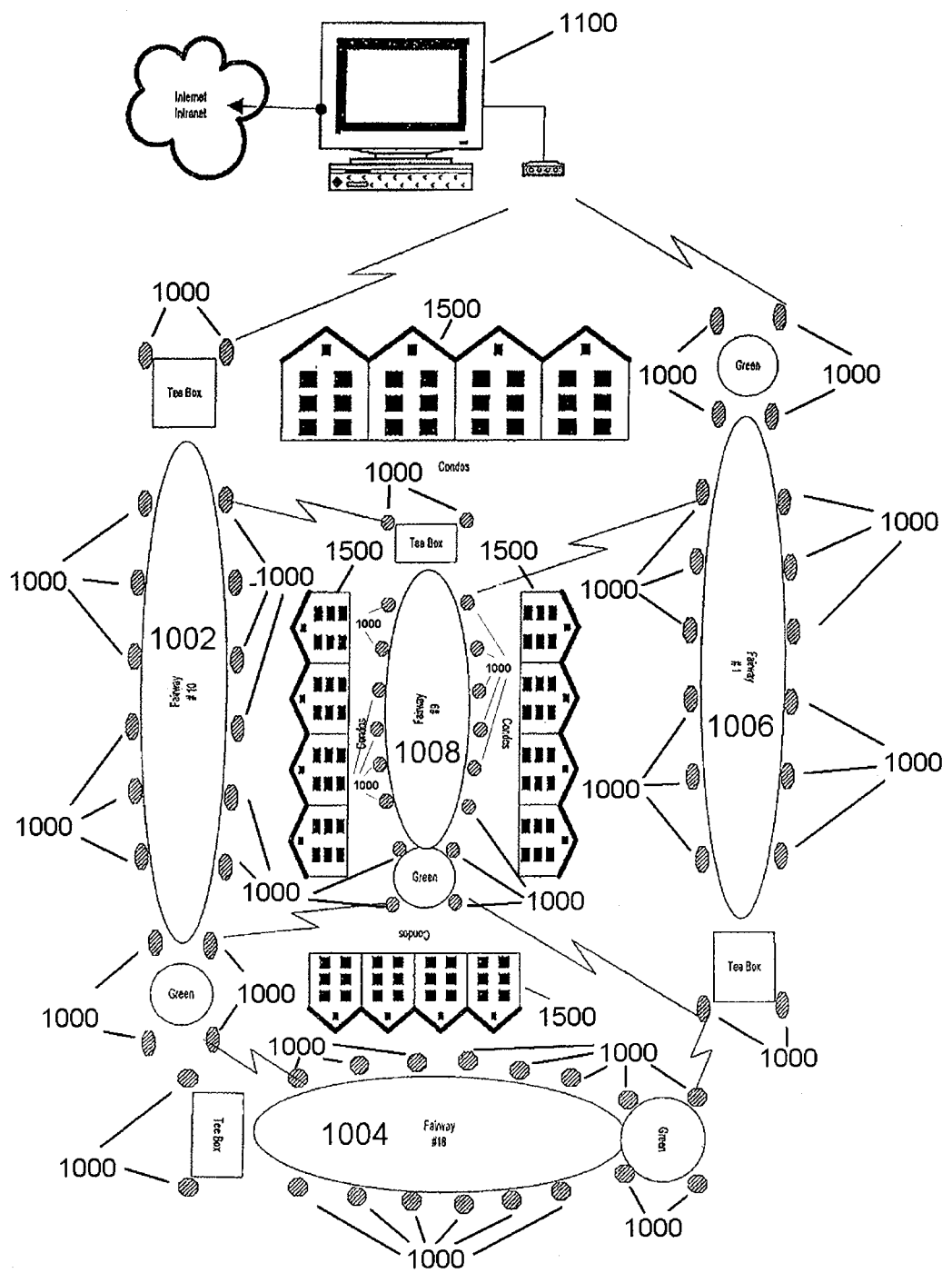
FIG. 9 presents a schematic representation of an arrangement of individual long-range RF transceiver-controller modules in a wireless irrigation management system for a golf course, according to one embodiment of the wireless control system.

An example of an irrigation management system for a golf course according to one embodiment of the present invention is depicted in FIG. 9. Irrigation nodes 1000 are installed throughout the golf course to control irrigation. The fairways 1002, 1004, 1006 and 1008 of the golf course are separated from one another and from the central controller 1110 by condominiums 1500. Due to their long-range transmission capabilities, the network of irrigation nodes 1000 is able to route information around the condominiums 1500 and between fairways 1002, 1004, 1006 and 1008 to different parts of the network and to the central controller 1100 by ad hoc routing protocols. The present invention contemplates that the irrigation management system can control irrigation of multiple golf courses with a single central controller, provided that at least one RFTC module in one golf course is within range of at least RFTC module in the next golf course.

In accordance with this embodiment of the invention, a subset of the RFTC modules in the system are dedicated to managing the irrigation of the golf course and are, therefore, operatively associated with at least one of the water management devices of the irrigation system and with one or more sensors for measuring environmental or system conditions. In one embodiment of the present invention, this subset of RFTC modules are configured as shown in FIG. 6 to be operatively associated with a solenoid for a valve, sprinkler or the like, an internal temperature sensor, an external temperature sensor, a motion sensor, a telemetry sensor, a moisture sensor, a flow control monitor, a battery status monitor and an operational monitor.

In another embodiment, the external temperature sensor detects the temperature of the soil in real-time. When soil temperatures are increased or decreased from the pre-programmed optimum range, the sensor sends an alert to the central controller or to a hand held unit. Optimal germination, growth, and development of turf grass are known to be restricted to a specific temperature ranges in the soil, therefore, the alert allows for proactive correction of potential plant stress including disease, infestation with pests (such as insects, nematodes, and/or weeds) and plant death. Appropriate ranges can be selected based on the turf grass species or cultivar. Table 1 provides exemplary ranges that can be preprogrammed into the RFTC modules to alert for the presence of various fungal pathogens and Table 2 provides a heat hardiness ranking for various turf grasses that can be used to guide the pre-programming of the RFTC modules in one embodiment of the invention to provide optimal ranges for a given turf grass.

TABLE 1

Temperature Ranges for Fungal Growth

| | Temperature range for fungal growth, °F. | | |
|---|---|---|---|
| Fungal Pathogen | Minimum | Optimum | Maximum |
| Typhula itoana | 20-35 | 45-60 | 70-75 |
| Fusarium nivale | 32 | 65-70 | 90 |
| Corticium fuciforme | 35-40 | 65-70 | 85-90 |
| Sclerotinia homoeocarpa | 35-40 | 70-80 | 90-95 |
| Ustilago striiformis | 40-45 | 70-80 | 90-95 |
| Rhizoctonia solani | 40-45 | 75-90 | 95-100 |
| Pythium ultimum | 40 | 80-85 | 100 |
| Pythium aphanidermatum | 50 | 90-95 | 110-115 |

TABLE 2

Relative Heat Hardiness of Turf Grasses

| Heat hardiness ranking | Turf Grass Species |
|---|---|
| Excellent | Zoysiagrass |
| | Bermudagrass |
| | Buffalograss |
| | Carpetgrass |
| | Centipedegrass |
| | St. Augustinegrass |
| Good | Tall fescue |
| | Meadow fescue |
| Medium | Colonial bentgrass |
| | Creeping bentgrass |
| | Kentucky bluegrass |
| Fair | Canada bluegrass |
| | Chewings fescue |
| | Red fescue |
| | Annual bluegrass |
| | Perennial ryegrass |
| | Redtop |
| Poor | Italian ryegrass |
| | Rough bluegrass |

As grass on golf courses is frequently cut very low, for example on a putting green, monitoring the temperature at the root of the plant, rather than water content by means of a moisture sensor will allow detection of any overheating of the root structure which can result in burnt grass or loss of root structure. As such the soil temperature sensor allows for proactive rather than reactive sensing and corrective steps can this be taken at an earlier stage.

The golf course wireless irrigation management system of the present invention can further comprise a plurality of mobile nodes that are provided to golfers to provide spatial information such as distance to the green or hole and general mapping information by communication with the irrigation nodes. Scoring information can also be transmitted and organised through the network using mobile modules. Golf course owners can use mobile modules to control the irrigation system remotely. Mobile modules can be integrated into equipment such as golf carts or other rental equipment and telemetry from such mobile modules can be incorporated into a security system to allow for tracking of the equipment. Mobile modules can be used to deactivate golf carts if they travel outside a defined area.

In one embodiment, the golf course wireless irrigation management system is configured with a smart mesh topology with gateway mapping and routing protocols. In accordance with this embodiment, the system can further comprise a plurality of hand-held RFTC modules that act as scoring units for golf players as well as showing, for example, the course map and relevant yardage. The scoring units can also act as a remote caddy to report exact yardage from any location to the player's location, as well as allowing the player to order food and beverages. Mobile RFTC modules can also be incorporated into the golf carts and can include an LCD display allowing players to view the course map. These modules can act as a remote caddy to report exact yardage from any location to the player's location, as well as allowing the player to order food and beverages. In addition, mobile RFTC modules can be employed for equipment control, in which the RFTC module is incorporated into golf carts and golf maintenance equipment and is configured with an auto shut-off capability that disables the vehicle if it travels beyond course property or into forbidden areas.

To gain a better understanding of the invention described herein, the following examples are set forth. It will be understood that these examples are intended to describe illustrative embodiments of the invention and are not intended to limit the scope of the invention in any way.

EXAMPLES

Example 1

Wireless Irrigation Management System for a Golf Course

The Wireless Irrigation Central Control (WICC) and maintenance system controls the entire golf course's irrigation system from one central location without the need for embedded wiring. There is no limit to the number of stations that can be controlled, allowing for complete water management. The specification below outlines the requirements for the design and development of the electronics and software for the central computing device, hand held unit and valve or sprinkler head. The following Acronyms and Abbreviations are used.

| | |
|---|---|
| ETI | Elapse Time Indicator |
| ID | Identification |
| GPIO | General Purpose I/O |
| TTL | Transistor-Transistor Logic |
| LVTTL | Low Voltage Transistor-Transistor Logic |
| PSU | Power Supply Unit |
| SCU | Single Board Computer |
| TXD | Transmit Data |
| RXD | Receive Data |
| DTR | Data Terminal Ready |
| WICC | Wireless Irrigation Central Control and maintenance system |
| CCU | Central Control Unit |
| HHCU | Hand Held Control Unit |
| RAU | Remote Activation Unit |

The WICC is compressed of three individual components: Central control unit (CCU), Hand Held Control Unit (HHCU) and Remote Activation Unit (RAU). Note: The CCU and the HHCU are interchangeable units. When a HHCU is connected to the system PC it is operating as a CCU. When on connected it shall operate as a HHCU. This shall allow for a level of redundancy.

Central Control Unit: The Central Control Unit (CCU) is comprised of a PC running the WICC software signal on the Windows XP operating system. The PC shall be connected to the primary transceiver via an USB interface.

Hand Held Control Unit: The Hand Held Control Unit (HHCU) shall act in the same manner as the CCU with limit functionality.

The HHCU shall have the ability to instruct any RAU to turn on or turn off the solenoid for the valve or sprinkler head. The HHCU shall have a simple human interface allow for the RAU number to selected (1-9999) and half "ON" and "OFF" buttons. An indicator led shall show that the RAU has responded to the request.

Remote Activation Unit: The Remote Activation Unit (RAU) is used to control the solenoid for individual valves or sprinkler heads.

The RAU shall be capable of receiving commands from the CCU, HHCU or a relayed command form any other RAU. The RAU shall be able respond to the CCU or HHCU and shall be able to replay commands or responses.

WICC Communication Lines: Each WICC unit shall wirelessly communicate via a 868/915 MHz RF transceiver interfaces. Each unit shall be able to communicate with any other unit within range using a star, mesh or ad hoc relay network approach. Each unit shall have an individual address. The RF transceiver module shall be a Semtec DP 1205 or XE 1205 or equivalent. The CCU and the HHCU shall also be able to communicate via a USB 2 interface.

RAU Operation

The RAU shall be able to perform the following operations.

Battery voltage: The RAU shall monitor the battery voltage and report back to the CCU when the battery is below TBD voltage level. The RAU shall also report the present battery voltage when requested by the CCU.

Temperature Over/Under: The RAU shall be able to monitor two separate temperature sensors (one internal and one external). The RAU shall report the present temperatures when requested by the CCU.

Solenoid controls: The RAU shall be able to control two types of solenoids: DC latching and AC continuous. The RAU shall produce 120v AC at TBD amps for this operation.

The RAU shall monitor the solenoid or valve or sprinkler and report back to the CCU when a failure to activate or a failure to deactivate has occurred.

Moisture sensors: The RAU shall be able to monitor three separate external moisture sensors. The RAU shall report the present moisture reading from each sensor when requested by the CCU.

Temperature Operation: The RAU shall meet all operational requirements for ground temperature between −40° C. & +50° C.

Elapse Time indicator; The RAU shall incorporate an electronic ETI. The ETI shall be software programmed as described in the software section below.

The ETI shall keep track of total system on time and report this information to the SCU upon request.

Battery: The RAU shall operate from a battery of defined voltage. The RAU shall recharge the battery by one of two methods: A) Solar cells and B) Near field induction from water movement.

WICC Reset

There are four separate reset lines for the WICC. 1) Front panel push button; 2) Watchdog timer (internal to the micro); 3) Power on reset and 4) Software command.

Front panel Reset: Reset (WICC_RESET#) is an active low TTL level signal. Reset is a switch closer on the front panel. When reset is asserted the WICC shall restart its program. The WICC shall provide de-bounce circuitry for the reset line.

Watch dog timer: The WICC processor has a built in watch dog that we be configured to reset the processor if timed out.

Power On Reset: A reset circuit shall assert the WICC internal reset line for 100 msec on power up.

Software Command Reset: The WICC processor shall reset when obtaining a reset command.

Software

The WICC shall be equipped with the following software modules and controls.

Central control unit—control and GUI interface
Hand Held Control Unit—control and LCD interface
Remote Activation Unit—control The control software shall interface to standard water management and scheduling software.

Example 2

Wireless Irrigation Control and Management System

The following example describes a wireless irrigation control and management system that operates in the 915 MHz ISM band and which can be installed with known irrigation valve systems including Rainbird, Toro, Hunter and John Deere. The wireless control system can be "retro-fitted" to an existing irrigation system or installed together with a new irrigation system.

Figure 14:
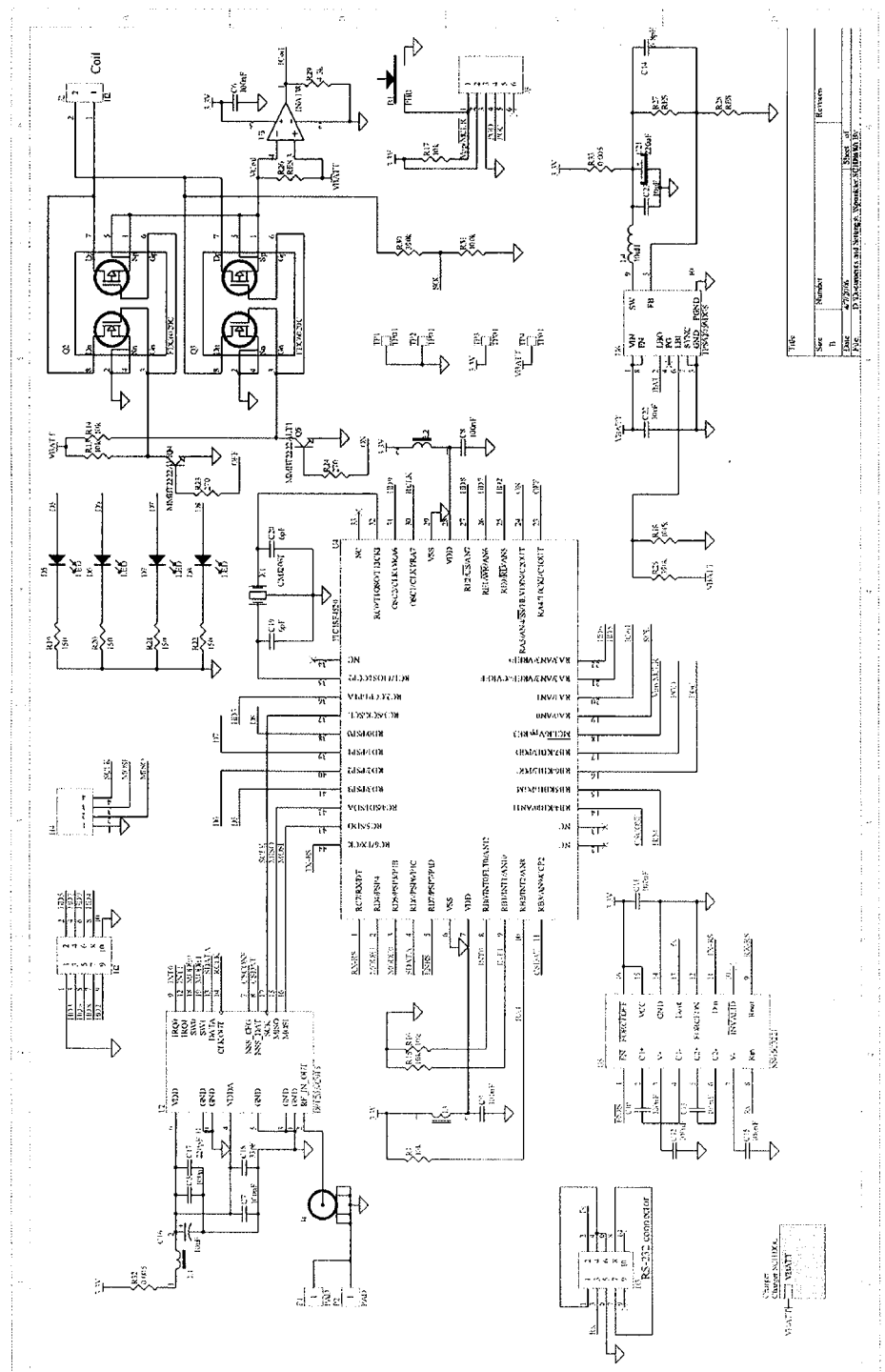
FIG. 14 presents a schematic diagram of a circuit board usable for any, but not limited to the following: repeaters, controllers, valves, and sprinklers, by adding the necessary components for each.

The system comprises a central control unit, one or more hand held control units, one or more repeater units and a plurality of valve and sprinkler controllers (i.e. RFTCs), all of which are in wireless communication. The Repeater/RFTC/Main Controller/Valve Board combo schematic as shown in FIG. 14 can be used as a basis for an all-inclusive circuit board for valves, sprinklers, repeaters, and controllers by adding the necessary components for each situation.

The repeater units and central control unit utilize a 0 gain, ¼ or ½ wave exterior mounted antenna with vertical propagation. The valve and sprinkler units comprise a printed L antenna with vertical polarization. The valve and sprinkler units are installed in-ground in a horizontal orientation. Tilting the orientation 12-20 degrees from the horizontal improves the range of the units from a maximum of about 1.2km to a maximum of about 3 km. The system can also utilize vertically polarized antennas in all units.

The transceiver is the DP1205 module from Semtech, which is based in the XE1205 chip. The transceiver is configured as follows:

Transmission power is 15 dBm
Receiver Bandwidth is 20 kHz
Frequency Deviation is 10 MHz
Baud Rate is 3046.8

Table 3 provides the technical specifications for the units.

TABLE 3

Technical Specifications

| NORMAL OPERATING CONDITIONS | | | | | |
|---|---|---|---|---|---|
| Parameter | Min | Typ | Max | Units | Comments |
| Internal Voltage range (Vcc to Gnd) | 2.4 | 3.3 | 3.6 | V | |
| Peak current | | | 82 | mA | Tx @ 3.3 |
| Receive current | | 20.4 | | mA | Rx @ 3.3 |
| Average current | | 500 | | µA | Averaged over a typical day with active communication limited to one 5 minute interval |
| Storage and operating temperatures | −40 | | 85 | ° C. | |
| Operating Temperatures | 0 | | 70 | ° C. | |

| CURRENT CONSUMPTION | | | |
|---|---|---|---|
| Parameter | Typ | Units | Comments |
| Transmit | 62 | mA | At 15 dBm |
| Receive | 14 | mA | |
| Day Sleep | 472 | µA | |
| Deep Sleep | 23 | µA | |
| 9 Volt Solenoid | 0.73 | A | Depends on condition of battery |

| DETAILED RADIO SPECIFICATION | | | | | |
|---|---|---|---|---|---|
| Parameter | Min | Typ | Max | Units | Comments |
| Operating Frequency | 902 | 915.3 | 928 | MHz | North America |
| Number of channels FSK | | 1 | | | FSK |
| Number of channels FSK frequency hopping | | 50 | | | FSK/FH |
| Occupied channel bandwidth | | 20 | | kHz | |
| Modulation | | | | | FSK or FSK/FH |
| Data rate up to | | 3 | | kbit/s | |

TABLE 3-continued

Technical Specifications

| | | | |
|---|---|---|---|
| Receiver sensitivity | −113 | dBm | High Rx 0.1% at 4.8 kpbs |
| Output power programmable up to | 15 | dBm | Vcc = 3 V, 25° C. |
| Frequency synthesizer | 500 | Hz | |
| Topology | | | Star, point to point and point to multi point |

RANGE* Master to slave (point to point)

| Parameter | Min | Typ | Max | Units | Comments |
|---|---|---|---|---|---|
| Outdoor | 1.7 | 3.5 | 9.5 | Km | 25° C., 50% RH, 3-5 meter above ground, +3 dBi omni-directional antenna |
| Outdoor | 4.2 | | 37 | Km | 25° C., 50% RH, Line of sight, +9 dBi directional antenna |
| 2 INCHES below ground | 0.7 | 1.5 | 3 | Km | 25° C., 50% RH, +3 dBi omni-directional antenna |
| 2 INCHES below ground | 0.5 | 0.8 | 2 | Km | 25° C., 50% RH, +0 dBi omni-directional antenna |

*actual performance varies depending on the specific installation environment.

Operating Modes

The units have the following operating modes:

Active: continuously listens for messages. It the unit does not recognise active communication over the network, it enters sleep mode after a 3-minute timeout period.

Sleep: listens periodically for a message. The unit listens for 1.33 seconds every 60 seconds. When it registers that active communication over the network is taking place, it goes into active mode.

Deep Sleep: the unit is programmed to power down at certain periods of the day to minimise power consumption. In this mode, communication is not active, however, the unit will perform the specified irrigation program.

Health Check: a twice-daily communication health check is pre-programmed into the units. The health check updates irrigation schedules and retrieves irrigation and controller operation data.

Transmission

The transceivers communicate using FSK and frequency hopping using 50 bands between 915.055 and 917.555 MHz with 50 kHZ between the centres of the channels. Frequency hopping is according to the algorithm outlined in FIGS. 13A-L and using the Frequency Table shown in FIG. 16.

The maximum message length is 68 bytes including preamble and pattern, producing a maximum message length of 178.5 msec. Sync messages and sync message acks are 16 bytes (42.01 msec) including preamble and pattern. Message acknowledgements are 18 bytes (47.26 msec) including preamble and pattern.

The units have four different modes in which they transmit:

Wake Burst Mode: A 26.26 msec wake message is transmitted repeatedly on all channels in the frequency table. The message is repeated for 1 minute changing channels every 26.86 msec. This burst ensures that a unit which temporarily activates it's receiver to listen on a single frequency is notified to leave standby mode and await a sync message. The wake burst mode transmits on a single channel for 391.06 msec in any 20-second period. The wake burst mode begins transmitting on the next channel in the frequency table after the one it was last using.

Transmit Sync Mode: To establish synchronization with a remote unit a sync message is transmitted containing timing information and a random offset into the frequency table. This message requires 42.01 msec to transmit. The unit transmits the message and then waits for an acknowledgement. A sync message is transmitted every 101.5625 msec changing to a new channel before transmitting a new message. The order in which the channels are selected is based on the formula:

Index of Frequency Table=Remainder((Offset+ TwoFifths+Fraction)/50)

Offset=Pseudorandom number calculated at start of sync operation

Fraction=13*(Remainder((Fraction+13)/52))recalculated every 101.5625 msec

TwoFifths=Remainder((TwoFifths+1)/50), recalculated when Fraction=0

In any 20-second period, 197 sync messages may be sent. The pattern repeats itself after 200 transmissions. In any 20 second period any one channel is used a maximum of 4 times. The maximum transmission time spent on any single channel is 168.04 msec.

Transmit Message Mode: Once a sync acknowledgement occurs from a remote unit, the unit waits until the TwoFifths variable is incremented and then transmits the message on the channel specified by:

Index of Frequency Table=Remainder((Offset+ TwoFifths)/50)

The TwoFifths variable is incremented every 406.25 msec, and the message is repeated until an acknowledgement is received. In any 20-second period a maximum of 50 messages may be sent. In this mode any channel will be used only once in any 20 second period. The maximum message length is 178.5 msec. The transmission of a message follows immediately upon synchronization, therefore in a 20 second interval spanning both the synchronization period and the message transmission, a single channel may experience an increased amount of traffic. The worst case has 3 sync transmissions and a message occur on the same channel in a 20 second period. That would result in a maximum of 304.6 msec of transmission time on a single channel in a 20 second interval.

Receive Mode: The unit requires 42.01 msec to transmit a sync acknowledgement and 47.26 msec to transmit a message acknowledgement. The acknowledgements are transmitted in response to valid messages other than wake messages. Over a complete message transaction, the receiver would send both a sync acknowledgement and a message acknowledgement. In the worst case 20-second period the total transmission time of both the sender and receiver on a single channel would be 393.87 milliseconds.

Typical transmission ranges for the units when installed on a golf course are provided in Table 4.

TABLE 4

Typical Communication ranges in Golf Course Terrain

| | | Communication Range | | | |
|---|---|---|---|---|---|
| | | Hand Held Controller to RFTC | | Repeater Network to RFTC | |
| Typical Underground Controller Installation | Obstructions | Min | Max | Min | Max |
| Installed inside a valve box, 2" below grade with no external antenna | None: 100% line of sight | 1 km | 3 km | 1 km | 8 km |
| Installed inside a valve box, 2" below grade with no external antenna | Golf Course terrain | 700 m | 1.2 km | 1 km | 8 km |
| Installed inside a valve box, 2" below grade with no external antenna | Golf course terrain Up to 300 ft of bush | 500 m | 700 m | 1 km | 8 km |
| Installed inside a valve box, 2" below grade with ¼ wave antenna | None: 100% line of sight | 1.5 km | 3 km | 1 km | 8 km |
| Installed inside a valve box, 2" below grade with ¼ wave antenna | Golf course terrain | 900 m | 1.5 km | 1 km | 8 km |
| Installed inside a valve box, 2" below grade with ¼ wave antenna | Golf course terrain 300 ft of bush | 700 m | 900 m | 1 km | 8 km |

Example 3

Battery Power Options

Examples of battery power options for the RFTC modules and repeaters in the wireless irrigation system described above are provided in Tables 5-7 below.

TABLE 5

RFTC Main battery power options

| Battery Pack/mAh | 625 | 1200 | 8350 | 1500 | 26000 |
|---|---|---|---|---|---|
| Battery Voltage/V | 8.4 | 8.4 | 6 | 6 | 6 |
| Useful range/% | 90 | 90 | 90 | 90 | 90 |
| Switching Efficiency/% | 100 | 100 | 100 | 100 | 100 |
| Power available/mWh | 4725 | 9072 | 45090 | 8100 | 140400 |
| Days of runtime | 138.3 | 265.4 | 1319.3 | 237.0 | 4108.0 |
| Weeks of runtime | 35.1 | 67.4 | 335.0 | 60.2 | 1043.1 |
| Years of runtime* | 0.7 | 1.3 | 6.4 | 1.2 | 20.1 |
| Battery Type | 9 V | Lithium 9 V | C cells | 6 V Photo | EN528 |
| Number of Cells | 1 | 1 | 4 | 1 | 1 |

*based on weekly usage numbers

TABLE 6

RFTC DC Solenoid battery options

| Battery Pack/mAh | 625 | 1200 | |
|---|---|---|---|
| Battery Voltage/V | 9 | 9 | |
| Useful range/% | 75 | 75 | 75% to be conservative |

TABLE 6-continued

RFTC DC Solenoid battery options

| Battery Pack/mAh | 625 | 1200 | |
|---|---|---|---|
| Switching Efficiency/% | 100 | 100 | 100% Efficiency because there is no switching supply |
| Power available/mWh | 4218.75 | 8100 | |
| Days of runtime | 30438.3 | 58441.6 | |
| Years of runtime* | 83.4 | 160.1 | |
| Battery Type | 9 V | Lithium 9 V | |
| Number of Cells | 1 | 2 | |

TABLE 7

Star Node (repeater) Battery power options

| Battery Pack/mAh | 625 | 1200 | 8350 | 1500 | 26000 |
|---|---|---|---|---|---|
| Battery Voltage/V | 8.4 | 8.4 | 6 | 6 | 6 |
| Useful range/% | 90 | 90 | 90 | 90 | 90 |
| Switching Efficiency/% | 100 | 100 | 100 | 100 | 100 |
| Power available/mWh | 4725 | 9072 | 45090 | 8100 | 140400 |
| Days of runtime | 22.9 | 43.9 | 218.1 | 39.2 | 679.1 |
| Weeks of runtime | 3.4 | 6.6 | 32.8 | 5.9 | 102.2 |

TABLE 7-continued

Star Node (repeater) Battery power options

| Battery Pack/mAh | 625 | 1200 | 8350 | 1500 | 26000 |
|---|---|---|---|---|---|
| Years of runtime* | 0.1 | 0.1 | 0.6 | 0.1 | 2.0 |
| Battery Type | 9 V | Lithium 9 V | C cells | 6 V Photo | EN528 |
| Number of Cells | 1 | 1 | 4 | 1 | 1 |

Example 4

Signal Propagation

Table 8 provided details relating to the range of signal propagation from RFTC modules as described in Example 3 in various scenarios. It will be noted that an increase in transmission (TX) power to 1 Watt (30 dBm) can increase the range by up to 5.62 times.

TABLE 8

Signal propagation range

| TX Power | Antenna Gain | Feeder Loss | EIRP | Fade Margin | Building Loss | Forest Loss A* | Forest Loss B# | V to H Loss Atten | Range/ km |
|---|---|---|---|---|---|---|---|---|---|
| Item 1 | | | | | | | | | |
| 15 dbm | 3 db | 8 db | 10 dbm | 0 | 0 | 0 | 0 | | 7.5 |
| 30 dbm (1 watt) | 3 db | 8 db | 10 dbm | 0 | 0 | 0 | 0 | | 37 |
| Item 2 | | | | | | | | | |
| 15 dbm | 3 db | 8 db | 10 dbm | | | | | 17 db | 1.1 |
| 30 dbm (1 watt) | 3 db | 8 db | 10 dbm | | | | | 17 db | 5.5 |
| Item 3 | | | | | | | | | |
| 15 dbm | 3 db | 8 db | 10 dbm | 10 db | 0 | 0 | 0 | | 2.5 |
| 30 dbm (1 watt) | 3 db | 8 db | 10 dbm | 10 db | 0 | 0 | 0 | | 12 |
| Item 4 | | | | | | | | | |
| 15 dbm | 3 db | 8 db | 10 dbm | 10 db | 0 | 2 db | 0 | | 2 |
| 30 dbm (1 watt) | 3 db | 8 db | 10 dbm | 10 db | 0 | 2 db | 0 | | 9.5 |
| Item 5 | | | | | | | | | |
| 15 dbm | 3 db | 8 db | 10 dbm | 10 db | 0 | 0 | 4 db | | 1.5 |
| 30 dbm (1 watt) | 3 db | 8 db | 10 dbm | 10 db | 0 | 0 | 4 db | | 7.5 |
| Item 6 | | | | | | | | | |
| 15 dbm | 3 db | 8 db | 10 dbm | 10 db | 20 db | 0 | 0 | | 0.25 |
| 30 dbm (1 watt) | 3 db | 8 db | 10 dbm | 10 db | 20 db | 0 | 0 | | 1.2 |
| Item 8 | | | | | | | | | |
| 15 dbm | 9 db | 8 db | 16 dbm | 10 db | | | | | 4.8 |
| 30 dbm (1 watt) | 9 db | 8 db | 16 dbm | 10 db | | | | | 24 |

*10 m at 0.2 db/m
20 m at 0.2 db/m

The disclosure of all patents, publications, including published patent applications, and database entries referenced in this specification are specifically incorporated by reference in their entirety to the same extent as if each such individual patent, publication, and database entry were specifically and individually indicated to be incorporated by reference.

Although the invention has been described with reference to certain specific embodiments, various modifications thereof will be apparent to those skilled in the art without departing from the spirit and scope of the invention as outlined in the claims appended hereto.

The invention claimed is:

1. A wireless control system for controlling a plurality of devices via a central controller, said wireless control system comprising:
   a radio frequency (RF) apparatus comprising a first RF transceiver and a first antenna operatively associated with a computing device for interfacing with said central controller, said RF apparatus configured to transmit and receive radio frequency (RF) signals in one or more of the ISM frequency bands, and
   a network of radio frequency transceiver-controller (RFTC) modules each in wireless communication with one or more other of said RFTC modules and/or with said central controller, each of said RFTC modules comprising a module antenna and configured for operative association with one or more of said devices and configured to transmit and receive radio frequency (RF)

signals in one or more of the ISM frequency bands, at least some of said RFTC modules further configured to transmit said RF signals a distance of at least 100 m without line of sight and with a peak transmitter output power less than or equal to 15 dBm, wherein said first antenna is vertically polarized, wherein the module antenna of at least one of said RFTC modules is horizontally polarized, the first antenna which is vertically polarized being used for wireless communication with the module antenna of the at least one of said RFTC modules which is horizontally polarized, wherein the first antenna and the module antenna have opposite antenna polarizations, the RFTC modules each having only horizontally polarized antennas installed in a fixed orientation and the RF apparatus having only vertically polarized antennas installed in a fixed orientation, wherein said RFTC modules actuate or de-actuate said plurality of devices in response to commands from said central controller transmitted via RF signals, and wherein at least some of the RF signals transmitted from the RF apparatus to the at least one RFTC module convey the commands at a data rate of at least 3 kpbs, the RF signals being adequately received and demodulated by the RFTC module having a receiver sensitivity of at least −120 dBm.

2. The wireless control system according to claim 1 further comprising one or more repeater nodes, each of said repeater nodes in wireless communication with one or more of said RFTC modules and/or said central controller, wherein each of said repeater nodes comprises a repeater RF transceiver and repeater antenna and is capable of re-transmitting a RF signal received through the network to other repeater nodes, RFTC modules, and/or the central controller.

3. The wireless control system according to claim 1, wherein said one or more ISM frequency bands are the 5.8 GHz, 2.4 GHz, 433 MHz, 868 MHz and/or 915 MHz ISM frequency bands.

4. The wireless control system according to claim 1, wherein said one or more ISM frequency bands are the 433 MHz, 868 MHz and/or 915 MHz ISM frequency bands.

5. The wireless control system according to claim 1, wherein said one or more ISM bands is the 915 MHz ISM frequency band.

6. The wireless control system according to claim 1, wherein said RF signals are transmitted through the system using a protocol that comprises frequency hopping.

7. The wireless control system according to claim 1, wherein the module antenna of at least one of said RFTC modules which is horizontally polarized is further installed at an angle between about 10 degrees and about 30 degrees above a horizontal plane.

8. The wireless control system according to claim 1, further comprising one or more hand-held controllers, each of said handheld controllers operatively associated with a second RF transceiver and a second antenna and configured to transmit and receive RF signals in one or more of the ISM frequency bands.

9. The wireless control system according to claim 1, wherein one or more of said RFTC modules are further operatively associated with one or more sensors.

10. A wireless irrigation management system for controlling an irrigation system having a plurality of water management devices, said wireless irrigation management system comprising a central controller and the wireless control system according to claim 1, wherein each RFTC module is configured for operative association with one or more of said plurality of water management devices via an actuating means and with one or more sensors, wherein said RFTC modules actuate the associated one or more water management devices and/or gather data from said one or more associated sensors in response to commands from said central controller transmitted via RF signals.

11. The wireless irrigation management system according to claim 10, wherein said irrigation system having a plurality of water management devices is a golf course irrigation system.

12. The wireless control system according to claim 1, wherein the module antenna of the at least one of the RFTC modules which is horizontally polarized is located substantially at or below ground level.

13. A method for controlling an irrigation system comprising a plurality of water management devices and a central controller, said method comprising:

(a) providing a wireless control system comprising:
   a radio frequency (RF) apparatus comprising a first RF transceiver and a first antenna operatively associated with a computing device for interfacing with said central controller, said RF apparatus configured to transmit and receive radio frequency (RF) signals in one or more of the ISM frequency bands, and
   a network of radio frequency transceiver-controller (RFTC) modules in wireless communication with one or more other of said RFTC modules and/or with said central controller, each of said RFTC modules configured for operative association with one or more of said water management devices, each RFTC module comprising a module antenna and configured to transmit and receive radio frequency (RF) signals in one or more of the ISM frequency bands, at least some of said RFTC modules further configured to transmit said RF signals a distance of at least 100 m without line of sight and with a peak transmitter output power less than or equal to 15 dBm; and (b) transmitting a command via a RF signal on one of the ISM frequency bands from said central controller to a RFTC module, wherein said first antenna is vertically polarized, wherein the module antenna of at least one of said RFTC modules is horizontally polarized, the first antenna which is vertically polarized being used for wireless communication with the module antenna of the at least one of said RFTC modules which is horizontally polarized, wherein the first antenna and the module antenna have opposite antenna polarizations, the RFTC modules each having only horizontally polarized antennas installed in a fixed orientation and the RF apparatus having only vertically polarized antennas installed in a fixed orientation, wherein said RFTC module processes said command and determines whether to retransmit the signal, actuate a water management device or collect data from a sensor based on said command, and wherein the RF signal transmitted from the RF apparatus to the RFTC module conveys the command at a data rate of at least 3 kpbs, the RF signal being adequately received and demodulated by the RFTC module having a receiver sensitivity of at least −120 dBm.

14. The method according to claim 13, wherein said RF signal is transmitted using a protocol that comprises frequency hopping.

15. The method according to claim 13, wherein the module antenna of at least one of said RFTC modules which is horizontally polarized is further installed at an angle between about 10 degrees and about 30 degrees above a horizontal plane.

16. The method according to claim 13, wherein the module antenna of the at least one of the RFTC modules which is horizontally polarized is located substantially at or below ground level.

17. A wireless control system for controlling a plurality of devices via a central controller, said wireless control system comprising:
- a radio frequency (RF) apparatus comprising a first RF transceiver and a first vertically polarized antenna operatively associated with a computing device for interfacing with said central controller, said RF apparatus configured to transmit and receive radio frequency (RF) signals in one or more of the ISM frequency bands, and
- a network of radio frequency transceiver-controller (RFTC) modules each in wireless communication with one or more other of said RFTC modules and/or with said central controller, each of said RFTC modules comprising a module antenna and configured for operative association with one or more of said devices and configured to transmit and receive radio frequency (RF) signals in one or more of the ISM frequency bands at least some of said RFTC modules further configured to transmit said RF signals a distance of at least 100 m without line of sight and with a transmitter output power which meets North American regulatory standards with respect to at least output power for the ISM frequency bands, at least one of the module antennas being horizontally polarized and located substantially at or below ground level, the first vertically polarized antenna configured for wireless communication with at least one of the module antennas which is horizontally polarized, wherein the first antenna and the module antenna have opposite antenna polarizations, the RFTC modules each having only horizontally polarized antennas installed in a fixed orientation and the RF apparatus having only vertically polarized antennas installed in a fixed orientation,
- wherein said RFTC modules actuate or de-actuate said plurality of devices in response to commands from said central controller transmitted via RF signals, and
- wherein at least some of the RF signals transmitted from the RF apparatus to the at least one RFTC module convey the commands at a data rate of at least 3 kpbs, the RF signals being adequately received and demodulated by the RFTC module having a receiver sensitivity of at least −120 dBm.

18. The wireless control system according to claim 17, wherein the at least one of the module antennas which is horizontally polarized is further installed at an angle between about 10 degrees and about 30 degrees above a horizontal plane.

19. The wireless control system according to claim 17, wherein the at least one of the modules antennas which is horizontally polarized is located below ground level.

20. A method for controlling an irrigation system comprising a plurality of water management devices and a central controller, said method comprising:
(a) providing a wireless control system comprising:
- a radio frequency (RF) apparatus comprising a first RF transceiver and a first vertically polarized antenna operatively associated with a computing device for interfacing with said central controller, said RF apparatus configured to transmit and receive radio frequency (RF) signals in one or more of the ISM frequency bands, and
- a network of radio frequency transceiver-controller (RFTC) modules in wireless communication with one or more other of said RFTC modules and/or with said central controller, each of said RFTC modules configured for operative association with one or more of said water management devices, each RFTC module comprising a module antenna and configured to transmit and receive radio frequency (RF) signals in one or more of the ISM frequency bands, at least some of said RFTC modules further configured to transmit said RF signals a distance of at least 100 m without line of sight and with a transmitter output power which meets North American regulatory standards with respect to at least output power for the ISM frequency bands, at least one of the module antennas being horizontally polarized and located substantially at or below ground level, the first vertically polarized antenna configured for wireless communication with at least of the module antennas which is horizontally polarized, wherein the first antenna and the module antenna have opposite antenna polarizations, the RFTC modules each having only horizontally polarized antennas installed in a fixed orientation and the RF apparatus having only vertically polarized antennas installed in a fixed orientation; and
(b) transmitting a command via a RF signal on one of the ISM frequency bands from said central controller to a RFTC module;
- wherein said RFTC module processes the command and determines whether to retransmit the signal, actuate a water management device or collect data from a sensor based on the command, and
- wherein the RF signal transmitted from the RF apparatus to the RFTC module conveys the command at a data rate of at least 3 kpbs, the RF signals being adequately received and demodulated by the RFTC module having a receiver sensitivity of at least −120 dBm.

21. The method according to claim 20, wherein the at least one of the module antennas which is horizontally polarized is further installed at an angle between about 10 degrees and about 30 degrees above a horizontal plane.

22. The method according to claim 20, wherein the at least one of the module antennas which is horizontally polarized is located below ground level.

* * * * *